(12) United States Patent
Boykin et al.

(10) Patent No.: US 10,370,102 B2
(45) Date of Patent: Aug. 6, 2019

(54) SYSTEMS, APPARATUSES AND METHODS FOR UNMANNED AERIAL VEHICLE

(71) Applicant: COBAN Technologies, Inc., Houston, TX (US)

(72) Inventors: Terry W. Boykin, Katy, TX (US); Stephen M. Bowen, Sugar Land, TX (US)

(73) Assignee: Coban Technologies, Inc., Houston, TX (US)

( * ) Notice: Subject to any disclaimer, the term of this patent is extended or adjusted under 35 U.S.C. 154(b) by 0 days.

(21) Appl. No.: 15/664,187

(22) Filed: Jul. 31, 2017

(65) Prior Publication Data
US 2018/0050800 A1 Feb. 22, 2018

Related U.S. Application Data

(63) Continuation-in-part of application No. 15/438,166, filed on Feb. 21, 2017, now Pat. No. 10,152,859, and
(Continued)

(51) Int. Cl.
*B64C 39/02* (2006.01)
*G06T 7/70* (2017.01)
(Continued)

(52) U.S. Cl.
CPC ............ *B64C 39/024* (2013.01); *B60L 53/14* (2019.02); *B60L 53/60* (2019.02); *B64D 47/08* (2013.01);
(Continued)

(58) Field of Classification Search
CPC ............ B64C 39/024; B64C 2201/127; B64C 2201/141; B64C 2201/146;
(Continued)

(56) References Cited

U.S. PATENT DOCUMENTS

| 4,344,184 A | 8/1982 | Edwards |
| 4,543,665 A | 9/1985 | Sotelo et al. |

(Continued)

FOREIGN PATENT DOCUMENTS

| CN | 2907145 | 5/2007 |
| CN | 101309088 A | 11/2008 |

(Continued)

OTHER PUBLICATIONS

"IEEE 802.1X," Wikipedia, Aug. 23, 2013, 8 pages, available at: http://en.wikipedia.org/w/index.php?title=IEEE_802.1X&oldid=569887090.
(Continued)

*Primary Examiner* — Courtney D Heinle
(74) *Attorney, Agent, or Firm* — Nolte Intellectual Property Law Group

(57) ABSTRACT

A system includes an unmanned aerial vehicle (UAV). The UAV may include a camera device configured to capture at least video data; a receiver configured to receive wireless communications; a transmitter configured to transmit wireless communications; storage linked with the camera device, the receiver, and the transmitter and configured to store data captured by the camera device and wireless communications received by the receiver; and a processor linked with and configured to exercise control over the camera device, the receiver, the transmitter, and the storage. The UAV is configured to dock with a docking station mounted on a vehicle. The UAV may have other components such as a microphone and sensors, and may perform various functions such as surveillance, tracking, warning, and data storage, transmission and relay. Associated methods and docking stations are also disclosed.

30 Claims, 34 Drawing Sheets

Related U.S. Application Data a continuation-in-part of application No. 15/413,205, filed on Jan. 23, 2017, now Pat. No. 10,152,858.

(60) Provisional application No. 62/333,818, filed on May 9, 2016.

(51) Int. Cl.
| | |
|---|---|
| *B60L 53/60* | (2019.01) |
| *B60L 53/14* | (2019.01) |
| *B64D 47/08* | (2006.01) |
| *G06F 3/16* | (2006.01) |
| *G06K 9/00* | (2006.01) |
| *G08B 13/196* | (2006.01) |
| *G10L 25/51* | (2013.01) |
| *H04B 7/185* | (2006.01) |
| *H04N 5/232* | (2006.01) |
| *H04N 5/91* | (2006.01) |
| *H04N 21/2368* | (2011.01) |
| *H04N 21/2743* | (2011.01) |
| *H04N 21/414* | (2011.01) |
| *H04N 21/4223* | (2011.01) |
| *H04N 21/43* | (2011.01) |
| *H04N 21/435* | (2011.01) |
| *H04N 21/439* | (2011.01) |
| *H04N 21/81* | (2011.01) |
| *H04N 21/84* | (2011.01) |
| *H04R 1/40* | (2006.01) |
| *H04R 3/00* | (2006.01) |
| *H04R 29/00* | (2006.01) |
| *H04R 1/02* | (2006.01) |

(52) U.S. Cl.
CPC ......... *G06F 3/165* (2013.01); *G06K 9/00771* (2013.01); *G06T 7/70* (2017.01); *G08B 13/1966* (2013.01); *G08B 13/19621* (2013.01); *G08B 13/19669* (2013.01); *G10L 25/51* (2013.01); *H04B 7/18506* (2013.01); *H04N 5/23206* (2013.01); *H04N 5/23238* (2013.01); *H04N 5/91* (2013.01); *H04N 21/2368* (2013.01); *H04N 21/2743* (2013.01); *H04N 21/41422* (2013.01); *H04N 21/4223* (2013.01); *H04N 21/4302* (2013.01); *H04N 21/435* (2013.01); *H04N 21/4394* (2013.01); *H04N 21/8106* (2013.01); *H04N 21/84* (2013.01); *H04R 1/406* (2013.01); *H04R 3/005* (2013.01); *H04R 29/00* (2013.01); *B64C 2201/127* (2013.01); *B64C 2201/141* (2013.01); *B64C 2201/146* (2013.01); *B64C 2201/208* (2013.01); *G06K 2009/00738* (2013.01); *H04R 1/028* (2013.01); *H04R 2420/07* (2013.01); *H04R 2430/20* (2013.01); *H04R 2430/23* (2013.01)

(58) Field of Classification Search
CPC . B64C 2201/208; G06T 7/70; B60L 11/1816; B60L 11/1838; B60L 53/60; B60L 53/14; B64D 47/08; G10L 25/51; H04B 7/18506; H04N 5/91; H04N 5/23206; H04N 5/23238; H04N 21/2368; H04N 21/2743; H04N 21/41422; H04N 21/4223; H04N 21/4302; H04N 21/435; H04N 21/4394; H04N 21/8106; H04N 21/84; H04R 1/028; H04R 1/406; H04R 3/005; H04R 29/00; H04R 2420/07; H04R 2430/20; H04R 2430/23; G06F 3/165; G06K 9/00771; G06K 2009/00738; G08B 13/19621; G08B 13/1966; G08B 13/19669

See application file for complete search history.

(56) References Cited

U.S. PATENT DOCUMENTS

| | | |
|---|---|---|
| 4,590,614 A | 5/1986 | Erat |
| 4,910,795 A | 3/1990 | McCowen et al. |
| 5,012,335 A | 4/1991 | Cohodar |
| 5,111,289 A | 5/1992 | Lucas et al. |
| 5,408,330 A | 4/1995 | Squicciarini et al. |
| 5,477,397 A | 12/1995 | Naimpally et al. |
| 5,613,032 A | 3/1997 | Cruz et al. |
| 5,724,475 A | 3/1998 | Kirsten |
| 5,815,093 A | 9/1998 | Kikinis |
| 5,841,978 A | 11/1998 | Rhoads |
| 5,862,260 A | 1/1999 | Rhoads |
| 5,926,218 A | 7/1999 | Smith |
| 5,946,343 A | 8/1999 | Schotz et al. |
| 5,970,098 A | 10/1999 | Herzberg |
| 6,002,326 A | 12/1999 | Turner |
| 6,009,229 A | 12/1999 | Kawamura |
| 6,028,528 A | 2/2000 | Lorenzetti et al. |
| 6,038,257 A | 3/2000 | Brusewitz et al. |
| 6,122,403 A | 9/2000 | Rhoads |
| 6,141,611 A | 10/2000 | Mackey et al. |
| 6,163,338 A | 12/2000 | Johnson et al. |
| 6,175,860 B1 | 1/2001 | Gaucher |
| 6,181,711 B1 | 1/2001 | Zhang et al. |
| 6,275,773 B1 | 8/2001 | Lemelson et al. |
| 6,298,290 B1 | 10/2001 | Abe et al. |
| 6,346,965 B1 | 2/2002 | Toh |
| 6,405,112 B1 | 6/2002 | Rayner |
| 6,411,874 B2 | 6/2002 | Morgan et al. |
| 6,421,080 B1 | 7/2002 | Lambert |
| 6,424,820 B1 | 7/2002 | Burdick et al. |
| 6,462,778 B1 | 10/2002 | Abram et al. |
| 6,505,160 B1 | 1/2003 | Levy et al. |
| 6,510,177 B1 | 1/2003 | Bonet et al. |
| 6,518,881 B2 | 2/2003 | Monroe |
| 6,624,611 B2 | 9/2003 | Kirmuss |
| 6,778,814 B2 | 8/2004 | Koike |
| 6,788,338 B1 | 9/2004 | Dinev et al. |
| 6,788,983 B2 | 9/2004 | Zheng |
| 6,789,030 B1 | 9/2004 | Coyle et al. |
| 6,791,922 B2 | 9/2004 | Suzuki |
| 6,825,780 B2 | 11/2004 | Saunders et al. |
| 6,831,556 B1 | 12/2004 | Boykin |
| 7,010,328 B2 | 3/2006 | Kawasaki et al. |
| 7,091,851 B2 | 8/2006 | Mason et al. |
| 7,119,832 B2 | 10/2006 | Blanco et al. |
| 7,120,477 B2 | 10/2006 | Huang |
| 7,155,615 B1 | 12/2006 | Silvester |
| 7,167,519 B2 | 1/2007 | Comaniciu et al. |
| 7,190,882 B2 | 3/2007 | Gammenthaler |
| 7,231,233 B2 | 6/2007 | Gosieski |
| 7,272,179 B2 | 9/2007 | Siemens et al. |
| 7,317,837 B2 | 1/2008 | Yatabe et al. |
| 7,356,473 B2 | 4/2008 | Kates |
| 7,386,219 B2 | 6/2008 | Ishige |
| 7,410,371 B2 | 8/2008 | Shabtai et al. |
| 7,414,587 B2 | 8/2008 | Stanton |
| 7,428,314 B2 | 9/2008 | Henson |
| 7,515,760 B2 | 4/2009 | Sai et al. |
| 7,542,813 B2 | 6/2009 | Nam |
| 7,551,894 B2 | 6/2009 | Gerber et al. |
| 7,554,587 B2 | 6/2009 | Shizukuishi |
| 7,618,260 B2 | 11/2009 | Daniel et al. |
| 7,631,195 B1 | 12/2009 | Yu et al. |
| 7,688,203 B2 | 3/2010 | Rockefeller et al. |
| 7,693,289 B2 | 4/2010 | Stathem et al. |
| 7,768,548 B2 | 8/2010 | Silvernail et al. |
| 7,778,601 B2 | 8/2010 | Seshadri et al. |
| 7,792,189 B2 | 9/2010 | Finizio et al. |
| 7,818,078 B2 | 10/2010 | Iriarte |
| 7,835,530 B2 | 11/2010 | Avigni |

(56) References Cited

U.S. PATENT DOCUMENTS

| | | |
|---|---|---|
| 7,868,912 B2 | 1/2011 | Venetianer et al. |
| 7,877,115 B2 | 1/2011 | Seshadri et al. |
| 7,974,429 B2 | 7/2011 | Tsai |
| 7,995,652 B2 | 8/2011 | Washington |
| 8,068,023 B2 | 11/2011 | Dulin et al. |
| 8,081,214 B2 | 12/2011 | Vanman et al. |
| 8,086,277 B2 | 12/2011 | Ganley et al. |
| 8,121,306 B2 | 2/2012 | Cilia et al. |
| 8,126,276 B2 | 2/2012 | Bolle et al. |
| 8,126,968 B2 | 2/2012 | Rodman et al. |
| 8,139,796 B2 | 3/2012 | Nakashima et al. |
| 8,144,892 B2 | 3/2012 | Shemesh et al. |
| 8,145,134 B2 | 3/2012 | Henry et al. |
| 8,150,089 B2 | 4/2012 | Segawa et al. |
| 8,154,666 B2 | 4/2012 | Mody |
| 8,166,220 B2 | 4/2012 | Ben-Yacov et al. |
| 8,174,577 B2 | 5/2012 | Chou |
| 8,195,145 B2 | 6/2012 | Angelhag |
| 8,208,024 B2 | 6/2012 | Dischinger |
| 8,228,364 B2 | 7/2012 | Cilia |
| 8,230,149 B1 | 7/2012 | Long et al. |
| 8,253,796 B2 | 8/2012 | Renkis |
| 8,254,844 B2 | 8/2012 | Kuffner et al. |
| 8,260,217 B2 | 9/2012 | Chang et al. |
| 8,264,540 B2 | 9/2012 | Chang et al. |
| 8,270,647 B2 | 9/2012 | Crawford et al. |
| 8,289,370 B2 | 10/2012 | Civanlar et al. |
| 8,300,863 B2 | 10/2012 | Knudsen et al. |
| 8,311,549 B2 | 11/2012 | Chang et al. |
| 8,311,983 B2 | 11/2012 | Guzik |
| 8,358,980 B2 | 1/2013 | Tajima et al. |
| 8,380,131 B2 | 2/2013 | Chiang |
| 8,422,944 B2 | 4/2013 | Flygh et al. |
| 8,446,469 B2 | 5/2013 | Blanco et al. |
| 8,457,827 B1 | 6/2013 | Ferguson et al. |
| 8,489,065 B2 | 7/2013 | Green et al. |
| 8,489,151 B2 | 7/2013 | Engelen et al. |
| 8,497,940 B2 | 7/2013 | Green et al. |
| 8,554,145 B2 | 10/2013 | Fehr |
| 8,612,708 B2 | 12/2013 | Drosch |
| 8,630,908 B2 | 1/2014 | Forster |
| 8,661,507 B1 | 2/2014 | Hesselink et al. |
| 8,707,392 B2 | 4/2014 | Birtwhistle et al. |
| 8,731,742 B2 | 5/2014 | Zagorski et al. |
| 8,780,199 B2 | 7/2014 | Mimar |
| 8,781,292 B1 | 7/2014 | Ross et al. |
| 8,849,557 B1 | 9/2014 | Levandowski et al. |
| 9,041,803 B2 | 5/2015 | Chen et al. |
| 9,070,289 B2 * | 6/2015 | Saund .................. G08G 1/054 |
| 9,159,371 B2 | 10/2015 | Ross et al. |
| 9,201,842 B2 | 12/2015 | Plante |
| 9,225,527 B1 | 12/2015 | Chang |
| 9,253,452 B2 | 2/2016 | Ross et al. |
| 9,307,317 B2 | 4/2016 | Chang et al. |
| 9,325,950 B2 | 4/2016 | Haler |
| 9,471,059 B1 * | 10/2016 | Wilkins ............... G05D 1/0016 |
| 9,589,448 B1 * | 3/2017 | Schneider ........... G08B 25/016 |
| 9,665,094 B1 * | 5/2017 | Russell ................... G05D 1/00 |
| 10,074,394 B2 | 9/2018 | Ross et al. |
| 2002/0003571 A1 | 1/2002 | Schofield et al. |
| 2002/0051061 A1 | 5/2002 | Peters et al. |
| 2002/0135679 A1 | 9/2002 | Scaman |
| 2003/0052970 A1 | 3/2003 | Dodds et al. |
| 2003/0080878 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0103140 A1 | 6/2003 | Watkins |
| 2003/0151663 A1 | 8/2003 | Lorenzetti et al. |
| 2003/0197629 A1 | 10/2003 | Saunders et al. |
| 2004/0008255 A1 | 1/2004 | Lewellen |
| 2004/0051793 A1 | 3/2004 | Tecu et al. |
| 2004/0107030 A1 | 6/2004 | Nishira et al. |
| 2004/0146272 A1 | 7/2004 | Kessel et al. |
| 2004/0177253 A1 | 9/2004 | Wu et al. |
| 2005/0007458 A1 | 1/2005 | Benattou |
| 2005/0078195 A1 | 4/2005 | VanWagner |
| 2005/0083404 A1 | 4/2005 | Pierce et al. |
| 2005/0088521 A1 | 4/2005 | Blanco et al. |
| 2005/0122397 A1 | 6/2005 | Henson et al. |
| 2005/0154907 A1 | 7/2005 | Plan et al. |
| 2005/0158031 A1 | 7/2005 | David |
| 2005/0185936 A9 | 8/2005 | Lao et al. |
| 2005/0243171 A1 | 11/2005 | Ross et al. |
| 2005/0286476 A1 | 12/2005 | Crosswy et al. |
| 2006/0072672 A1 | 4/2006 | Holcomb et al. |
| 2006/0077256 A1 | 4/2006 | Silvemail et al. |
| 2006/0078046 A1 | 4/2006 | Lu |
| 2006/0130129 A1 | 6/2006 | Dai et al. |
| 2006/0133476 A1 | 6/2006 | Page et al. |
| 2006/0165386 A1 | 7/2006 | Garoutte |
| 2006/0270465 A1 | 11/2006 | Lee et al. |
| 2006/0274116 A1 | 12/2006 | Wu |
| 2007/0005609 A1 * | 1/2007 | Breed .................. B60N 2/2863 |
| 2007/0064108 A1 | 3/2007 | Haler |
| 2007/0086601 A1 | 4/2007 | Mitchler |
| 2007/0111754 A1 | 5/2007 | Marshall et al. |
| 2007/0124292 A1 | 5/2007 | Kirshenbaum et al. |
| 2007/0217761 A1 | 9/2007 | Chen et al. |
| 2007/0219685 A1 | 9/2007 | Plante |
| 2008/0005472 A1 | 1/2008 | Khalidi et al. |
| 2008/0030782 A1 | 2/2008 | Watanabe |
| 2008/0129825 A1 | 6/2008 | DeAngelis et al. |
| 2008/0165250 A1 | 7/2008 | Ekdahl et al. |
| 2008/0186129 A1 | 8/2008 | Fitzgibbon |
| 2008/0208755 A1 | 8/2008 | Malcolm |
| 2008/0294315 A1 | 11/2008 | Breed |
| 2008/0303903 A1 | 12/2008 | Bentley et al. |
| 2009/0017881 A1 | 1/2009 | Madrigal |
| 2009/0022362 A1 | 1/2009 | Gagvani et al. |
| 2009/0074216 A1 | 3/2009 | Bradford et al. |
| 2009/0076636 A1 | 3/2009 | Bradford et al. |
| 2009/0118896 A1 | 5/2009 | Gustafsson |
| 2009/0195651 A1 | 8/2009 | Leonard et al. |
| 2009/0195655 A1 | 8/2009 | Pandey |
| 2009/0213902 A1 | 8/2009 | Jeng |
| 2010/0026809 A1 | 2/2010 | Curry |
| 2010/0030929 A1 | 2/2010 | Ben-Yacov et al. |
| 2010/0057444 A1 | 3/2010 | Cilia |
| 2010/0081466 A1 | 4/2010 | Mao |
| 2010/0131748 A1 | 5/2010 | Lin |
| 2010/0136944 A1 | 6/2010 | Taylor et al. |
| 2010/0180051 A1 | 7/2010 | Harris |
| 2010/0238009 A1 | 9/2010 | Cook et al. |
| 2010/0274816 A1 | 10/2010 | Guzik |
| 2010/0287545 A1 | 11/2010 | Corbefin |
| 2010/0289648 A1 | 11/2010 | Ree |
| 2010/0302979 A1 | 12/2010 | Reunamäki |
| 2010/0309971 A1 | 12/2010 | Vanman et al. |
| 2011/0016256 A1 | 1/2011 | Hatada |
| 2011/0044605 A1 | 2/2011 | Vanman et al. |
| 2011/0092248 A1 | 4/2011 | Evanitsky |
| 2011/0142156 A1 | 6/2011 | Haartsen |
| 2011/0233078 A1 | 9/2011 | Monaco et al. |
| 2011/0234379 A1 | 9/2011 | Lee |
| 2011/0280143 A1 | 11/2011 | Li et al. |
| 2011/0280413 A1 | 11/2011 | Wu et al. |
| 2011/0299457 A1 | 12/2011 | Green et al. |
| 2012/0014534 A1 | 1/2012 | Bodley et al. |
| 2012/0078397 A1 | 3/2012 | Lee et al. |
| 2012/0083960 A1 | 4/2012 | Zhu et al. |
| 2012/0119894 A1 | 5/2012 | Pandy |
| 2012/0163309 A1 | 6/2012 | Ma et al. |
| 2012/0173577 A1 | 7/2012 | Millar et al. |
| 2012/0266251 A1 | 10/2012 | Birtwhistle et al. |
| 2012/0300081 A1 | 11/2012 | Kim |
| 2012/0307070 A1 | 12/2012 | Pierce |
| 2012/0310394 A1 | 12/2012 | Ei-Hoiydi |
| 2012/0310395 A1 | 12/2012 | Ei-Hoiydi |
| 2013/0114849 A1 | 5/2013 | Pengelly et al. |
| 2013/0135472 A1 | 5/2013 | Wu et al. |

(56) References Cited

U.S. PATENT DOCUMENTS

| | | |
|---|---|---|
| 2013/0163822 A1 | 6/2013 | Chigos et al. |
| 2013/0201884 A1 | 8/2013 | Freda et al. |
| 2013/0218427 A1 | 8/2013 | Mukhopadhyay et al. |
| 2013/0223653 A1 | 8/2013 | Chang |
| 2013/0236160 A1 | 9/2013 | Gentile et al. |
| 2013/0242262 A1 | 9/2013 | Lewis |
| 2013/0251173 A1 | 9/2013 | Ejima et al. |
| 2013/0268357 A1 | 10/2013 | Heath |
| 2013/0287261 A1* | 10/2013 | Lee ............... G08G 1/0145 382/104 |
| 2013/0302758 A1 | 11/2013 | Wright |
| 2013/0339447 A1 | 12/2013 | Ervine |
| 2013/0346660 A1 | 12/2013 | Kwidzinski et al. |
| 2014/0037142 A1 | 2/2014 | Bhanu et al. |
| 2014/0038668 A1 | 2/2014 | Vasavada et al. |
| 2014/0078304 A1 | 3/2014 | Othmer |
| 2014/0085475 A1 | 3/2014 | Bhanu et al. |
| 2014/0092251 A1 | 4/2014 | Troxel |
| 2014/0100891 A1 | 4/2014 | Turner et al. |
| 2014/0114691 A1 | 4/2014 | Pearce |
| 2014/0143545 A1 | 5/2014 | McKeeman et al. |
| 2014/0162598 A1 | 6/2014 | Villa-Real |
| 2014/0184796 A1 | 7/2014 | Klein et al. |
| 2014/0236414 A1 | 8/2014 | Droz et al. |
| 2014/0236472 A1 | 8/2014 | Rosario |
| 2014/0278052 A1 | 9/2014 | Slavin et al. |
| 2014/0280584 A1 | 9/2014 | Ervine |
| 2014/0281498 A1 | 9/2014 | Bransom et al. |
| 2014/0297687 A1 | 10/2014 | Lin |
| 2014/0309849 A1 | 10/2014 | Ricci |
| 2014/0321702 A1 | 10/2014 | Schmalstieg |
| 2014/0355951 A1 | 12/2014 | Tabak |
| 2014/0375807 A1 | 12/2014 | Muetzel et al. |
| 2015/0012825 A1 | 1/2015 | Rezvani et al. |
| 2015/0032535 A1 | 1/2015 | Li et al. |
| 2015/0066349 A1 | 3/2015 | Chan et al. |
| 2015/0084790 A1 | 3/2015 | Arpin et al. |
| 2015/0086175 A1 | 3/2015 | Lorenzetti |
| 2015/0088335 A1 | 3/2015 | Lambert et al. |
| 2015/0103159 A1 | 4/2015 | Shashua et al. |
| 2015/0161483 A1 | 6/2015 | Allen et al. |
| 2015/0211868 A1 | 7/2015 | Matsushita et al. |
| 2015/0266575 A1* | 9/2015 | Borko ............... B64C 39/024 701/3 |
| 2015/0294174 A1 | 10/2015 | Karkowski et al. |
| 2016/0023762 A1* | 1/2016 | Wang ............... B64F 1/00 701/3 |
| 2016/0035391 A1 | 2/2016 | Ross et al. |
| 2016/0042767 A1 | 2/2016 | Araya et al. |
| 2016/0062762 A1 | 3/2016 | Chen et al. |
| 2016/0062992 A1 | 3/2016 | Chen et al. |
| 2016/0063642 A1* | 3/2016 | Luciani ............... G06Q 40/08 705/4 |
| 2016/0064036 A1 | 3/2016 | Chen et al. |
| 2016/0065908 A1 | 3/2016 | Chang et al. |
| 2016/0144788 A1 | 5/2016 | Perrin et al. |
| 2016/0148638 A1 | 5/2016 | Ross et al. |
| 2016/0285492 A1 | 9/2016 | Vembar et al. |
| 2016/0332747 A1 | 11/2016 | Bradlow et al. |
| 2017/0032673 A1 | 2/2017 | Scofield et al. |
| 2017/0053169 A1* | 2/2017 | Cuban ............... H04N 7/185 |
| 2017/0053674 A1 | 2/2017 | Fisher et al. |
| 2017/0059265 A1 | 3/2017 | Winter et al. |
| 2017/0066374 A1 | 3/2017 | Hoye |
| 2017/0076396 A1 | 3/2017 | Sudak |
| 2017/0085829 A1 | 3/2017 | Waniguchi et al. |
| 2017/0113664 A1 | 4/2017 | Nix |
| 2017/0178422 A1 | 6/2017 | Wright |
| 2017/0178423 A1 | 6/2017 | Wright |
| 2017/0193828 A1* | 7/2017 | Holtzman ............... G08G 5/0069 |
| 2017/0253330 A1* | 9/2017 | Saigh ............... B64C 39/024 |
| 2017/0324897 A1* | 11/2017 | Swaminathan ............... H02J 50/10 |

FOREIGN PATENT DOCUMENTS

| | | |
|---|---|---|
| CN | 102355618 A | 2/2012 |
| CN | 102932703 A | 2/2013 |
| CN | 202957973 U | 5/2013 |
| CN | 103617005 A | 3/2014 |
| EP | 1148726 A2 | 10/2001 |
| EP | 1655855 A1 | 5/2006 |
| EP | 2107837 A1 | 10/2009 |
| GB | 2391687 A | 11/2004 |
| JP | 2003150450 A | 5/2003 |
| JP | 2005266934 A | 9/2005 |
| JP | 2009169922 A | 7/2009 |
| JP | 2012058832 A | 3/2012 |
| WO | 1997038526 A1 | 10/1997 |
| WO | 2000013410 A1 | 3/2000 |
| WO | 2000021258 A1 | 4/2000 |
| WO | 2000045587 A2 | 8/2000 |
| WO | 2000072186 A2 | 11/2000 |
| WO | 2002061955 A2 | 8/2002 |
| WO | 2004066590 A2 | 8/2004 |
| WO | 2004111851 A1 | 12/2004 |
| WO | 2005053325 A2 | 6/2005 |
| WO | 2005054997 A2 | 6/2005 |
| WO | 2007114988 A2 | 10/2007 |
| WO | 2009058611 A1 | 5/2009 |
| WO | 2009148374 A1 | 12/2009 |
| WO | 2012001143 A1 | 1/2012 |
| WO | 2012100114 A2 | 7/2012 |
| WO | 2012116123 A2 | 8/2012 |
| WO | 2013020588 A1 | 2/2013 |
| WO | 2013074947 A2 | 5/2013 |
| WO | 2013106740 A2 | 7/2013 |
| WO | 2013107516 A1 | 7/2013 |
| WO | 2013150326 A1 | 10/2013 |
| WO | 2014057496 A2 | 4/2014 |
| WO | 2016033523 A1 | 3/2016 |
| WO | 2016061516 A1 | 4/2016 |
| WO | 2016061525 A1 | 4/2016 |
| WO | 2016061533 A1 | 4/2016 |

OTHER PUBLICATIONS

"Near Field Communication," Wikipedia, Jul. 19, 2014, 8 pages, available at: https://en.wikipedia.org/w/index.php?title=near_field_communication&oldid=617538619.

"Portable Application," Wikipedia, Jun. 26, 2014, 4 pages, available at: http://en.wikipedia.org/w/index.php?title=Portable_application&oldid=614543759.

"Radio-Frequency Identification," Wikipedia, Oct. 18, 2013, 31 pages, available at: http://en.wikipedia.org/w/index.php?title=Radio-frequency_identification&oldid=577711262.

Bell-Northern Research L To., "A Multi-Bid Rate Interframe Movement Compensated Multi mode Coder forVideo Conferencing" (Final Report prepared for DARPA), Apr. 1982, 92 pages, Ottawa, Ontario, Canada.

Chapter 5: "Main Memory," Introduction to Computer Science course, 2004, 20 pages, available at http://www2.cs.ucy.ac.cy/~nicolast/courses/lectures/MainMemory.pdf.

Gregory J. Allen, "The Feasibility of Implementing Video Teleconferencing Systems Aboard Afloat Naval Units" (Master's Thesis, Naval Postgraduate School, Monterey, California), Mar. 1990, 143 pages.

PCT International Search Report and Written Opinion issued in Application No. PCT/US07/63485 dated Feb. 8, 2008, 9 pages.

PCT International Search Report and Written Opinion issued in Application No. PCT/US15/47532 dated Jan. 8, 2016, 22 pages.

Sony Corporation, Digital Still Camera (MVC-CD200/CD300), Operation Manual, 2001, 108 pages, Sony, Japan.

Steve'S Digicams, Kodak Professional DCS 620 Digital Camera, 1999, 11 pages, United States, available at: http://www.steves-digicams.com/dcs620.html.

Xiaoqing Zhu, Eric Setion, Bernd Girod, "Rate Allocation for Multi-Camera Surveillance Over an Ad HocNireless Network,"

(56) References Cited

OTHER PUBLICATIONS 2004, 6 pages, available at http://msw3.stanford.edu/-zhuxq/papers/pcs2004.pdf.

* cited by examiner

SYSTEMS, APPARATUSES AND METHODS FOR UNMANNED AERIAL VEHICLE

CROSS-REFERENCE TO RELATED APPLICATIONS

This application is a Continuation-in-Part of, and claims priority to, U.S. patent application Ser. No. 15/413,205, entitled "Systems, Apparatuses and Methods for Triggering Actions Based on Data Capture and Characterization," filed on Jan. 23, 2017, which in turn claims the benefit of U.S. Provisional Patent Application No. 62/333,818, entitled "Systems, Apparatuses and Methods for Creating, Identifying, Enhancing, and Distributing Evidentiary Data," filed on May 9, 2016. This application is also a Continuation-in-Part of, and claims priority to, U.S. patent application Ser. No. 15/438,166, entitled "Systems, Apparatuses and Methods for Multiplexing and Synchronizing Audio Recordings," filed on Feb. 21, 2017, which in turn claims the benefit of U.S. Provisional Patent Application No. 62/333,818. U.S. patent application Ser. No. 15/413,205, U.S. patent application Ser. No. 15/438,166, and U.S. Provisional Patent Application No. 62/333,818 are hereby incorporated herein by reference in their entirety.

STATEMENT REGARDING FEDERALLY SPONSORED RESEARCH

Not applicable.

TECHNICAL FIELD OF THE INVENTION

This disclosure relates generally to techniques for deploying and using an unmanned aerial vehicle (UAV) for surveying a scene in proximity to a first responder in order to improve situational awareness and evidence collection. More particularly, but not by way of limitation, this disclosure relates to systems and methods for launching, using, and docking a UAV from/with/on a vehicle and other systems of a first responder.

BACKGROUND

First responders, and particularly law enforcement officers (LEDs), face challenges in acquiring and maintaining situational awareness. (For convenience, a LEO may also be referred to as a police officer or the like.) Generally, the concept of situational awareness relates to being aware of one's surroundings and identifying potential threats and dangerous situations. This is particularly important and challenging for law enforcement officers who must be acutely focused on, and engaged in, a task directly before the officer such as subduing an attacker, questioning a suspect, or collecting evidence. In these moments, additional threats can appear from elsewhere in the environment where the officer is not presently focused. These threats could include attackers, dangerous traffic environments, or the presence of weapons.

Frequently, officers are vulnerable at night when an officer's perspective may be impaired by lighting conditions. These challenging lighting conditions can include diminished visual acuity in low light or the contrasts of low ambient light combined with bright artificial lighting (e.g. headlights or streetlights). An officer's situational awareness of the surrounding environment can also be impaired by obstacles such as vehicles, buildings, vegetation, or terrain.

In addition to the officer's personal security, greater situational awareness is beneficial to other police tasks such as evidence collection or following and apprehending suspects. While fixed security cameras may be useful to collect evidence, they are constrained in the view they can capture, and they lack the mobility to go wherever a LEO goes. Recently, officers have begun to use body-worn-cameras (BWCs) to capture on-scene video while on patrol. BWCs are typically worn over an officer's gear at or about chest level. BWCs have typically been limited to a narrow field of view and constrained to the direction in which the officer's torso is oriented. Similarly, officers have traditionally utilized video collection from dash-mounted cameras for evidence collection. These cameras are also limited to a relatively narrow field of view and constrained to the direction (and elevation) of the patrol car.

Traditionally, some police departments have utilized helicopters to provide surveillance of a scene. Helicopters, however, have several disadvantages. First, helicopters are usually not on scene immediately. Typically, a helicopter would only be available in a limited number of circumstances, and only after being requested by an on-scene LEO. Unless the helicopter happened to be loitering very close by, it would take several minutes for a helicopter to be on scene. Furthermore, acquisition costs, fuel costs, maintenance, pilots, training, and other operational expenses make helicopters cost-prohibitive for many law enforcement agencies. A need exists for a lower-cost and more effective surveillance system.

LEOs have various means of technology at their disposal to perform their tasks. However, while technology has provided law enforcement officers powerful tools to perform their jobs, it has also added a level of complexity for officers on patrol. There are many distractions competing for an officer's attention. "Workload" refers to the tasks which an LEO must perform in a short amount of time. For example, an LEO may be driving, observing driving behavior of others, listening to a dispatch radio, talking on the radio to other LEOs, reviewing a Be on Look Out ("BOLO") alert, and manipulating certain auxiliary vehicle controls such as a light bar or spotlight. It is desirable that additional systems not increase an LEO's workload. For that reason, it is desirable that a surveillance system operate autonomously, subject to control/override by the LEO.

SUMMARY

In view of the aforementioned problems and trends, embodiments of the present invention provide systems and methods that may be used for deploying and employing a UAV for performing surveillance of a scene, acting on and issuing pertinent alerts/notifications, and other tasks, e.g., in proximity to a first responder in order to assist the responder and improve situational awareness and evidence collection.

According to a first aspect of the invention, a system includes an unmanned aerial vehicle (UAV), wherein the UAV comprises a camera device configured to capture at least video data; a receiver configured to receive wireless communications; a transmitter configured to transmit wireless communications; storage linked with the camera device, the receiver, and the transmitter and configured to store data captured by the camera device and wireless communications received by the receiver; and a processor linked with and configured to exercise control over the camera device, the receiver, the transmitter, and the storage. The UAV is configured to dock with a docking station mounted on a vehicle.

According to a second aspect of the invention, a system includes a docking station configured for permitting an unmanned aerial vehicle (UAV) to dock at the docking station, wherein the docking station is further configured for mounting onto a vehicle. The docking station comprises a UAV interface (A) configured to establish a wired connection with the UAV when the UAV is docked at the docking station, and (B) operable to permit via the wired connection at least one of: (i) charging of a battery of the UAV, and (ii) downloading of data from the UAV to the docking station.

According to a third aspect of the invention, a method includes analyzing video data and/or audio data captured by a camera device and/or a microphone device, to determine whether designated visual content is present in the video data and/or whether designated audio content is present in the audio data, the camera device and the microphone device disposed on an unmanned aerial vehicle (UAV); and triggering one or more actions based on the determination as to whether the designated visual content is present in the video data and/or the determination as to whether the designated audio content is present in the audio data. The one or more actions comprise at least one of: (A) controlling navigation of the UAV; (B) associating metadata with the video data and/or the audio data; (C) associating metadata with other captured data associated with the video data and/or the audio data; (D) transmitting a wireless communication; (E) issuing an audible alert; (F) controlling operation of the camera device; (G) starting capture of additional data, and (H) determining a location from which the designated audio content originated.

According to a fourth aspect of the invention, a method includes transmitting electric power from a docking station to a battery of an unmanned aerial vehicle (UAV); and downloading, to the docking station, data recorded by the UAV.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 39A and 39B, in accordance with some embodiments of the present disclosure, illustrate an example of a physical interface and an electrical interface between a tether and a UAV, wherein FIG. 39A shows both the tether portion and the UAV portion of both the physical and electrical interfaces, and FIG. 39B shows the tether portion of the physical interface.

NOTATION AND NOMENCLATURE

Figure 1:
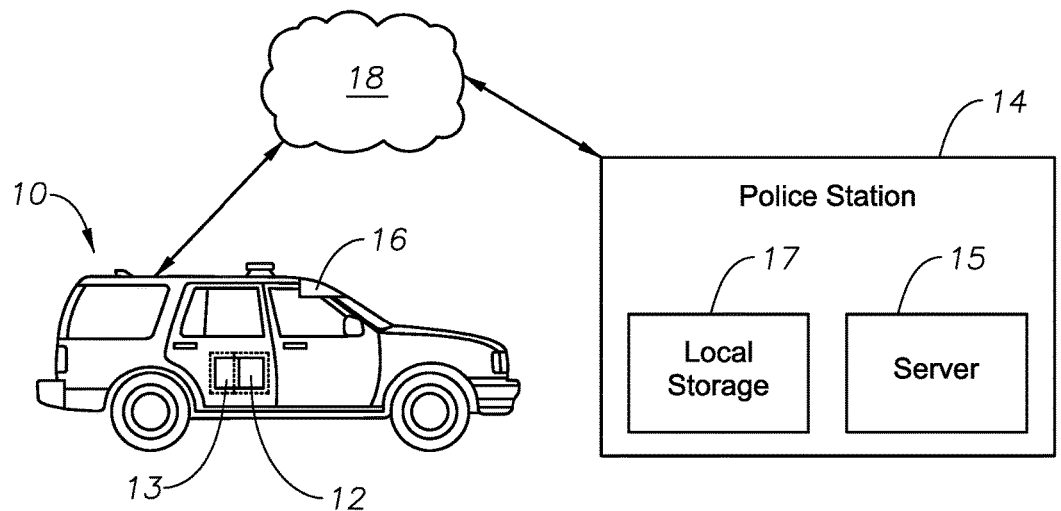
FIG. 1, in accordance with some embodiments of the present disclosure, depicts a communication scheme and data flow/exchange, specifically between a police vehicle with an onboard camera device and a police station.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" (and the like) and "comprising" (and the like) are used in an open-ended fashion, and thus should be interpreted to mean "including, but not limited to . . . ." Also, the term "couple," "coupled," or "linked" is intended to mean either an indirect or direct electrical, mechanical, or wireless connection. Thus, if a first device couples to or is linked to a second device, that connection may be through a direct electrical, mechanical, or wireless connection, or through an indirect electrical, mechanical, or wireless connection via other devices and connections.

As used throughout this disclosure the term "computer" encompasses special purpose microprocessor-based devices such as a digital video surveillance system primarily configured for executing a limited number of applications, and general purpose computers such as laptops, workstations, or servers which may be configured by a user to run any number of off-the-shelf or specially designed software applications. Computer systems and computer devices will generally interact in the same way with elements and aspects of disclosed embodiments. This disclosure also refers to memory or storage devices and storage drives interchangeably. In general, memory or a storage device/drive represents a medium accessible by a computer (via wired or wireless connection) to store data and computer program instructions. It will also be appreciated that use of the term "microprocessor" or "processor" in this disclosure encompasses one or more processors. (The term "microprocessor" may be used to refer to a processor or a microprocessor, and the term "processor" may be used to refer to a processor or a microprocessor.)

The terms "multiplex" and "multiplexing" refer to the incorporation or combination of a specified file, audio track (i.e. audio communication signal), and/or data with another file, audio track, or other data.

The terms "video data" and "visual data" refer to still image data, moving image data, or both still and moving image data, as traditionally understood. Further, the terms "video data" and "visual data" refer to such image data alone, i.e., without audio data and without metadata. The terms "image data" (in contrast to "still image data" and "moving image data") and "audiovisual data" are used to mean the same thing. Specifically, audiovisual data (which may also be called "image data") encompasses not only video or visual data but also audio data and/or metadata. That is, audiovisual data, or image data, may include visual or video data, audio data, metadata, or any combination of these three. The terms "video data" and "visual data" may refer to such data that is a component of audiovisual data, where the audiovisual data may also contain audio data and/or metadata, and on the other hand the terms "video data" and "visual data" may refer to such data that is not a component of audiovisual data. The term "audio data" may refer to such data that is a component of audiovisual data, where the audiovisual data may also contain video/visual data and/or metadata, and on the other hand the term "audio data" may refer to such data that is not a component of audiovisual data. Audiovisual or image data may be compressed using industry standard compression technology (e.g., Motion Picture Expert Group (MPEG) standards, Audio Video Interleave (AVI), etc.) or another proprietary compression or storage format. The terms "camera," "camera device," and the like may refer to devices configured to record or capture audiovisual data and/or to devices that record or capture solely video/visual data (i.e., not audio data and not metadata). Such devices may also be referred to as video recording devices, image capture devices, or the like. Metadata may be included in the files containing the audiovisual (or audio, or video) data or in separate, associated data files, that may be configured in a structured text format such as eXtensible Markup Language (XML).

The term "metadata" refers to information associated with the recording of audio, video, or audiovisual data, or information included in the recording of such data, and metadata may contain information describing attributes associated with one or more acts of actual recording of audio, video, or audiovisual data. That is, the metadata may describe who (e.g., officer ID) or what (e.g., manual or automatic trigger) initiated or performed the recording. The metadata may also describe where the recording was made. For example, location may be obtained using global positioning system (GPS) information. The metadata may also describe why the recording was made (e.g., event tag describing the nature of the subject matter recorded). The metadata may also describe when the recording was made, using timestamp information obtained in association with GPS information or from an internal clock, for example. Metadata may also include information relating to the device(s) used to capture or process information (e.g. a unit serial number, Mac address, etc.). Metadata may also include telemetry or other types of data. From these types of metadata, circumstances that prompted the recording may be inferred and may provide additional information about the recorded information. This metadata may include useful information to correlate recordings from multiple distinct recording systems as disclosed herein. This type of correlation information may assist in many different functions (e.g., query, data retention, chain of custody, precise synchronization and so on). The metadata may also include additional information as described herein, such as: location and size of an object of interest on screen, object's color and confidence level, vehicle make and confidence level, vehicle type and confidence level, license plate number/state (e.g., which of the 50 U.S. states) and confidence level, and number of pedestrians. The terms "license plate number," "license plate character," and the like are all understood to encompass both numbers and other characters on a license plate.

As used throughout this disclosure the term "portable" refers to the ability to be easily carried or moved. The term encompasses, without limitation, wearable devices (i.e., devices that can be worn or carried by a person or an animal).

The term "cloud" refers to an area or environment generally accessible across a communication network (which may or may not be the Internet) that provides shared computer storage and/or processing resources and/or data to computers and other devices. A "cloud" may refer to a public cloud, private cloud, or combination of a public and private cloud (e.g., hybrid cloud). The term "public cloud" generally refers to a cloud storage environment or area that is maintained by an unrelated third party but still has certain security measures in place to ensure that access is only allowed to authorized users. The term "private cloud" generally refers to a cloud storage environment or area that is maintained by a related entity or that is maintained on physical computer resources that are separate from any unrelated users.

The term "global" refers to worldwide and the term "global access" refers to being available or accessible from anywhere in the world via conventional communication means (e.g. the communication network described herein).

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are necessarily described for each embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. It will also be appreciated that the parts and component dimensions of the embodiments disclosed herein may not be drawn to scale.

FIG. 1 depicts an embodiment of this disclosure. A police vehicle 10 is equipped with a computer 12 (which accordingly may be referred to as "vehicle 10 computer 12") linked to a server 15 housed in a police station 14 via a communication network 18 (e.g., Internet, Cloud, radio network, Bluetooth, Wi-Fi, 3G, 4G, LTE, satellite, etc.). The computer 12 is linked with a communications module that includes a (e.g., mobile) receiver 13. The police vehicle 10 may be a car, motorcycle, bicycle, aircraft, watercraft, or other transportation means. The police station 14 may also house a memory storage bank 17 in addition to server 15 for data processing and communications. The vehicle 10 is equipped with one or more camera devices 16 to capture image data from the real world. The camera device(s) 16 may or may not be mobile. The camera device 16 may also be configured with internal memory (e.g. hard disk) and/or coupled to a local or remote storage drive for recordation (in digital or analog format) of the collected information. Suitable camera devices 16 that may be used to implement embodiments of this disclosure include the devices commercially available from COBAN Technologies Inc., in Houston, Tex. (http//www.cobantech.com).

The vehicle 10 computer 12 is configured to access one or more databases (onboard the vehicle 10 or remote via the communication network 18) containing a repository with detailed information and data of existing vehicles, structures, objects, people, etc.). For example, an accessible database may be populated with data regarding parameters, shapes, other information relating to particular individuals, states and cities, vehicle identification parameters/characteristics (makes, models, colors, etc.), weapons data, etc. The database(s) can be updated as often as necessary. It will be appreciated that for law enforcement applications, the computer 12 may have access to databases and data repositories that are not available to the general public. In some embodiments, the police station 14 memory storage bank 17 houses the database accessed by the vehicle 10 computer 12.

In addition to receiving regular communications via the receiver 13, the vehicle computer 12 microprocessor is configured with specific instructions to be carried out upon receipt of certain communications, such as Amber alerts, Silver alerts, etc., (via the communication network 18) from the police station 14 or other designated agencies or systems, such as the FBI, DEA, ATF, etc. For example, law enforcement agencies often issue Be on Look Out ("BOLO") alerts to bring to the attention of law enforcement officers key information regarding an occurrence or activity of high importance. Such alerts typically include a description with some known details and facts relating to a suspect or an item or event of interest. The officer who receives the BOLO alert is intended to keep an eye out for the suspect or item of interest by continually or periodically scanning his environment for the particular descriptive details of the suspect/item identified in the alert.

The present disclosure provides the officer the means to leverage technology to perform this continual monitoring task. Upon receipt of such alerts, the computer 12 microprocessor activates the camera device 16 (if not already activated) to start collecting information and processing the captured image data to determine whether the specific content identified in the alert is present in the captured image data. The computer 12 microprocessor is configured to search the captured image data for the presence of the designated content according to the received alert or communication. For example, the designated content may include information such as: a geographical parameter (e.g. GPS coordinate), location data (street designation, historic site, monument, etc.), vehicle type (SUV, truck, sedan, motorcycle, etc.), license plate number(s), particular objects (traffic lights, street signs, etc.), particular shapes (human, animal, etc.), or a person, e.g., with particular characteristics.

When an object enters the scene, the computer 12 microprocessor performs analytics on the captured image data using an analytics engine that references the accessed database(s), and the analytics include creating snapshots and character scanning, optical character recognition (OCR), pixel scanning, and shape/pattern recognition analytics to analyze and search the captured data for the presence of images matching the designated content. The analytics software may also analyze a scene, tracking identified objects of interest, for example, a police officer's movements. For example, if an officer falls and becomes horizontal for a certain amount of predetermined time, the microprocessor can send an alert to police dispatch through the communication network 18 so that dispatch can call via radio or cell phone to check on the fallen officer. If there is no response from the fallen officer in a predetermined amount of time, dispatch can send support to assist in case of a serious issue. The shape/pattern detection analytics may also be used to detect objects already in or coming into the scene, such as a person walking or running, and also to detect the direction of travel of such objects. It may also be used to detect objects or people approaching the officer based on changes in the detected measured distance between the officer and person/object, and based on this analysis, the microprocessor can send an alert to the officer on the scene (e.g., via radio, 3G/4G wireless networks, or Body Worn Camera (BWC) speaker over Wi-Fi or Bluetooth®). Additional features that may be provided by the analytics engine include automatically marking image data if a crash was detected in the background of the scene, such as a vehicle rolling or flipping. Yet another aspect of the shape/pattern detection features provided by the analytics engine is the determination of a weapon threat. The scene can be scanned for the detection of objects such as potential weapon types like guns, knives, etc., being held in a person's hand or for various threatening stances by a potential adversary such as detecting when the adversary is standing, squatting sideways, running, etc.

The detection/analytics capabilities of the disclosed embodiments also include the ability to scan the entire or specified area of a scene for any movement. For example, if an officer is parked somewhere filling out a report and looking down, if the system detects movement an alert sound or message on a display (e.g. the vehicle display) can notify the officer to be aware. With multiple viewing angles, the alerts can also notify the officer which direction the movement came from by using distinct sounds for each direction such as front, rear, right side or left side, voice notification of the direction and/or notification messages on the display. The system can also notify the officer if it is a vehicle, person, or an unknown object and if the object is moving fast or in a threatening manner. Such embodiments may incorporate the camera/microphone unit 16 described below with respect to FIGS. 6-8.

Figure 2:
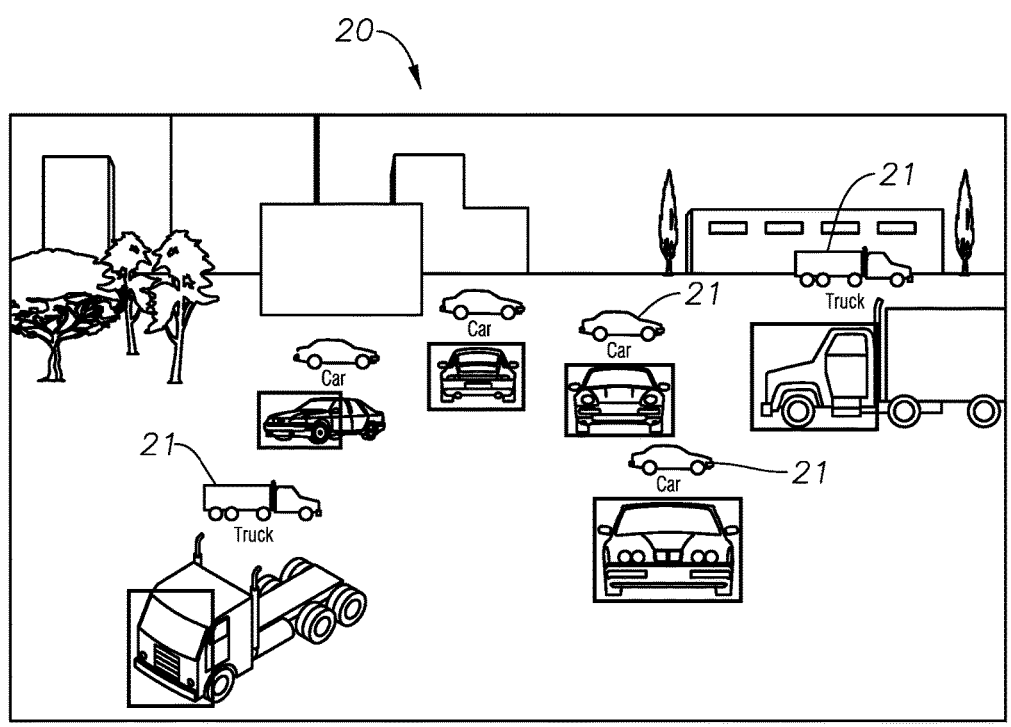
FIG. 2, in accordance with some embodiments of the present disclosure, depicts the recognition of a plurality of "vehicle" shapes in a video frame of visual data.
Figure 3:
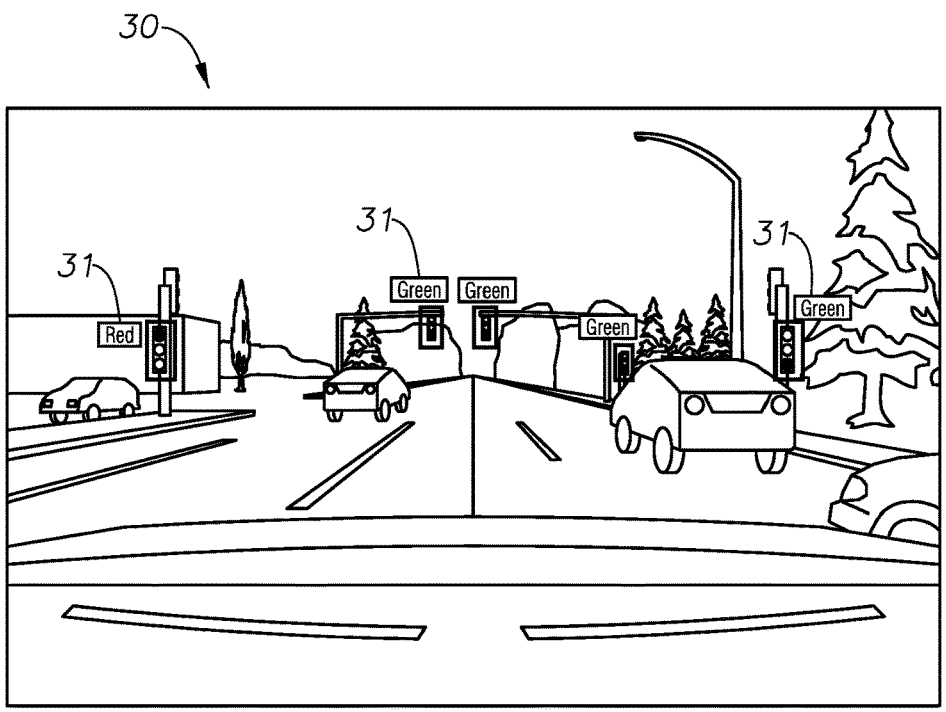
FIG. 3, in accordance with some embodiments of the present disclosure, depicts the recognition of various traffic signal shapes in a video frame of visual data.
Figure 4:
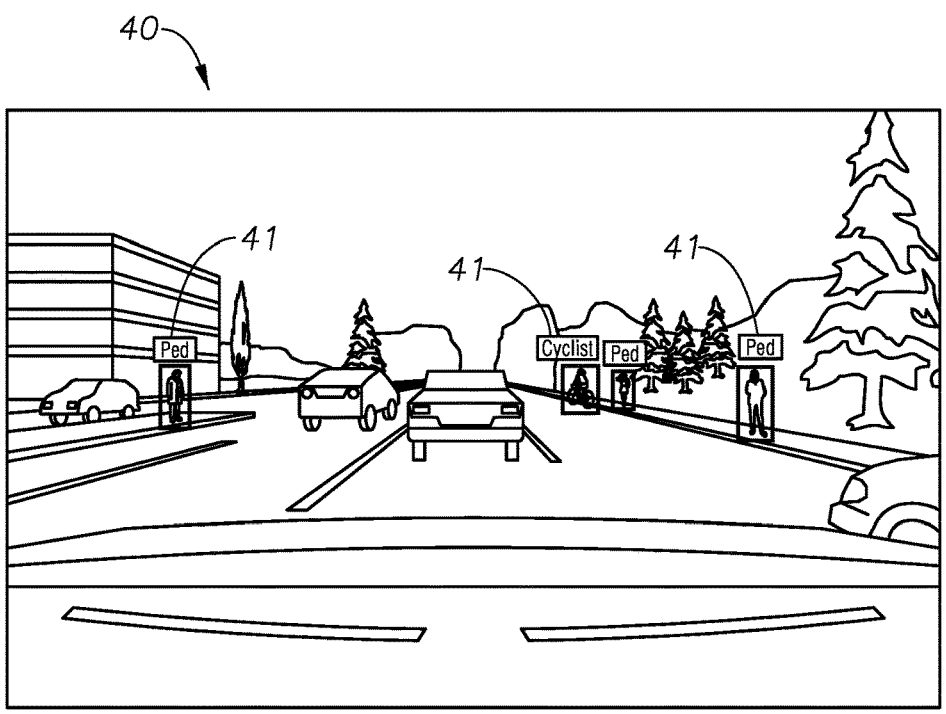
FIG. 4, in accordance with some embodiments of the present disclosure, depicts the recognition of a plurality of "people" shapes in a video frame of visual data.

FIGS. 2-4 depict scenes as processed by the computer 12 microprocessor to detect various shapes and objects according to embodiments of this disclosure. FIG. 2 depicts the recognition of multiple vehicle shapes (shown in and above bounding boxes) 21 in a video frame 20 of the information captured by a camera device 16. This data may be used, e.g., to detect a vehicle of interest. FIG. 3 depicts the recognition of various traffic signal shapes (shown in bounding boxes) 31 in a video frame 30 of the information captured by a camera device 16. The detection of such real-world features can be used to provide additional location data. FIG. 4 depicts the recognition of multiple "people" shapes (shown in bounding boxes) 41 in a video frame 40 of the information captured by a camera device 16. Such data may be used to implement the applications related to officer safety or behavior patterns as disclosed herein.

In some embodiments, once the analytics engine detects a match or near match of the designated content in the captured image data, the analytics engine proceeds to another step of further analyzing the data containing the designated content to detect for the presence of one or more designated details or attributes of or associated with the designated content. For example, a communication may be received by the receiver 13 (such as a BOLO, Amber, or Silver alert), designating the content to search for as a car, and the attributes as a silver Audi A6 sedan. In this case, the analytics engine will scan and search the captured image data for a match of the descriptor, i.e., the car. If the analytics engine detects the presence of a car in the captured image data, the data is then further analyzed to determine if the designated attributes (i.e., vehicle make—Audi, vehicle model—A6, color—silver, vehicle type—sedan) are present in the data. Other possible designated attributes that may be provided in a communication or alert include, for example: state identifiers (e.g., license plate numbers, characters, emblems, mottos, etc.). In some embodiments, the computer 12 microprocessor continually writes all metadata/attribute information associated with the detected designated content to a text or XML file. It will be appreciated that the designated content descriptors and associated designated attributes may comprise an unlimited variety of items and descriptors, as exist in the real world. The embodiments of this disclosure are not to be limited to any specific content or attribute of such content.

In some embodiments, the analysis further includes the determination of a confidence level or criterion for the designated attribute(s). Modern processors provide the ability for high-speed analysis of vast amounts of data. Physical dimensions and parameters of real-world objects represent factual data that can be mathematically measured, analyzed, and compared. For example, the length, width, and height of a vehicle of a given make and model represents factual data. In some embodiments, the analytics engine analysis of the collected data entails a breakdown of the captured images into data points or pixels that are then analyzed to determine respective spacing and dimensions, which can then be compared to the real-world parameters in the database library of existing items. For instance, continuing with the silver Audi A6 example, once the analytics engine detects a vehicle in the image data, it then performs further analysis to detect for the color silver based on a pixel hue analysis, it may then continue the analysis to mathematically define the dimensions of the detected vehicle for comparison against the actual Audi A6's dimension parameters stored in the database. If a match or near match is found between the dimensions of the detected car and one of the A6 models in the library, the engine then calculates a probability factor representing a confidence level for the match and compares that to a criterion for equivalence or matching of the detected object and the object stored in the database. If, for example, the criterion for equivalence has been set (e.g., by a user via the software) at 95% or greater for vehicle data matching parameters and the calculated probability factor equaled or exceeded 95%, the analytics engine would determine a positive result and proceed with triggering an action as described for the disclosed embodiments.

Different criteria for equivalence can be set for different items. For example, the criterion of equivalence for an affirmative match result for a license plate number may be set at 55% or better, to allow for instances when only a partial plate number is decipherable from the captured image. In the case of attributes for which there are no standard items (for comparison against the detected item for purposes of determining equivalence) stored in the database, the analytics engine can bypass this database query and perform a character-recognition analysis. However, for law enforcement applications, the database available to officers will likely contain all available information relating to data such as a license plate number. In some embodiments, the criterion of equivalence for an affirmative match result may be based on a probability factor from a combination of analyzed attributes.

In some embodiments, the analytics to determine a confidence level or criterion for the designated attribute(s) are based on a deep learning algorithm. The computer 12 may be configured with software providing a deep learning analytics engine. Defined shapes and movement rules, multiple images of vehicle types, make, model, etc., can be input and stored in the deep learning engine at different viewing angles, distances, various lighting conditions, etc. The captured image data can be compared against the engine contents to provide a data output with a percentage of confidence of accuracy for its attributes to trigger an action as described herein. The analytics and rules can be applied to any object (e.g., pedestrians, animals, street signs, etc.).

In some embodiments, the analytics for recognition and detection of the designated content is distributed among the vehicle 10 computer 12 and one or more remote computers (e.g. the server 15 in the police station 14). In such embodiments, the server 15 may be configured to generate a neural net object model for the vehicle 10 computer 12. The vehicle 10 computer 12 can also be configured to use a separate neural network to instantly achieve multiple object recognition as described herein. The vehicle 10 computer 12 and the remote computer(s) can communicate and exchange data via the communication network 18. In yet other embodiments, the vehicle 10 computer 12 and/or the remote computer(s) (e.g. server 15) may be configured with artificial intelligence (AI) software providing the system the ability to learn, to further increase the accuracy of object recognition. In some embodiments, the analytics engine is configured to detect unknown objects (e.g. a modified vehicle). This data can be locally stored for later upload or immediately transmitted to another location (e.g. to server 15) for verification and/or classification to aid in the training of detection of objects by the detection engine. With AI implementations, this type of classification can be done in or near real-time on the edge device such as an in-car video unit or a wearable device such as a body worn camera. In this description, an "edge" device generally refers to a device used or located at a point of interest. Thus, for the disclosed embodiments, an edge device is considered an on-scene device. It will be appreciated by those skilled in the art that embodiments of this disclosure may be implemented using conventional software platforms and coding configured to perform the techniques as disclosed herein.

Once the analytics engine determines that the designated attribute(s) is/are present in the captured image data, the microprocessor triggers an action. The triggered action may include:

(i) Providing an alert—The officer may be given a visual and/or audible alert on his vehicle display that a positive match has been detected. An alert may also be sent via the communication network to the police station or other locations. Alert notifications and/or images and metadata may also be sent to any other vehicle or officer that may be nearby or heading in the general direction of the detected object of interest.

(ii) Displaying an image—A video or still image of the detected content may be displayed on the vehicle display. A snapshot (such as video frame 20, 30 or 40) can be displayed, highlighting or putting a bounding box (such as 21, 31, or 41) around the object detected, and its movements can be tracked on the display in real-time or after the fact. Captured image data may also be transmitted via the communication network for viewing on a smart phone, tablet, PC, or the like (e.g., of another officer in another location in the field or at a remote location, e.g., at central headquarters).

(iii) Activating data recording—An onboard storage device may start saving the information being captured by the camera device. Other camera devices in the vehicle can be triggered to start recording. The captured information may also be transmitted concurrently via the communication network to be stored at the police station or another location. The triggered action may also include the activation of other camera devices worn by officers or within other law enforcement vehicles within a set perimeter of the detected item of interest.

(iv) Communicating information relating to the detected content—The captured information (e.g., data files and/or associated metadata files) may be transmitted via the communication network to the police station or other locations (e.g., other police officers in the area). Information such as location (latitude/longitude), direction of travel (e.g., of a vehicle of interest), speed and time of the scan, a snapshot, shape detection attributes, etc., can be transmitted to police dispatch or other remote location. For example, associated metadata and/or a snapshot can be transmitted to a remote location or to any or all other computer devices or members/users in the group or to a dispatch/command center.

(v) Activating a hardware function—In addition to or instead of the activation of data recording (iii, above), equipment or systems may be activated depending on the detected content (e.g., automatic activation of the vehicle's light bar if a crash scene is detected). Live video/audio streaming may also be activated.

(vi) Activating a software function—A voice-to-text program may be activated to produce a text file of audio captured in association with the captured video. A voice keyword-based program may be activated to trigger other actions (e.g., if a key word is detected such as "gun". "shots fired", or "kill", video can be marked and sent with an alert to the police station or other location or device to inform other officers).

(vii) Extracting and storing content of the obtained information—Other law enforcement agencies or designated systems may be granted access, via the communication network, to download and store the information captured by the camera device.

(viii) Production of a text file—In some embodiments, audio captured in association with the captured video by a mobile audio recorder in the vehicle or worn by the officer can be converted to text (in real-time or from recorded data). The conversion process can output a separate text file for viewing on the vehicle display, and may also transmit the data via the communication network for viewing on a smart phone, tablet, PC, or at a remote location. One use of the text file can be for performing a keyword search during an active or previously recorded event. In some embodiments where video and metadata is continually recorded, all objects or specifically defined objects can be scanned and the metadata associated with the detected objects of interest can be written to a text/xml file or other small database. Metadata captured in the image data or associated with the video data may also be scanned separately, in real-time or from prerecorded metadata. In some embodiments, the vehicle 10 computer 12 may also be configured to mark start and end points in the captured image data associated with scanned metadata. In other embodiments, the vehicle 10 computer 12 may also be configured to isolate images or produce snapshots or video clips associated with scanned metadata. All of this data can be stored locally for a predetermined time or on a FIFO basis; it can also be uploaded to a remote location continually or in configurable intervals and packet sizes. This data can also be stored on a remote server (as described below with reference to a Global Data Access System).

Figure 5:
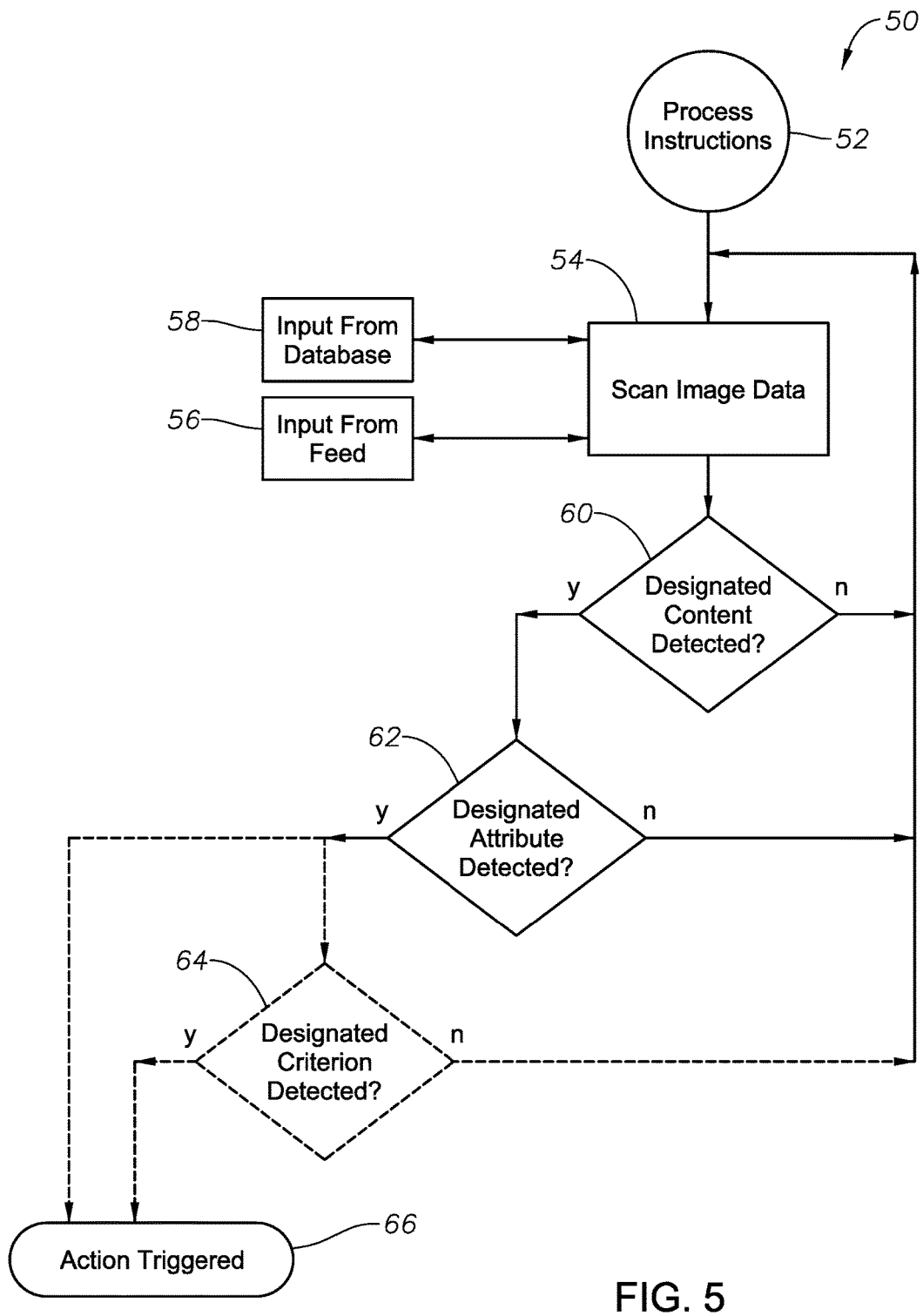
FIG. 5, in accordance with some embodiments of the present disclosure, depicts a processing flow chart for an analytics engine.

FIG. 5 depicts a processing flow chart for an analytics engine 50 embodiment in accordance with this disclosure. As described above, the receiver 13 in the vehicle 10 receives the communication indicating the designated content to search for, along with the known attribute(s) associated with the designated content. At module 52, the vehicle computer 12 processes the instructions and the microprocessor commences the scanning analysis. At module 54, the analysis entails a data feed 56 of the image data from the linked camera device(s) 16 to the computer 12 microprocessor. The data feed 56 from the camera device(s) 16 to the computer 12 may be wireless or via cabling (e.g. using a wired onboard vehicle camera). In some embodiments, the computer 12 may be configured to automatically activate the linked mobile camera device(s) 16 to start collecting image data, if the device(s) is/are not already activated. Module 54 also comprises linking with a database 58 to perform the analysis of the collected image data. As previously described, the database 58 may be resident in the vehicle 10 computer 12 or remotely located (e.g. the police station 14 memory storage bank 17) and accessed via the communication network 18. At module 60, the analysis continues with a scan of the image data captured by the camera device(s) 16 to detect for the presence of the designated content. If the designated content is not detected in the captured image data, module 60 entails a return to module 54 and the analysis continues with the scanning of additional image data collected by the camera device(s) 16. If the designated content is detected, the flow proceeds with analysis at module 62, where the image data containing the detected designated content is further analyzed to determine if the data comprises the designated attribute(s) conveyed in the communication. If the designated attribute(s) is/are not detected, module 62 entails a return to module 54 and the analysis continues with the scanning of additional image data collected by the camera device(s). If the designated attribute(s) is/are detected, the flow proceeds directly to module 66, or in some embodiments to an additional (optional) module 64. If proceeding directly from module 62 to module 66, the computer 12 microprocessor triggers an action as previously described. With embodiments comprising optional module 64, the image data containing the detected designated attribute(s) is further analyzed to determine if the attribute(s) meets the designated criterion, as described above. If the attribute(s) meets the designated criterion, the flow proceeds to module 66 and an action is triggered. If the attribute(s) does not meet the designated criterion, module 64 entails a return to module 54 and the analysis continues with the scanning of additional image data collected by the camera device(s) 16. The computer 12 can process multiple searches relating to multiple incoming communications, performing the respective scanning/analysis on the captured image data. The collection and processing of image data may be stopped and started as desired by a user (e.g. an officer in the vehicle) entering a command (e.g., a voice command or a command that is typed/keyed/entered by touchpad) or pushing a button on the computer 12 or on a BWC 29, or by another incoming communication (e.g. from the alert dispatching source) instructing the computer 12 to cancel or start/resume the particular search/analysis. When an alert is cleared or cancelled, the computer 12 resumes scanning all available image data captured in the scene until another communication is received to trigger another action (e.g. another alert) or the officer manually enters a different instruction. The computer 12 may also be configured to automatically clear an alert after running a scan without a match for a predetermined time or when the vehicle 10 is housed or turned off (e.g. when a patrol car is parked at the police station at the end of a shift). It will be appreciated by those skilled in the art that embodiments of the analytics engine disclosed herein may be implemented using any suitable computer platforms and coding as known in the art.

A benefit of the functionality provided by the disclosed embodiments is that the camera device and detection/analytics engine may find an object or person of interest that a police officer didn't notice. For example, a police officer may be driving down the street when a BOLO is issued for the silver Audi sedan. The officer may be focusing on driving or performing some other activity/task and may not see the item of interest, in this case the disclosed systems can alert multiple officers to be aware of the potential object of interest and thereby improve the chances for detection. This can also increase safety and efficiency for the officer. Officer efficiency may also be improved with embodiments wherein the camera device and detection/analytics engine are configured to detect expired vehicle tags. Once the analytics engine makes such a determination, the microprocessor can trigger an action as described above (e.g., flash an alert on the vehicle display, issue a notice to the police station 14, record the information as metadata, etc.). Moreover, the disclosed embodiments provide the means to perform the described detection and analytics techniques in real-time, as image data is being captured.

Figure 6:
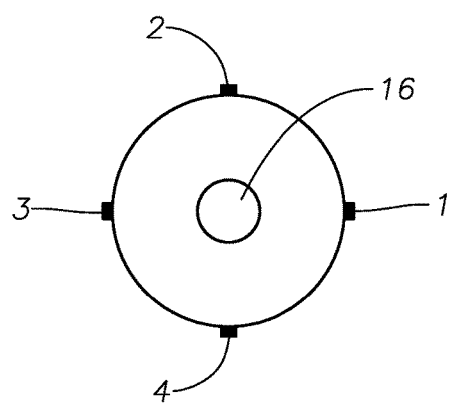
FIG. 6, in accordance with some embodiments of the present disclosure, depicts a top view of a device that may be installed on top of a police vehicle, featuring at least one 360-degree spherical camera.
Figure 7:
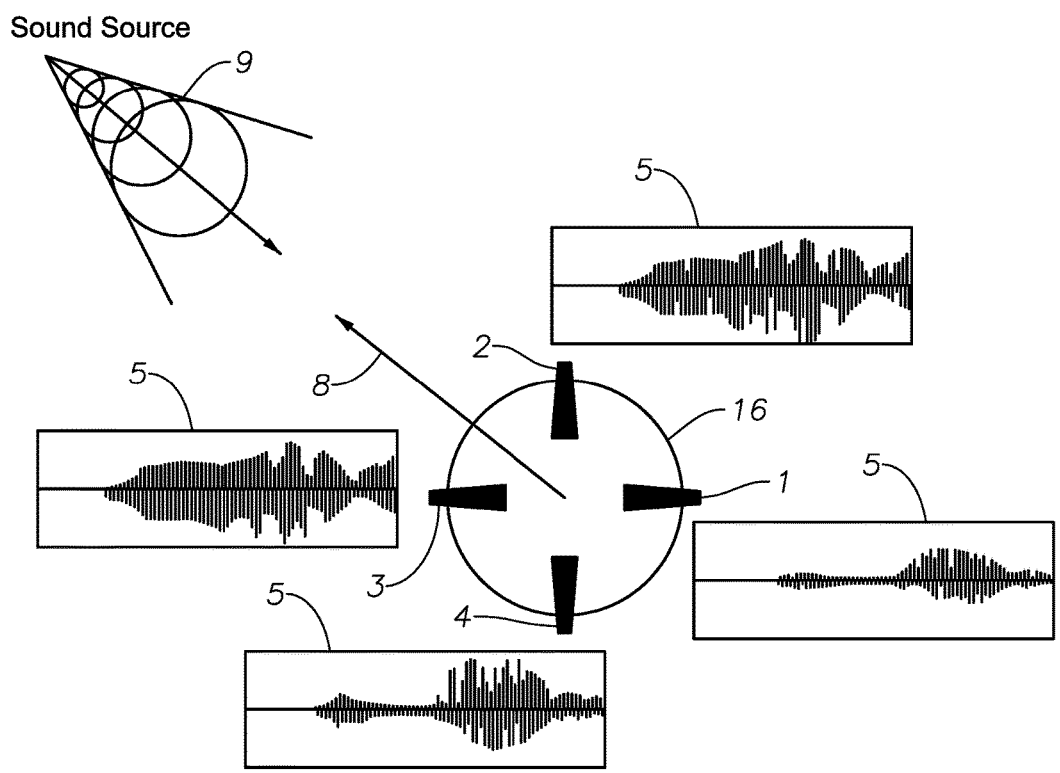
FIG. 7, in accordance with some embodiments of the present disclosure, depicts a bottom view of the device of FIG. 6, receiving sound data, and various pictorial depictions of sound data that may be collected.
Figure 8:
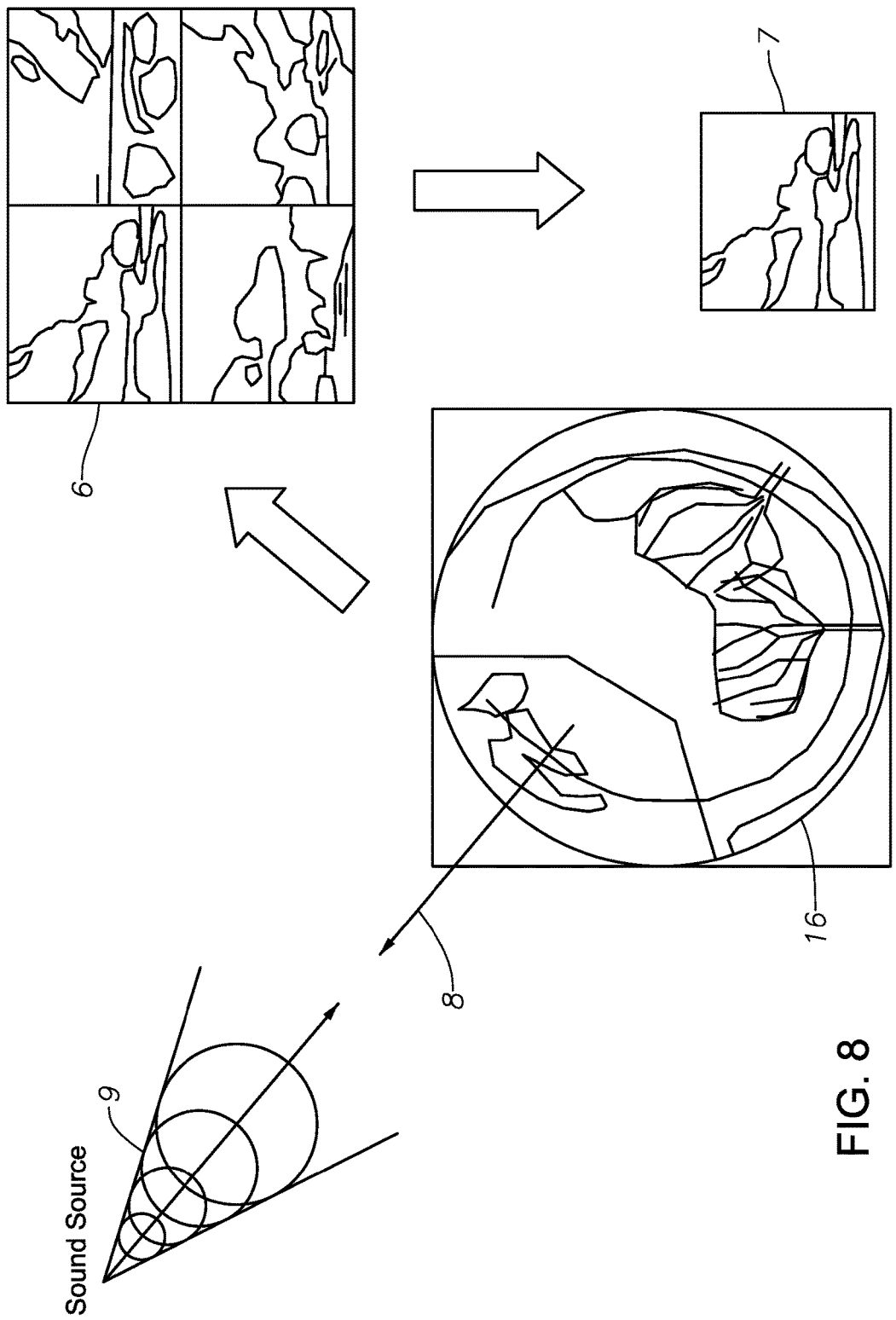
FIG. 8, in accordance with some embodiments of the present disclosure, depicts the transfer of video and pictorial data from the spherical camera of the device of FIG. 6, including the receiving of video/pictorial data, and various exemplary depictions of visual data that may be collected and subsequently isolated.
Figure 9:
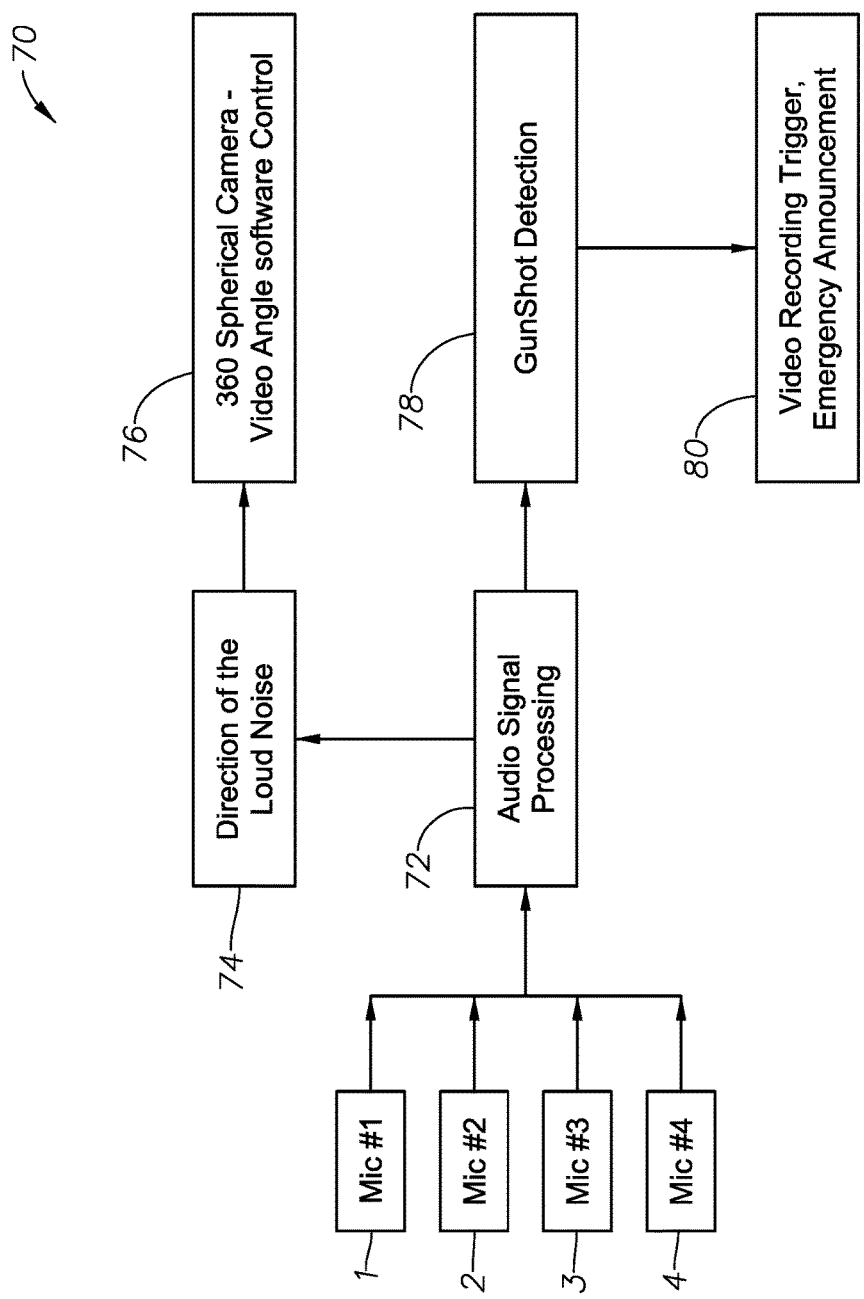
FIG. 9, in accordance with some embodiments of the present disclosure, is a flow schematic of sound data that may be collected from one or more microphones, that is subsequently processed (audio signal processing) to isolate parameters of interest (for example, direction of a loud noise or gunshot detection), and subsequent related action(s) e.g. video recording trigger/emergency announcement in response to gunshot detection or changes to a 360-degree spherical camera via video angle software in order to determine the direction of a loud noise.

Turning to FIG. 6, an overhead view of a camera device 16 comprising a spherical camera that may be used with implementations of this disclosure is depicted. The camera device 16 is configured for roof-mounting on a vehicle 10 and provides a 360-degree view. FIG. 7 depicts the bottom view of the spherical camera device 16, showing (more fully than in FIG. 6) a series of directional microphones (1-4). With the directional microphones (1-4), the approximate direction 8 of sounds emanating from a sound source 9 can be detected. With the combined camera/microphone unit 16, the computer 12 microprocessor can be configured to automatically mark points in the captured video data at which specific sounds 5 are detected (as depicted in FIG. 7) and take snapshots 6 and/or create a video event clip 7 of a predetermined length pre- and post-event (as depicted in FIG. 8). In some embodiments, the camera device 16 may be configured to continually record captured video data in a circular or "failsafe" buffer that can be flushed or transferred for storage to memory. FIG. 9 depicts a schematic flow chart 70 of a spherical camera device 16 as used in combination with the microphones (1-4) to capture and process the detection of gun shots. At step 72, the audio data captured by the microphones (1-4) is processed to determine the approximate direction of the sound source 74. At step 76, the spherical camera device 16 software control adjusts the camera to capture image data in the approximate direction of the sound source. If the audio processing determines that the sound source was a gunshot 78, a gunshot detection signal is sent to trigger the camera device(s) 16 to start recording and an emergency announcement, or actionable notification, or request, is sent via the communication network to the police station 14 or to other nearby devices (step 80). Other embodiments of this disclosure may be implemented with other types of camera devices 16 besides a spherical camera (e.g., using a conventional multi-image sensor camera), to provide the desired image clarity and depth of field. The embodiments of this disclosure may be implemented to incorporate in the described recognition analytics any conventional or future developed sensors providing other types of data besides image/video/audio data (e.g. distance measuring sensors, etc.).

Figure 10:
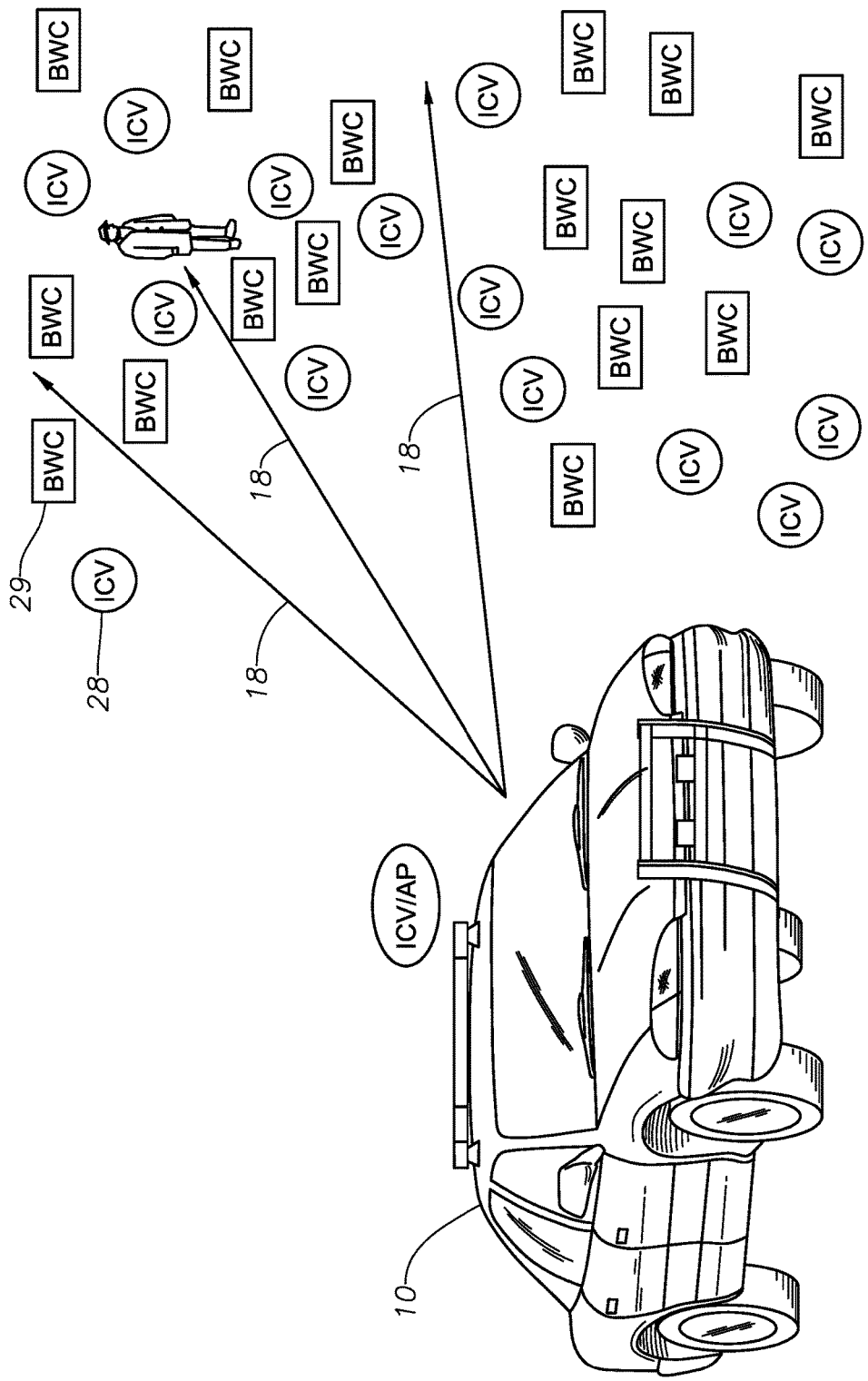
FIG. 10, in accordance with some embodiments of the present disclosure, depicts data flow, specifically video data flow/exchange between a police vehicle with In Car Video (ICV) and Access Point (AP), that is further remotely controlling and exchanging information with various Body Worn Cameras (BWC) and other ICV units in other vehicles.

In some embodiments, the vehicle 10 computer 12 microprocessor may also be configured with instructions to send out a communication (via the communication network 18) to activate the camera devices 16 in other law enforcement vehicles (e.g., in-car video (ICV) units 28), and the BWCs 29 worn by officers, within a set range or perimeter of where the object of interest (corresponding to the designated content) was detected, as depicted by the arrows in FIG. 10. With this embodiment, all the law enforcement vehicles with camera devices 16 and officers with BWCs 29 on the street within the set range or perimeter are turned into scanners, all activated to search for and capture image data relating to the designated content or object of interest. Other embodiments entail the use of an autonomous vehicle 10 to scan the scene for the object attributes in a received communication (e.g. a BOLO alert) and to send a notification to officers nearby and/or to a police dispatch center. The vehicle 10 can track the detected vehicle or person providing real-time or historical location data updates to the officers responding and/or to a police dispatch center. This could help the officers more accurately pursue the vehicle or person of interest.

As previously mentioned, BWCs can be used with implementations of the embodiments of this disclosure. Suitable BWCs include the devices commercially available from COBAN Technologies Inc., in Houston, Tex. (http//www-.cobantech.com). The BWCs are worn by officers on patrol. The BWC can be conveniently clipped to the officer's uniform or body gear as desired. BWCs may also be configured with a microphone to collect audio data. The collected audio data may be transmitted together with the captured image/video and/or metadata to another device (e.g., located in a police car, at a police station, on another police officer, or in the cloud) as described herein. It will be appreciated by those skilled in the art that various conventional BWC devices and storage units may be used to implement embodiments of this disclosure. Similarly, various wireless technologies may also be used to implement the embodiments as known in the art. It will also be appreciated that as technology improves, smaller and lower power camera and transmission devices may become available which may further improve performance and run time. Such devices may easily be integrated into the embodiments of this disclosure.

In some embodiments, the vehicle 10 computer 12 may be configured to perform wireless networked or distributed analytics processing. As previously described, in some embodiments the vehicle 10 computer 12 is configured to access an onboard database and perform the disclosed analytics processing as a stand-alone unit. In other embodiments, the vehicle 10 computer 12 may be configured to communicate via the communication network 18 (e.g. using the cloud) with other computers (e.g. remote ICV units 28 and BWCs 29) to perform a distributed and shared image data analysis. With reference to FIG. 10, the vehicle 10 computer 12 microprocessor may issue a communication to the ICV units 28 in police vehicles and BWCs 29 within a set range, to not only activate the respective camera devices, but also including selected image data information to activate the remote devices to perform a local analysis. For example, if an alert is received by the vehicle 10 computer 12 describing a crime involving suspects in multiple vehicles and the computer detects one of the vehicles, the microprocessor sends a communication (in real-time) to all other units/officers within the set range, including the captured image data or components of the captured image data (e.g. metadata alone; each of video data, audio data, and metadata is considered a component of the captured image data). The ICVs 28 and BWCs 29 receiving the information can then focus on scanning to detect for the other vehicles described in the alert. Similarly, image data captured by the ICVs 28 and BWCs 29 can be relayed back to the vehicle 10 computer 12 via the communication network 18 for hubbed real-time processing. In this manner, the ICVs 28 and BWCs 29 are used to form a virtual net providing real-time processing and communication. The communication network 18 (e.g. the cloud) provides a relay data point for all ICVs 28, BWCs 29, vehicles 10, and any other wirelessly linked devices or systems in the vicinity where events of interest are occurring, as well as a relay data point to or from remote locations. This network provides for vehicle-to-vehicle and system-to-system distributed communications. The communication loop in such embodiments may also include the police station, dispatch headquarters, and other law enforcement agencies.

In some embodiments, the ICV 28 is configured to detect and take snapshots, or receive snapshots from a wearable device (e.g. BWC 29), of a person's face to run facial recognition locally or by transmitting the data to a remote server (e.g. server 15) for further analytics. This further enhances the BOLO capabilities. For example, a BOLO may include an alert to look for a white male, wearing a black jacket, having an age in the mid-twenties, etc. The detection of attributes is also enhanced, such as detection of approximate age, gender, and race. The use of AI software and other advanced software applications may provide additional benefits. Some embodiments may also be configured to receive video data via transmission such as Real Time Streaming Protocol (RTSP) streaming for detection and analytics of attributes and facial recognition. Some embodiments of this disclosure provide for selective search and export of the captured information. In one such embodiment, an authorized user linked to the computer 12 microprocessor via the communication network 18 (e.g., using a smart phone, laptop computer, tablet, etc.) can analyze the information according to specific criteria established by the user. For example, a user can select or draw an area on a map to display vehicles in a given region, along with their associated data such as specific location data/time/number of recorded events/event type/duration, license plate data, vehicle type, shape, color etc. If an event or specific data is of interest, the user can select an option to send a request to any or all vehicle computers 12 to scan their storage drives, that are continuously recording, for the desired information and send back a response with the search results or to retrieve the designated data with time markers of start and stop points to export video, snapshots, or metadata. This embodiment can be implemented for a local or global application.

Figure 11:
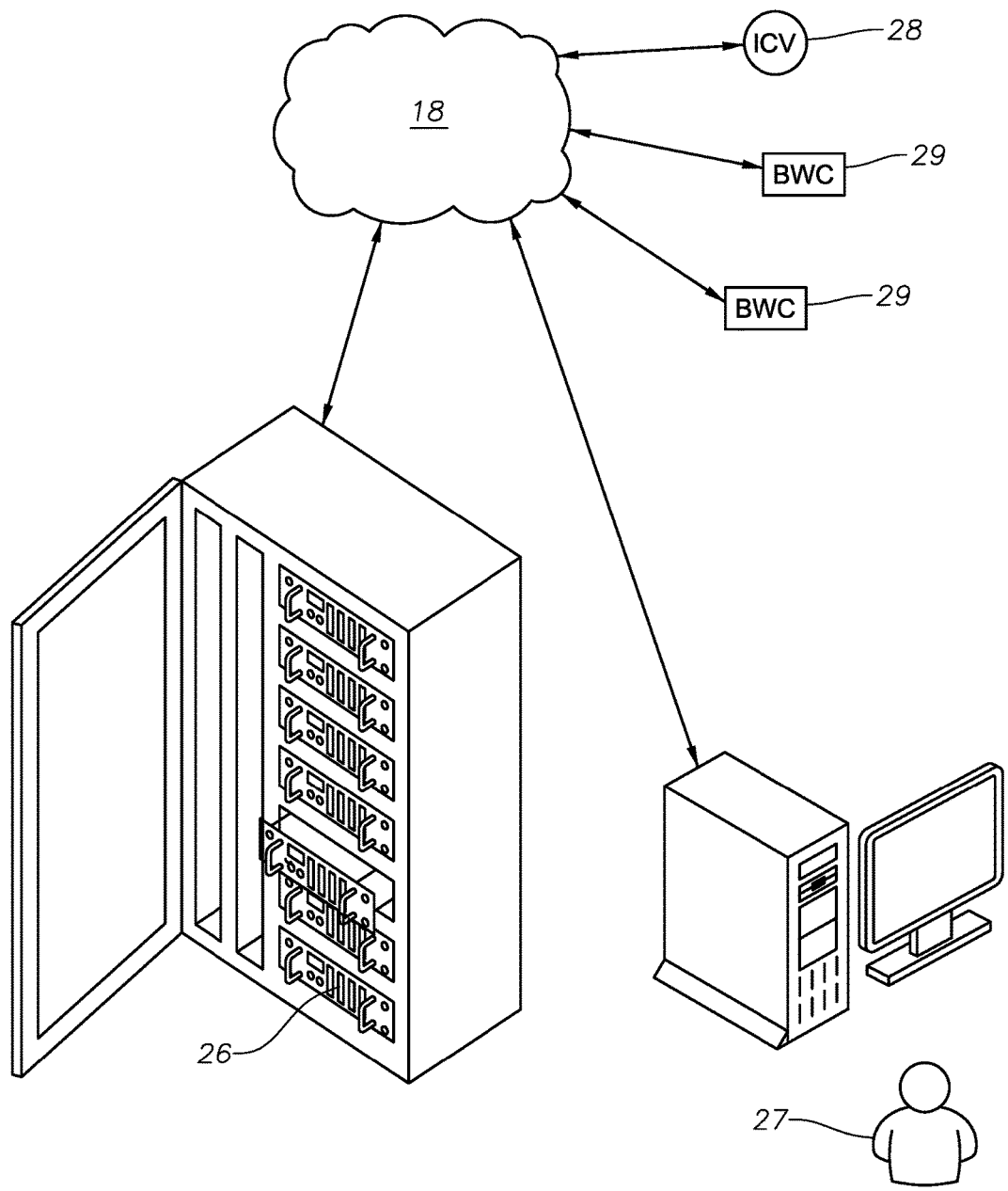
FIG. 11, in accordance with some embodiments of the present disclosure, depicts a Global Data Access System configuration.

FIG. 11 depicts another embodiment of this disclosure. A computer server 26 is linked to one or more camera devices 16 (e.g. ICV units 28 and BWCs 29) via the communication network 18. Some embodiments may also incorporate fixed camera devices 16 (e.g. cameras on buildings, light poles, etc.). This embodiment provides for shared Global Data Access and distribution, allowing authorized users 27 to access the server 26 via the communication network 18. With this embodiment, the server 26 provides a centralized repository for the specific data and information of interest to a user group (e.g. law enforcement agencies). Using such a globally shared server, authorized users 27 can send data of interest to the server 26 for storage (e.g., in local memory or linked data storage). In some embodiments, the server 26 may be partially or entirely implemented as a virtual server in the cloud. Such cloud computing embodiments offer flexibility of scalability. The server 26 is also configured to analyze the data sent to it (encompassing audio, video, metadata, and/or any other available telemetry) by an authorized user in the group, or captured by the linked mobile device(s) 16, to analyze and search for the presence of designated content and designated attributes in the data, as described herein. The server 26 may also be configured to perform full or partial analytics on the captured image data and the data sent by authorized users. The data stored in the server 26 could remain available for a defined period to allow authorized users access to the data. For example, if a BOLO alert is issued an application on the server 26 can scan the stored data (including stored metadata) and if an attribute of interest is detected the application can generate a request to be sent to the linked camera device 16 that captured the detected image data to mark configurable in (start) and out (stop) points of the recorded video, audio, metadata, etc. The marked image data can also be exported and/or uploaded or a live stream can be started if the camera device is still near the location where it originally captured the data. If high importance image data is detected, the server 26 can send alerts or emails to users of the Global Data Access System. For example, if an agency (police department, FBI, DEA, ATF, etc.) is looking for a vehicle having a specific color and make or license plate, an authorized user can enter this information as designated content/attributes in to the Global Data Access System server 26 (e.g., using a smartphone, desktop computer, laptop computer, or tablet device). The server 26 then sends a command, via the communication network 18, to any linked camera device 16 to analyze its recorded image data to search for matching audio, video, and/or metadata, as the case may be. If a match or near match is found, the device that found the match or near match notifies the server 26, and the detected matching or near matching image data, or components thereof (e.g. metadata), are then uploaded and saved (e.g. to local memory) by the server 26. In some embodiments, the server 26 may also be configured to send a notice (e.g. via email) to the searching agency or others, regarding the detected data. In some embodiments, the server 26 may be configured to perform the image data analysis on real-time image data being collected by any linked camera devices. The server 26 may also be configured to analyze the data stored in memory and/or captured by the camera device(s) 16 according to criteria established by an authorized user 27 having access to the server 26 via the communication network 18 (e.g. in response to a BOLO alert).

Figure 12:
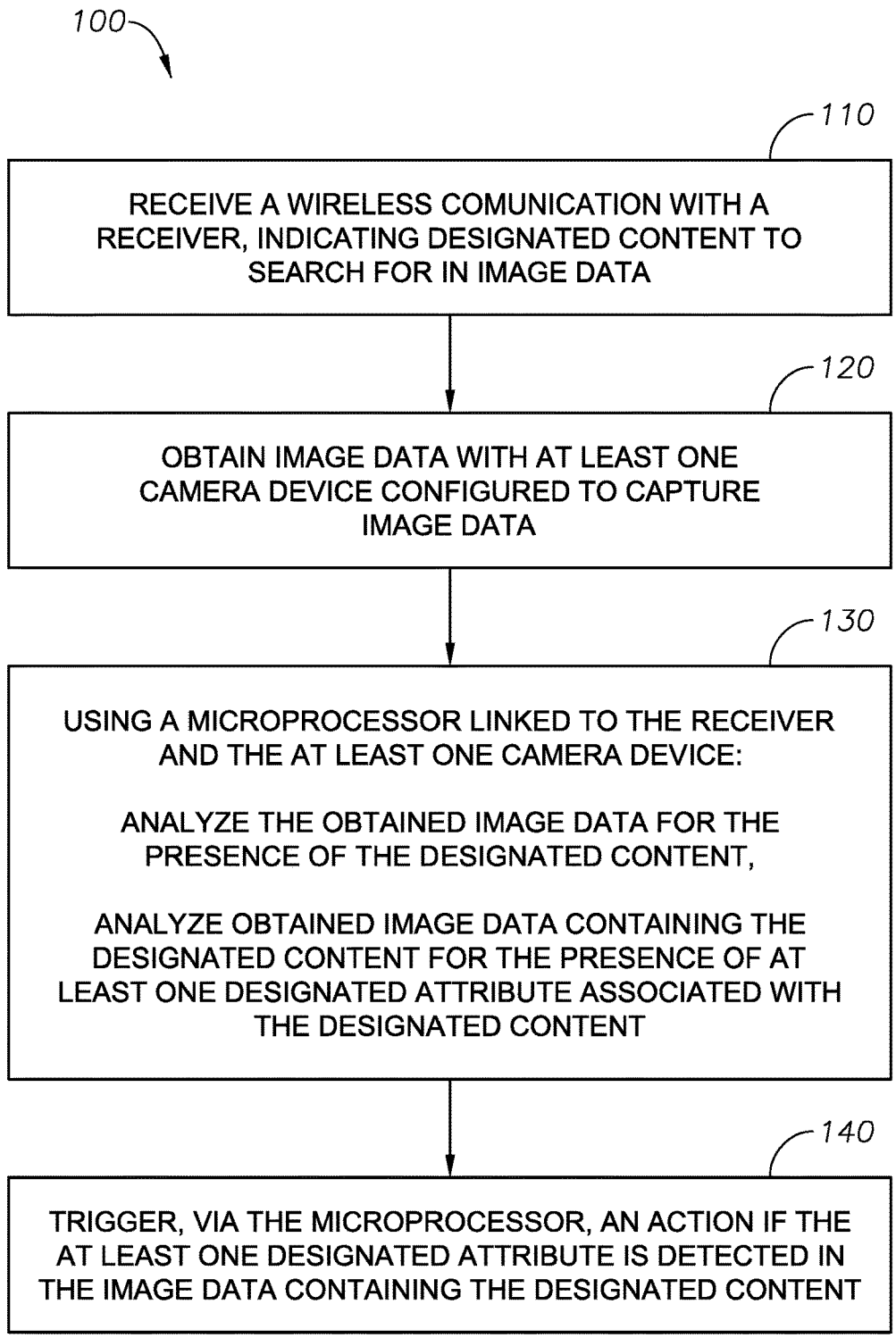
FIG. 12, in accordance with some embodiments of the present disclosure, is a flow chart depicting, at a top level, a method for triggering an action in response to capture and characterization of image data.

FIG. 12 is a flow chart depicting a method 100 according to an embodiment of this disclosure. At step 110, a wireless communication is received with a receiver, indicating designated content to search for in image data. The communication may be conveyed via the communication network 18. At step 120, image data is obtained using at least one camera device 16 (e.g., ICV 28, BWC 29) configured to capture image data. At step 130, using a microprocessor linked to the receiver and the at least one camera device, (a) the obtained image data is analyzed to determine if it contains the designated content and (b) obtained image data containing the designated content is analyzed to determine if it contains at least one designated attribute associated with the designated content. This may be implemented using an analytics engine and processing as described herein. At step 140, an action is triggered by the microprocessor if the at least one designated attribute is detected in the obtained image data containing the designated content. This entails any of the actions that may be triggered by the microprocessor as described herein.

Figure 13:
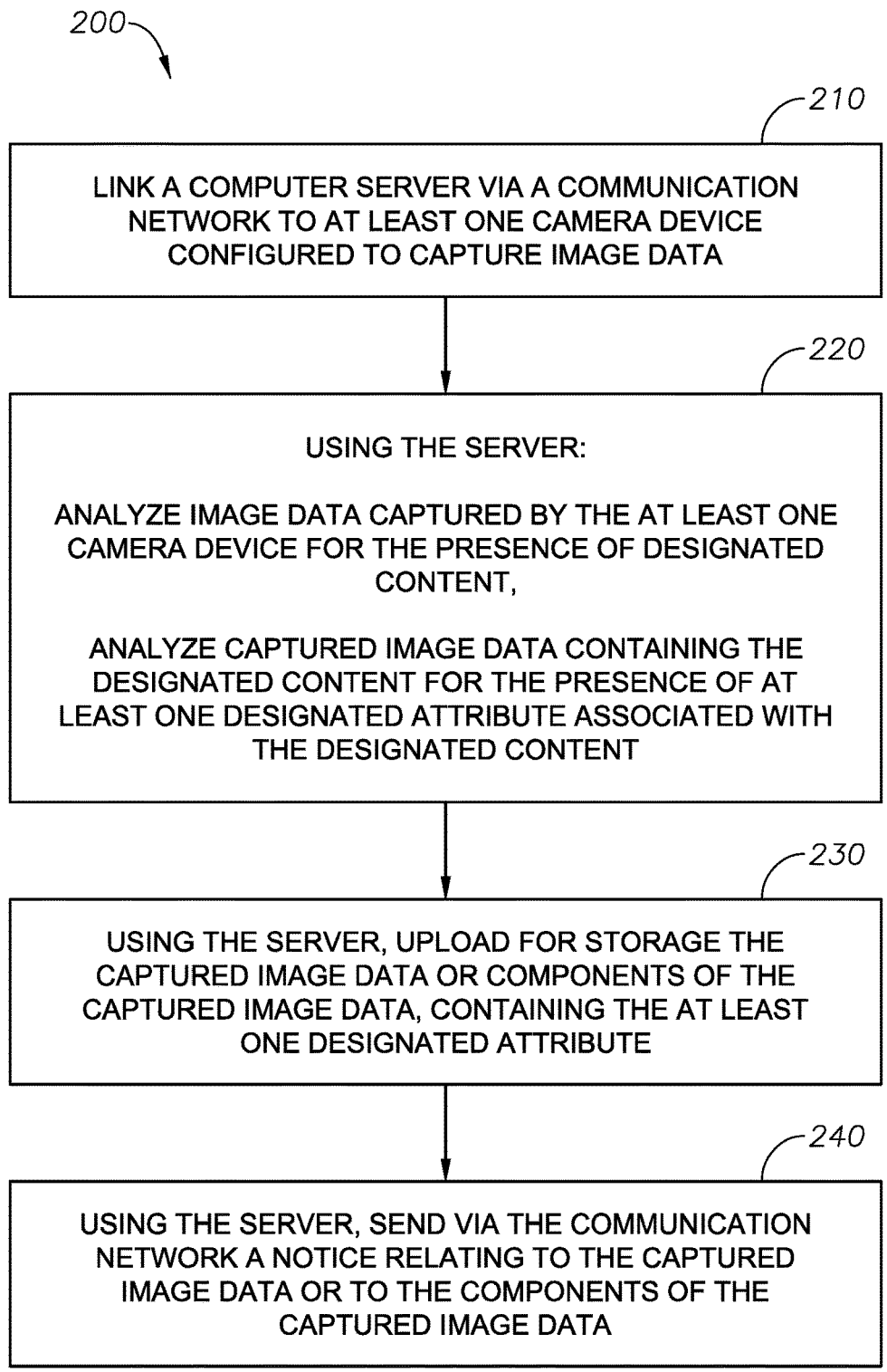
FIG. 13, in accordance with some embodiments of the present disclosure, is a flow chart depicting, at a top level, another method for triggering an action in response to capture and characterization of image data.

FIG. 13 is a flow chart depicting a method 200 according to an embodiment of this disclosure. At step 210, a computer server is linked via a communication network to at least one camera device 16 (e.g., ICVs 28, BWCs 29) configured to capture image data. At step 220, using the server, (a) image data captured by the at least one camera device is analyzed for the presence of designated content and (b) captured image data containing the designated content is analyzed for the presence of at least one designated attribute associated with the designated content. This may be implemented using an analytics engine and processing as described herein. At step 230, using the server, the captured image data or components of the captured image data, containing the at least one designated attribute, are uploaded for storage. At step 240, using the server, a notice relating to the captured image data or to the components of the captured image data, is sent via the communication network.

As used throughout the description of FIGS. 14-21 of the instant disclosure, the term "record" is interchangeable with the term "store" and refers to the retention of data in a storage medium designed for long-term retention (e.g., solid state memory, hard disk, CD, DVD, memory card, etc.), as compared to the temporary retention offered by conventional memory means such as volatile RAM. The temporary retention of data, audio data or otherwise, is referred to herein as the "holding" of data or as data being "held."

Figure 14:
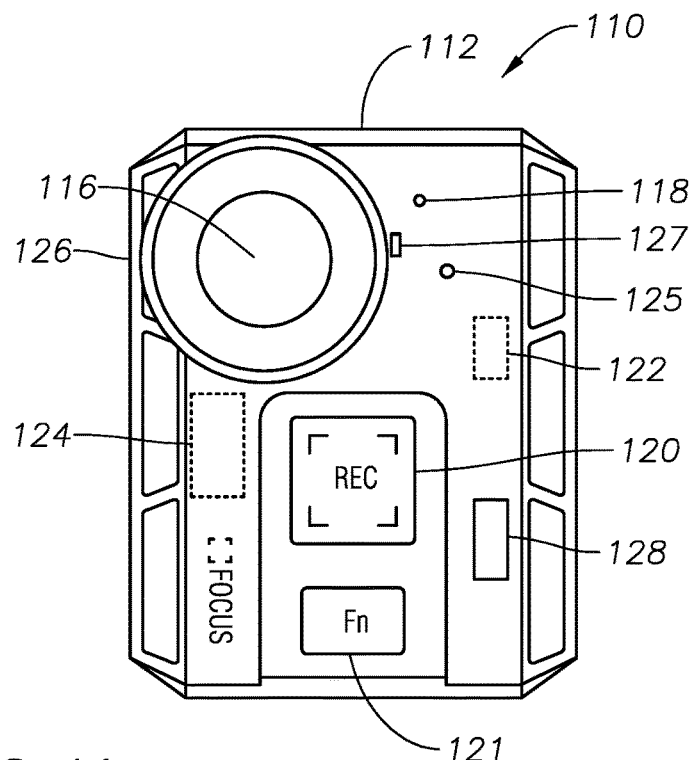
FIG. 14, in accordance with some embodiments of the present disclosure, depicts a portable camera device.

FIG. 14 depicts an embodiment of a first device 110 in accordance with this disclosure. In this embodiment, the first device 110 comprises a portable wearable camera 112. The camera 112 is configured with a fixed-focus or auto-focus lens 116, a microphone 118, and a record activation button 120, which permits a user to manually activate or deactivate the camera 112 to record audiovisual data (i.e., audio data captured via the microphone 118 and video data captured via the lens 116). Some embodiments may be configured to allow for separate manual activation/deactivation of the microphone 118 (audio recording functionality) and lens 116 (video recording functionality), respectively, permitting a user to capture only audio data or only video data as desired. Thus, camera 112 is configurable/operable to record/store/hold solely audio data, solely video data, or a combination thereof, which may be referred to as audiovisual data; in all of these cases, camera 112 is also operable/configurable, but not required, to record/store/hold metadata. As described below, where audiovisual data is recorded/stored/held, this may be with or without a separate audio and/or video track. Some embodiments may also include a programmable function button 121 that provides a user the ability to select among different programmed/programmable modes of operation. The camera 112 may be configured with an internal buffer 122 (e.g. RAM) to temporarily hold captured audio, video and/or audiovisual data, and memory 124 (e.g. flash drive) to store captured audio, video and/or audiovisual data. The camera 112 may be configured to automatically create the respective data files (i.e. audio, video, audiovisual) as the data is captured/recorded. Some embodiments may also include an audio speaker 125 to provide voice messages and/or an audible indication during various modes of operation. For example, the speaker 125 may be configured for activation: when camera 112 recording starts or stops, to provide a camera low battery alert, to provide a camera memory full alert, to indicate successful camera pairing with another device, to provide warning beeps that may be sent from another device, etc. In some embodiments, the audible indication may indicate generically an event or may indicate the specific event (not merely that one of several types of events occurred). That is, different audible sounds (including voice messages) may be generated for respective different event types (e.g., one beep for event type x, two beeps for event type y; a buzzer sound for event type x, a ring tone for event type y, a voice message for event type z; a voice message for event type x, a different voice message for event type y; etc.). It will be appreciated by those skilled in the art that camera 112 embodiments of this disclosure can be implemented with various types of additional sensors to capture/store desired information (e.g. temperature) and with conventional data storage means as known in the art. Embodiments of the camera 112 are also equipped with internal Bluetooth® circuitry and associated electronics or other wireless technology to permit wireless communication and or signal transfer to or from the camera 112. Bluetooth® pairing may be manually activated by a button 126 on the camera 112. Some embodiments may also include a light-emitting diode (LED) 127 to indicate when the camera 112 is recording or performing other functions. Some embodiments are also equipped with Global Positioning System and real-time clock circuitry 128 to provide GPS data and current time information. Suitable camera devices 112 that may be used to implement embodiments of this disclosure include the devices commercially available from COBAN Technologies, Inc., in Houston, Tex. (http//www-.cobantech.com).

Figure 15:
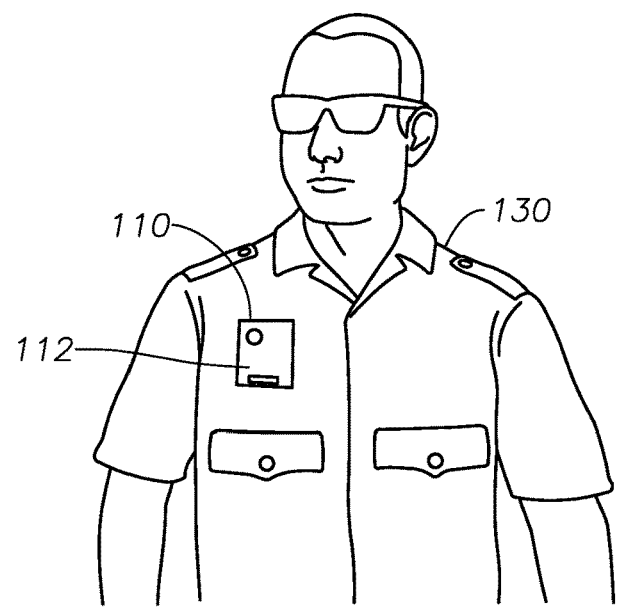
FIG. 15, in accordance with some embodiments of the present disclosure, depicts the portable camera device of FIG. 1 in use as a body-worn-camera.

FIG. 15 depicts the first device 110 camera 112 being worn by a user 130 (e.g. a police officer) as a BWC. This implementation provides a user the ability to capture on-scene audiovisual data with the camera 112. For law enforcement, the wearable camera 112 provides the officer complete freedom to move while the camera 112 records audio, video, or audiovisual data as desired. The audio, video, and/or audiovisual data is stored in the camera 112 memory 124. The camera 112 may be configured to automatically include metadata (e.g., time stamp, watermark, GPS data, unit ID, officer ID, unique identifier, etc.) in the data recorded.

In some embodiments, the first device 110 camera 112 may be configured to wirelessly sync (e.g., via Bluetooth®, RuBee, Wi-Fi, 3G, 4G, LTE, etc.) with other data gathering/telemetry devices within a set range or proximity. Such other devices may include, for example, biometric data sensors, geospatial, distancing and orientation data devices (apart from that provided by GPS), environmental telemetry devices, etc. In such embodiments, the camera 112 can wirelessly receive data transmitted from the other devices and store the data in memory 124 as metadata. The data from the other devices can be recorded in sync with the recording of audio/video or independently (e.g. when the camera 112 is not holding/storing audio/video). The camera 112 may be configured to sync with other devices automatically or via manual activation. All of this additional data from other devices can be multiplexed and synchronized with selected data using the techniques disclosed herein.

In some embodiments, the audio, video, and/or audiovisual data captured by the camera 112 is temporarily held in the buffer 122 in a continuous circulating stream to perform "pre-event" circular buffering, without storing the data to memory 124 until the camera 112 is activated to store the data to memory 124 by a wireless command or by manual activation via the record "on/off" button 120. This "smart buffering" feature provides a circular buffer that temporarily holds the captured data in configurable file segment sizes (e.g., 1-5 minute chunks) until activated to store the data to memory 124 or the data is automatically deleted as new data is captured and streamed into the buffer 122 in a continuous manner. When activated to store the data, time points are marked in the data files. In some embodiments, if the camera 112 is activated or triggered to store the data, the camera 112 can be configured to export the data (in the above-mentioned file segments) to a removable media and/or a separate folder in the memory 124 sector where the circular recording is written. In some embodiments, the pre-event buffering can optionally be configured to continually write directly to memory 124 in a circulating stream.

Figure 16:
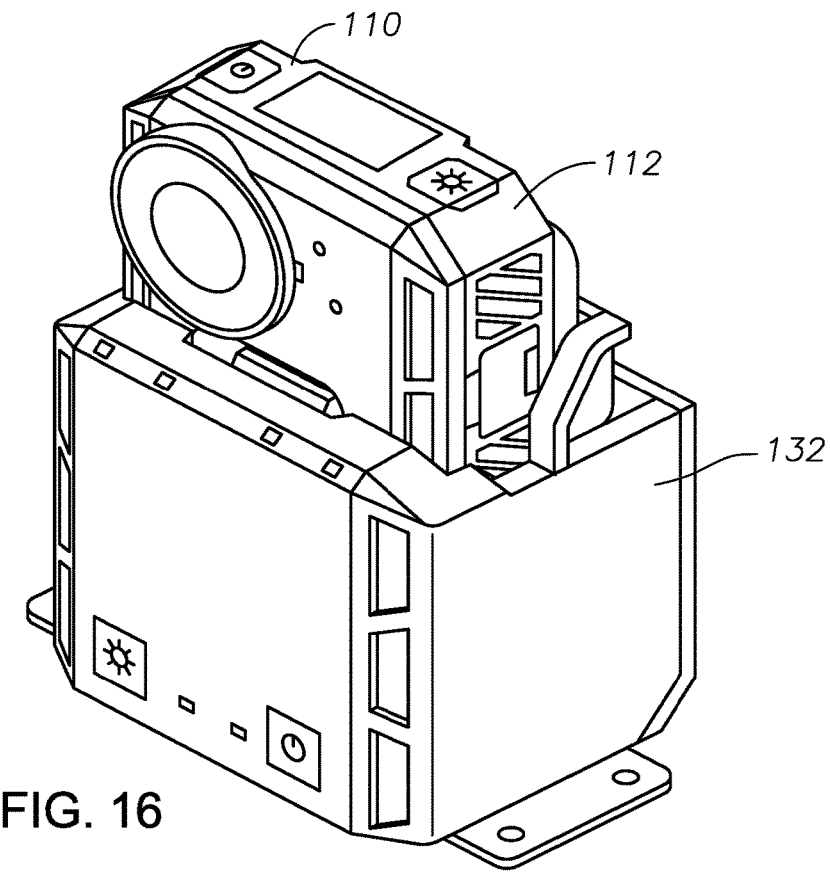
FIG. 16, in accordance with some embodiments of the present disclosure, depicts a schematic of a portable camera device docked in a docking module.

When not being worn, the camera 112 can be docked into a docking module 132, as depicted in FIG. 16. Suitable docking modules 132 that may be used to implement embodiments of this disclosure include the devices commercially available from COBAN Technologies, Inc., in Houston, Tex. (http//www.cobantech.com).

Figure 17:
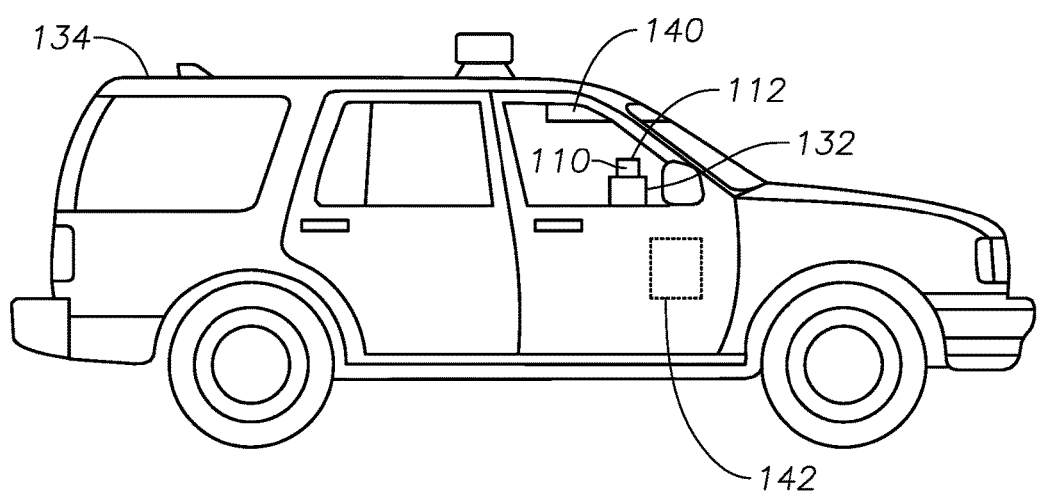
FIG. 17, in accordance with some embodiments of the present disclosure, depicts a vehicle with an onboard computer and camera devices.

For law enforcement applications, the docking module 132 can be mounted in a police vehicle 134, as depicted in FIG. 17. Embodiments can be implemented with the docking module 132 disposed on any type of vehicle. In such embodiments, the docking module 132 is coupled to a second device 136 comprising an in-car video (ICV) camera 140 that is disposed in the vehicle 134. The ICV camera 140 is configured to record on-scene audio, video, or audiovisual data. The audio, video, and/or audiovisual data captured by the ICV camera 140 is stored on internal and/or removable storage media. In some embodiments, the ICV camera 140 is configured to temporarily hold the recorded audio, video, and/or audiovisual data in a buffer in a continuous circulating stream to perform "pre-event" circular buffering, without storing the data until triggered to store the data by a command signal or by manual user activation. Similar to the "smart buffering" feature provided by some embodiments of the first device 110 camera 112, this feature also provides a circular buffer that temporarily holds the captured data in configurable file segment sizes (e.g., 1-5 minute chunks) until the ICV camera 140 is activated to store the data to memory or the data is automatically deleted as new data is captured and streamed into the buffer in a continuous manner. When activated to store the data, time points are marked in the data files. In some embodiments, if the ICV camera 140 is activated or triggered to store the data, the ICV camera 140 can be configured to export the data (in the above-mentioned file segments) to the removable media and/or a separate folder in the memory sector where the circular recording is written. In some embodiments, the pre-event buffering can optionally be configured to continually write directly to memory in a circulating stream.

In operation, the first device 110 camera 112 can be used to record desired audio data (whether the audio is captured as audiovisual data or solely as audio data). In some situations, the ICV camera 140 will capture relevant audio data via a wired or wireless microphone source, while in some situations the ICV camera 140 may not (e.g., when the officer is outside of the vehicle 134 performing a traffic stop), and the first device 110 camera 112 may record the on-scene audio data when worn by the officer as a BWC. Thus, on-scene video data and audio data are obtained by both the ICV camera 140 and the first device 110 camera 112. However, separate playback of the recorded data files from the ICV camera 140 and the first device 110 camera 112 may not be in sync. This mismatch in synchronization may be particularly exacerbated when the ICV camera 140 and the first device 110 camera 112 are each activated at different times or intermittently during a recording event. The embodiments of this disclosure provide a solution in this situation.

Embodiments of the second device 136 are implemented with software configured to extract and/or multiplex the audio data recorded by the first device 110 with the file container of the data file(s) in the second device 136 memory (e.g. ICV camera 140). The data file(s) stored in the second device 136 may include audio, video, metadata, and/or audiovisual files. Some embodiments of the second device 136 are configured to multiplex the audio data recorded by the first device 110 to synchronize the audio data with the relevant data file(s) (i.e., audio data, video data, metadata, and/or audiovisual data) in the file container of the second device 136. It will be appreciated by those skilled in the art that data files (audio data, video data, metadata, and/or audiovisual data) can be multiplexed and synchronized with multiple devices 110, 136 and other audiovisual sources, and in some cases linked to several devices and/or sources, that were on the scene, for later synchronization. Such embodiments provide for enhanced audio and video data review and may also be used to identify and create a map of the location where the devices/sources were located during an event.

Figure 18:
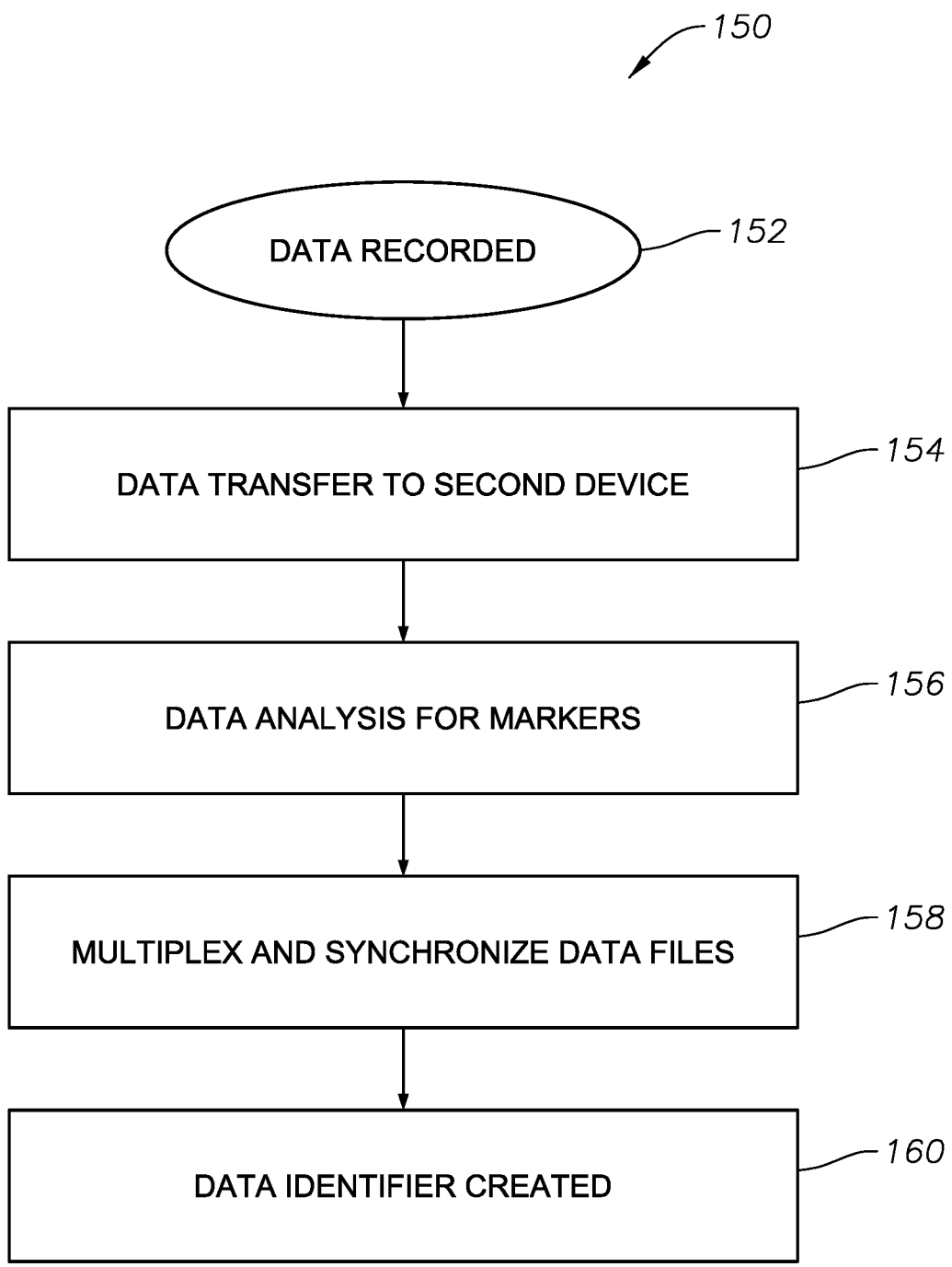
FIG. 18, in accordance with some embodiments of the present disclosure, depicts a processing flow chart for audio data processing.

FIG. 18 depicts a flow chart 150 of the audio data processing according to some embodiments of this disclosure. At module 152, as previously described, the first device 110 camera 112 records audio data. The audio data may be captured in an audiovisual recording or solely as an audio data recording. At module 154, the recorded audio data is uploaded or transferred to the second device 136 (e.g. ICV camera 140). In some embodiments, the docking module 132 is configured with POGO pins that mate with a receptacle in the first device 10 camera 112 to facilitate the data transfer between the camera 112 and the second device 136 when the camera 112 is docked in the docking module 132. In other embodiments, the first device 110 camera 112 is configured to wirelessly transfer the audio data file to the second device 136 using a conventional communication standard (e.g., RuBee, Wi-Fi, 3G, 4G, LTE, etc.). In yet other embodiments, the first device 110 camera 112 is configured for direct transfer of the audio data via a cable connection (e.g. a USB direct connect) with the second device 136. At module 156, the second device 136 analyzes the transferred audio data and one or more data files in the second device's 136 file container to search for and detect markers present in the respective data. For example, with embodiments wherein the second device 136 comprises an ICV camera 140, the camera processor is configured to execute instructions to analyze the audio data transferred from the first device 110 and the file container data file(s) (e.g., containing audio, video or audiovisual data) captured by ICV camera 140. The markers may consist of: the time stamps, a watermark, other metadata such as unit ID, officer ID, a unique identifier ("event identifier") for the recording event (e.g., DUI, speeding, etc.), GPS data, telemetry, etc. These markers may be automatically embedded in the respective recorded data and/or a separate XML file by the portable camera 112 and the ICV camera 140. Customized or event-specific markers (e.g., accident scene, DUI, etc.) can also be added to the data by the officer by (e.g., manual) entry via an ICV camera 140 touch display 142, a keyboard, a smartphone, or a tablet device. These added markers can be automatically associated with any device/file that is to be synchronized. Some portable camera 112 embodiments may also be configured with software to allow a user to add customized/event-specific markers to the camera 112 audio data file. In some embodiments, customized/event-specific markers may be preprogrammed and selectable via the programmable button or the aforementioned methods. Clock synchronization between the first device 110 and the second device 136 may be performed by the GPS circuitry/clock 128, by direct sync via the USB connection to the second device 136, or by sending real-time clock (RTC) sync signals similar to Network Time Protocol (NTP) time servers.

At module 158, once the markers have been detected in the respective data files, the audio data transferred from the first device 110 camera 112 is multiplexed and synchronized with the data file(s) in the second device ICV camera 140 file container. In some embodiments, the data files are multiplexed by linking the files together (via the software) such that opening or "playing" one file simultaneously opens/plays the linked file. In some embodiments, the synchronization is performed by: (a) selecting one of the data files (i.e., either the transferred audio data file or a data file in the ICV camera 140 file container); (b) rolling back in the selected file to a specific marker point (e.g. the earliest time mark); and (c) automatically synchronizing the files by marking points in the selected file where markers match with the data in the other data file. In an application, an officer can record the on-scene audio with the portable camera 112 affixed to his vest as a BWC. After the event is over, the officer can immediately transfer the audio data recorded with the camera 112 to the ICV camera 140, as described herein, or the officer can perform the data transfer at a later time (e.g. upon return to the station at the end of his shift). After the recorded audio data has been transferred from the camera 112 to the ICV camera 140 storage, the ICV camera 140 can roll back the transferred audio data to the proper time stamp and automatically multiplex and synchronize the data files by marking points in the transferred audio data where the markers match the data in the audiovisual file stored in the ICV camera 140. At module 160, the ICV camera 140 may create a unique identifier to identify the multiplexed data so that the synchronized data files can be logged in an audit trail and stored as desired. This way, when either data file is searched (i.e. the audio data recorded with the portable camera 112 or the data recorded with the ICV camera 140), the associated data file is automatically linked to be played back simultaneously and in sync if needed. Synchronous play from multiple data files can then be activated as desired. It will be appreciated by those skilled in the art that embodiments of this disclosure may be implemented using conventional software platforms and coding configured to perform the techniques and processes as disclosed herein.

In some embodiments where the first device 110 camera 112 and the ICV camera 140 are each configured to provide the "pre-event" circular buffering described above, the synchronization step of module 158 may be performed in a slightly different manner. With such embodiments, the selected data file that is rolled back (step (b) above) is the data file with the shortest recording time, in this scenario the files may get synchronized starting points while maintaining the original starting points for each file. This ensures that the multiplexed data files are synced to the longest event of interest.

In some embodiments, the first device 110 is configured to simultaneously record and transmit audio data to the second device 136. The received audio transmission can be recorded in the second device 136 in real-time. For example, an embodiment of the first device 110 camera 112 could be used to record audio data as described herein, and simultaneously transmit (e.g., via RuBee, Wi-Fi, 3G, 4G, LTE, etc.) the audio data to a ICV camera 140. The ICV camera 140 can then store the transmitted audio data in the file container of the ICV camera 140 data file. Once stored in the ICV camera 140, the transmitted audio data may be multiplexed and synchronized with the data file(s) in the ICV camera 130 as disclosed herein.

In some embodiments, the audio data transferred from the first device 110 is used to replace audio data in a data file in the second device 136. For example, in a situation where the audio data captured by the ICV camera 140 is of such poor quality that it is difficult to discern (e.g. the audio signal goes faint as the officer walks away from the vehicle 134), the system software may be configured to automatically replace the poor-quality audio data in the data file from the ICV camera 140 with the audio data recorded by the first device 110. In some embodiments, only portions of audio data in the second device 136 data file are replaced in this manner. In other embodiments, the audio data transferred from the first device 110 is established as the audio data for the data file in the second device 136, such that when the multiplexed files are played, the only audio signal heard is that from the transferred audio data. For example, if the data file in the second device 136 contains only video data, without audio, the audio data recorded with first device 110 may be used as the audio data once the audio data is multiplexed into the file container of the second device data file. Other embodiments may combine and synchronize audio data captured by a separate body-worn source (e.g., a separate body-worn wireless microphone linked to the second device 136) with audio data from the first device 110, to produce a higher quality resultant audio file. Embodiments of this disclosure also encompass the multiplexing and synchronization of data (audio, video, audiovisual) obtained by multiple first devices 110 and/or second devices 136. Such embodiments provide for the synchronization of multiple audio data files to non-audio carrying video.

Although the examples presented above describe embodiments using a time stamp as a starting marker for the synchronization process, any marker or combination of markers in the data files may be used to synchronize the data sets.

It will also be appreciated by those skilled in the art having the benefit of this disclosure that embodiments may be implemented wherein the second device 136 that receives the recorded audio data from the first device 110 is a remote computer (e.g. a server at headquarters), a smartphone, a wearable device (e.g. another BWC), etc. Any of these second devices 136 may be implemented with electronics, microprocessors, and software configured to perform the techniques and processes disclosed herein. It will also be appreciated that the first device 110 may be, or include, a device configured to record and/or transmit audio data and metadata, and optionally video data.

Other embodiments may be implemented wherein the first device 110 is configured to create and store an audio track (i.e. containing solely a captured audio communication signal). The audio track can be created as a solely recorded file, i.e., without the creation of visual data, or simultaneously with creating and storing a separate audiovisual track, or non-simultaneously with creating and storing an audiovisual track. For example, an embodiment of the portable camera 112 can be configured to record an audiovisual data file of captured video and audio data, while simultaneously creating and storing a separate audio track containing only the captured audio data. In such embodiments, the markers (described above) may be automatically inserted in either or both of the audiovisual data file and the separate audio track. As another example, the portable camera 112 can be configured to create and store a separate audio track, containing only the captured audio data, at a later time after an audiovisual data file of captured video and audio data has been stored. Thus, camera 112 is configurable/operable to create/store/hold solely an audio track (file), solely a video data file, solely an audiovisual data file, or a combination thereof (such combination may be created simultaneously or non-simultaneously). With embodiments including an audio track, the transfer of only the recorded audio track (containing the audio data of interest) to the second device 136 is streamlined as audio signal data files typically entail less data and transfer at a faster rate (depending on system bandwidth) compared to audiovisual data. In all embodiments, the audio track can also be stored with automatically embedded markers (e.g., time stamp, watermark, metadata, unique identifier, GPS data, telemetry, etc.). In other embodiments, the first device 110 is configured to wirelessly transmit and stream (e.g., via the Internet, Cloud, radio network, Bluetooth, Wi-Fi, 3G, 4G, LTE, satellite, etc.) the captured audio data to a remote second device 136, in addition to recording the audio data to memory as described herein. The second device 136 is configured with a speaker to allow the received streamed audio data to be heard (e.g., in real-time or later), and the second device 136 is also operable to record the received streamed audio data to memory/storage (either or both of these functions, as desired). For example, for law enforcement applications this would allow an officer in the vehicle 134 to listen, in real-time, to the audio wirelessly streaming from his partner's BWC 112 and to manually select (e.g. by pushing a button) to record the data to the memory of the second device 136 (e.g., ICV camera 140). These features can be used as backup functions.

Among the benefits of the functionality provided by the disclosed embodiments is the elimination of the range-based limitations encountered by conventional wireless audio data transmission. Since on-scene audio of interest is recorded with the first device 10 and subsequently transferred from the first device to the second device 136, there are no longer any issues regarding wireless signal transfer range or signal interference. The embodiments also provide the ability to multiplex and/or synchronize the audio data files at a later time, after the video and/or audio files have been produced. In implementations where all files are transferred to a server, the multiplexing, synchronization, unique identifier coding, or a combination thereof, can be done at a later time as desired. For example, once the files are obtained, audio files from the first device 110 may be multiplexed and synced, or played separately yet in sync, with video files from the second device 136.

The recorded/stored/held data (audio, video, or audiovisual data) acquired by any device(s) can also be sent to the cloud in real-time, where the disclosed extraction, multiplexing, and/or synchronization techniques can be performed. For example, once uploaded to the cloud, audio data recorded by a first device 110 can be synchronized with the data file(s) (i.e., audio data, video data, metadata, and/or audiovisual data) uploaded to the cloud from a second device 136. Cloud processing can be performed concurrently with the disclosed techniques or as stand-alone processing of the data. Such cloud processing provides for rapid accessibility (e.g. by remote locations such as headquarters) and flexibility of scalability.

Figure 19:
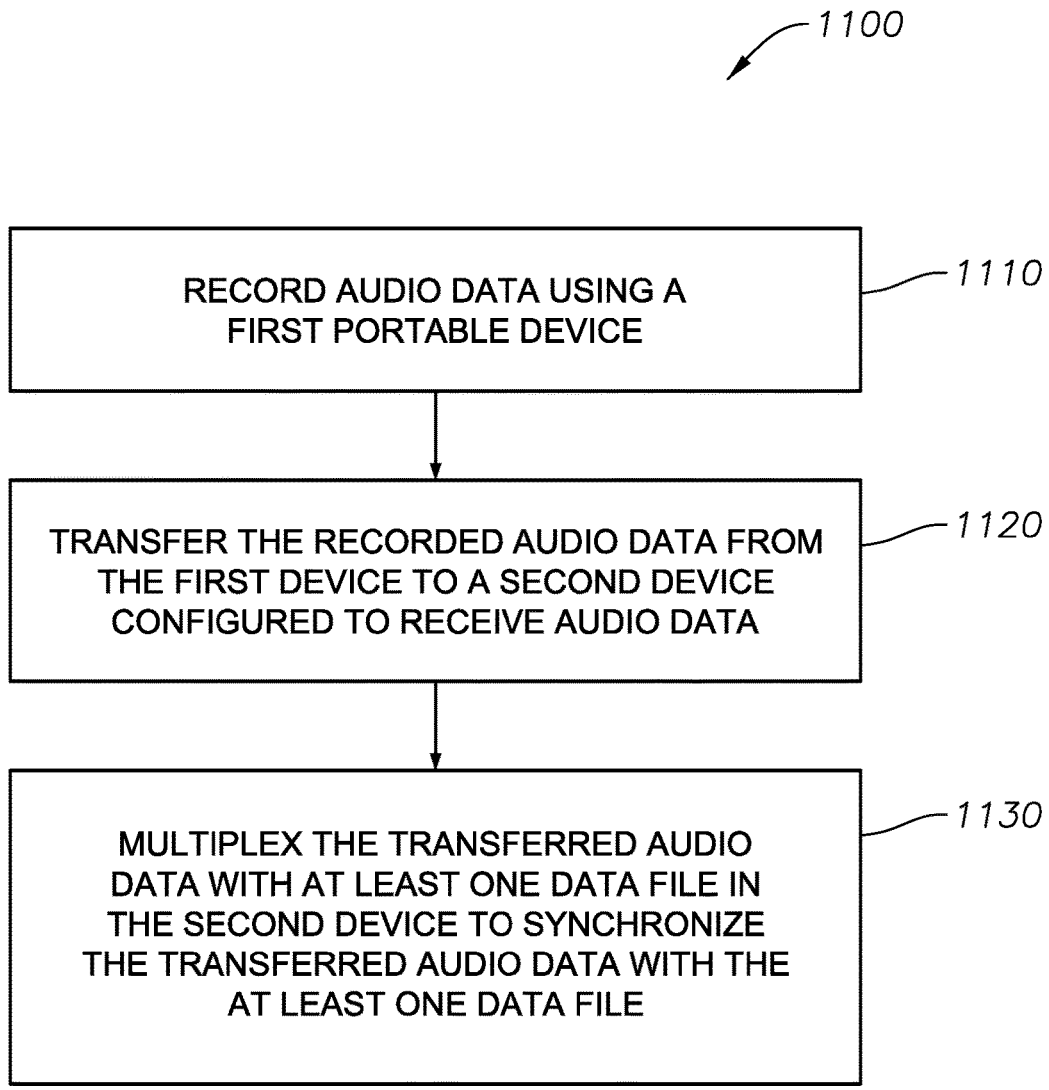
FIG. 19 is a flow chart depicting, at a top level, a method in accordance with some embodiments of the present disclosure.

FIG. 19 is a flow chart depicting a method 1100 according to an embodiment of this disclosure. At step 1110, audio data is recorded using a first device, wherein the first device is portable. The first device can be any of the devices as described herein. At step 1120, the recorded audio data is transferred from the first device to a second device configured to receive audio data. The audio data can be transferred via any of the means disclosed herein. At step 1130, the transferred audio data is multiplexed with at least one data file in the second device to synchronize the transferred audio data with the at least one data file. This method may be implemented using the techniques and embodiments disclosed herein.

In a variant of the embodiment depicted in FIG. 19, another embodiment entails the steps of method 1100 and concurrently includes: uploading the audio data to the cloud, uploading the at least one data file from the second device to the cloud; and in the cloud, multiplexing the audio data with the at least one data file to synchronize the audio data with the at least one data file. The data processing may be performed by a virtual server in the cloud and the resultant file(s) may be stored in the same server or downloaded as desired.

Figure 20:
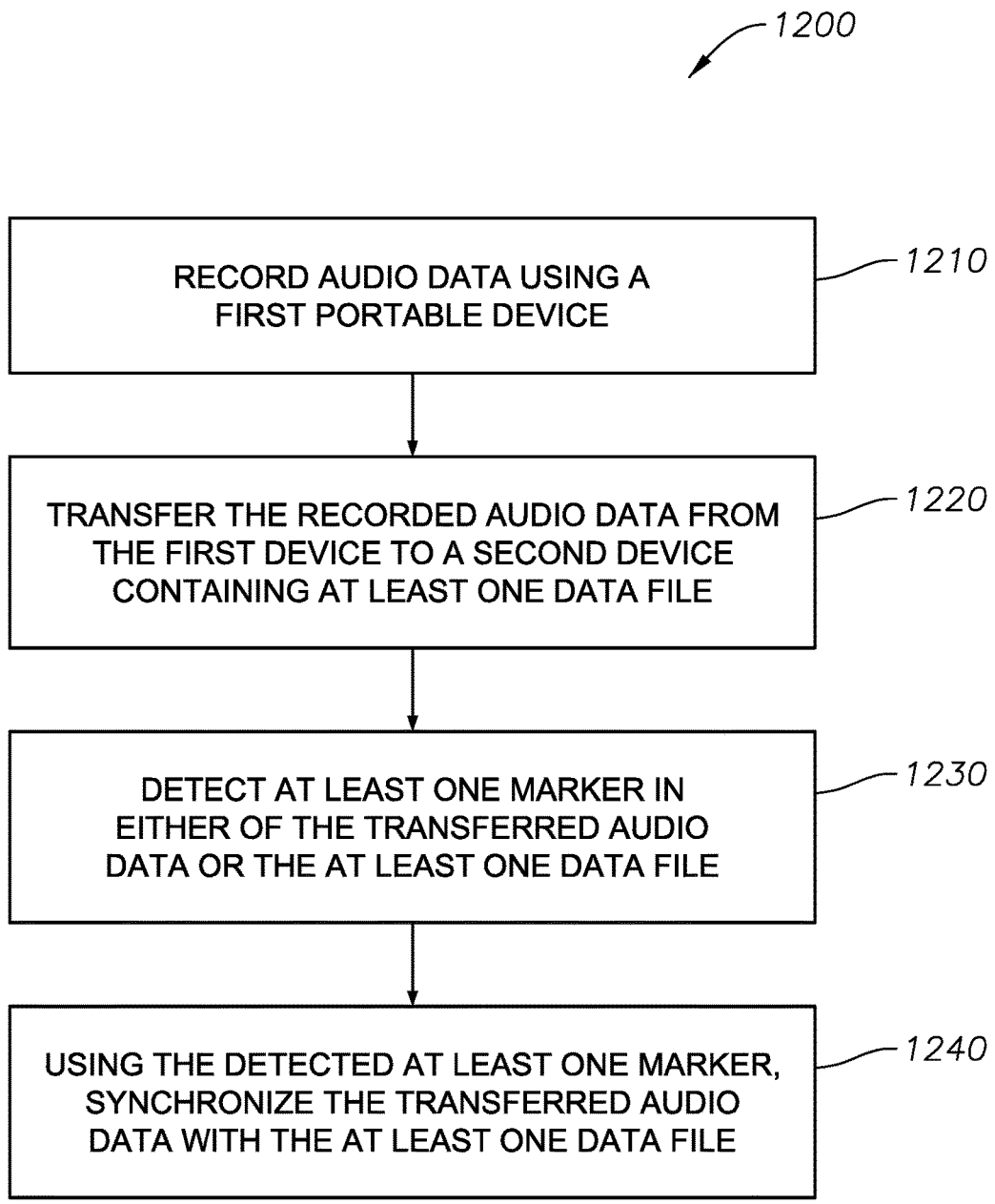
FIG. 20 is a flow chart depicting, at a top level, another method in accordance with some embodiments of the present disclosure.

FIG. 20 is a flow chart depicting a method 1200 according to an embodiment of this disclosure. At step 1210, audio data is recorded using a first device, wherein the first device is portable. The first device can be any of the devices as described herein. At step 1220, the recorded audio data is transferred from the first device to a second device containing at least one data file. The audio data can be transferred via any of the means disclosed herein. At step 1230, at least one marker is detected in either of the transferred audio data or the at least one data file. At step 1240, using the detected marker(s), the transferred audio data is synchronized with the at least one data file. This method may be implemented using the techniques and embodiments disclosed herein.

Figure 21:
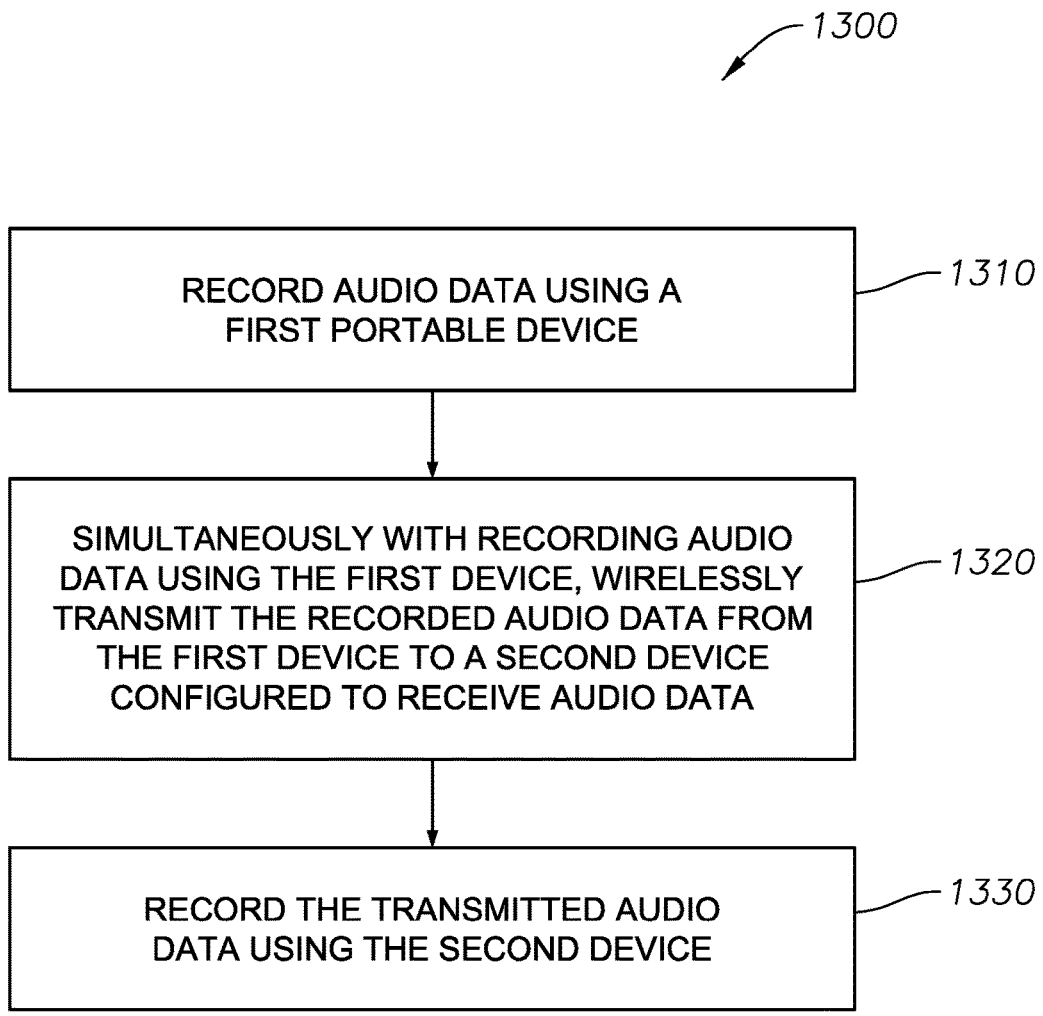
FIG. 21 is a flow chart depicting, at a top level, another method in accordance with some embodiments of the present disclosure.

FIG. 21 is a flow chart depicting a method 1300 according to an embodiment of this disclosure. At step 1310, audio data is recorded using a first device, wherein the first device is portable. The first device can be any of the devices as described herein. At step 1320, simultaneously with the recording audio data using the first device, the recorded audio data from the first device is wirelessly transmitted to a second device configured to receive audio data. At step 1330, the transmitted audio data is recorded using the second device. The audio data can be transmitted via any of the means disclosed herein. This method may be implemented using the techniques and embodiments disclosed herein.

With regard to FIGS. 19-21, any of the data files mentioned may include audio data, video data, or audiovisual data. Any of the data files may also include metadata. Similarly, with respect to FIGS. 19-21, the "audio data" mentioned may in fact be audio data, visual data, or audiovisual data, and it may also include metadata.

As used throughout the description of FIGS. 22-37, 39A and 39B of the instant disclosure, the term "storage" or "memory" may include either one or both of storage for long-term retention (e.g., solid state memory, hard disk, CD, DVD, memory card, etc.), and storage for temporary retention (e.g., volatile RAM).

In the following discussion, we will first describe the disclosed systems/embodiments in terms of their apparatus components, their structure and (to some extent) functionality, and we will then describe the systems/embodiments in terms of their operations, functionalities and methods of use.

Figure 22:
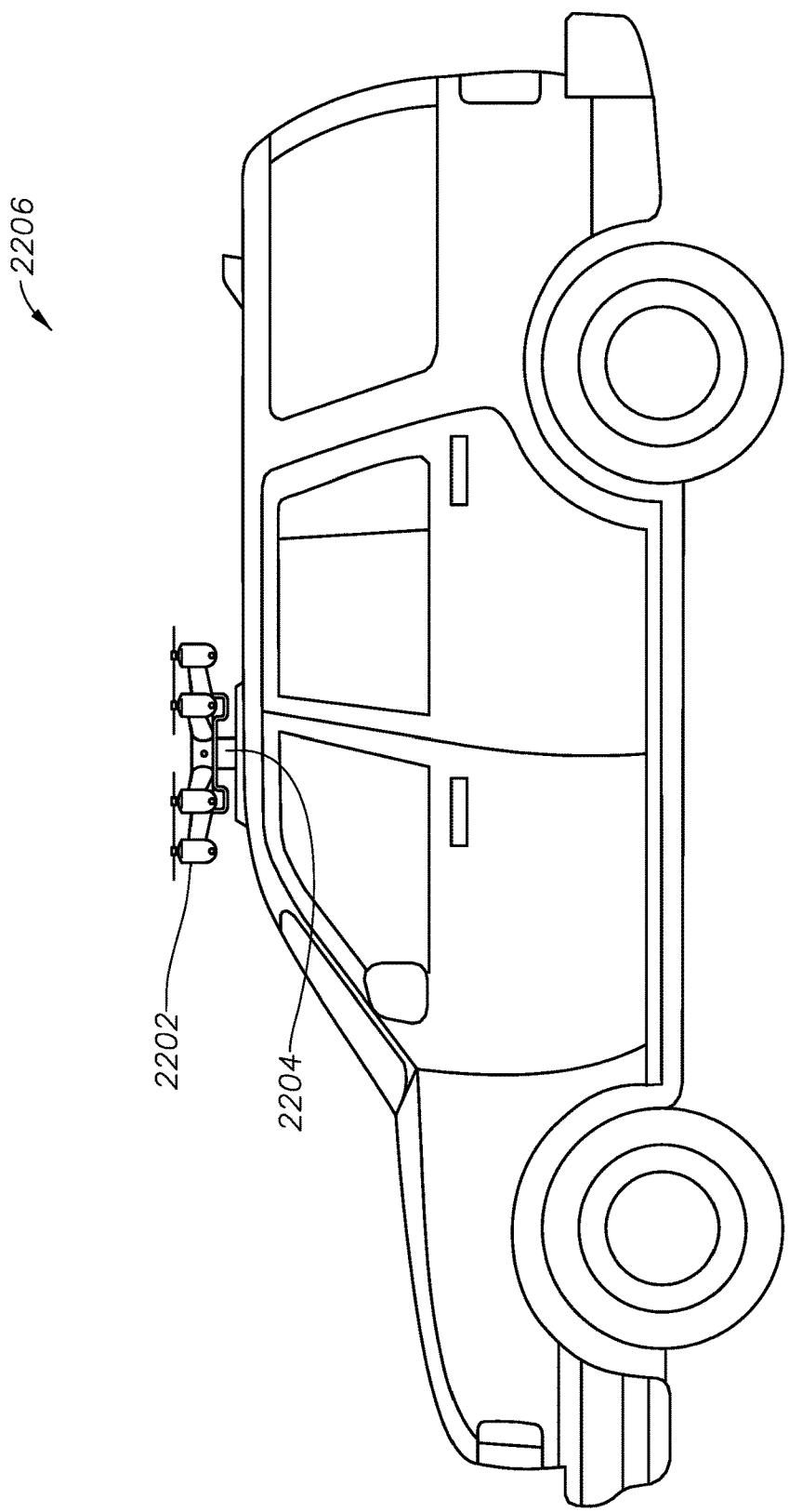
FIG. 22 depicts a system including an unmanned aerial vehicle (UAV), a docking station for a UAV, and a vehicle on which the docking station is mounted, wherein the UAV is docked in the docking station, in accordance with some embodiments of the present disclosure.
Figure 23:
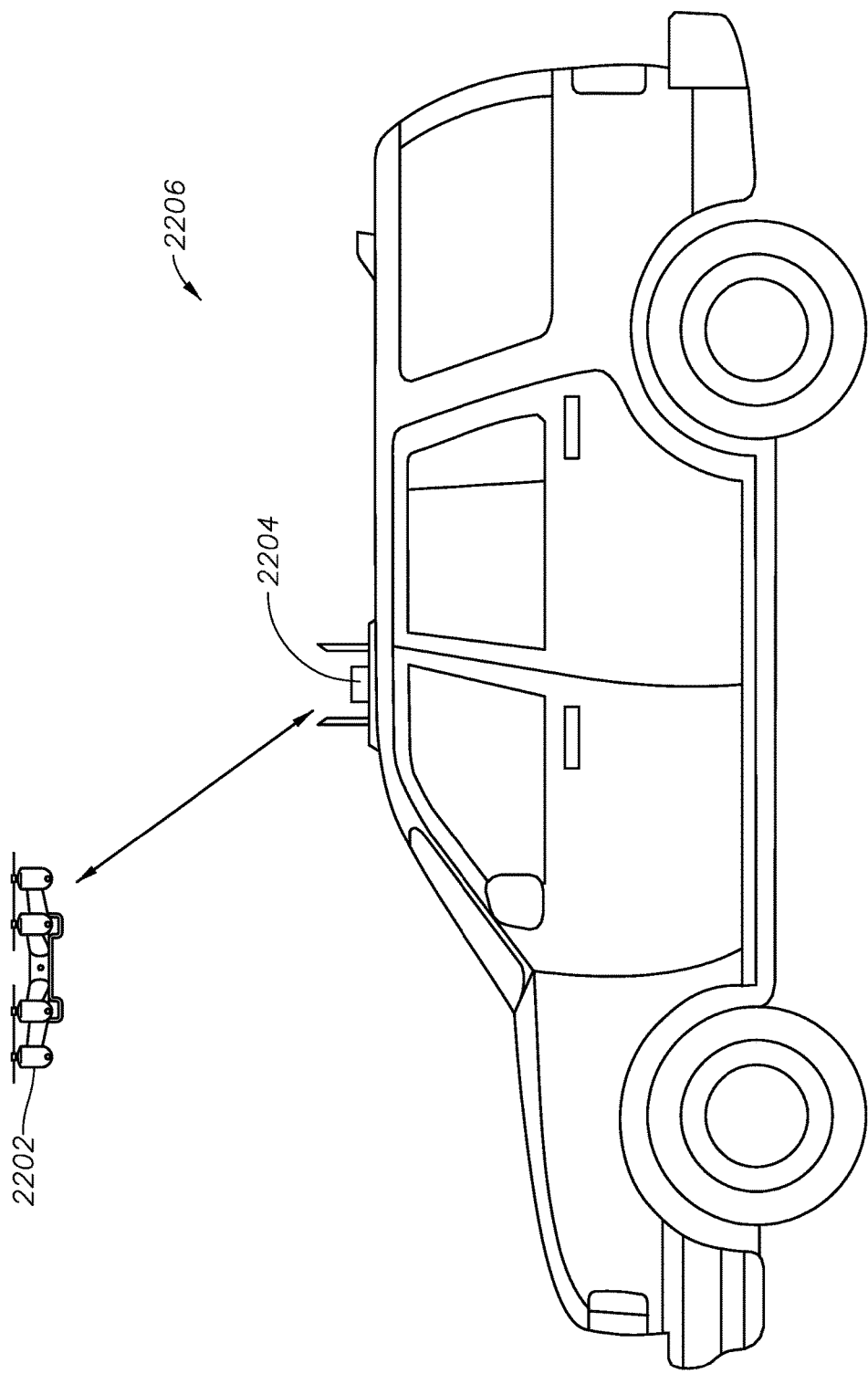
FIG. 23 depicts the system of FIG. 22 wherein the UAV is airborne, in accordance with some embodiments of the present disclosure.

FIGS. 22 and 23 depict a system including a UAV and a docking station for a UAV, wherein the docking station is configured for mounting on a vehicle and is configured for permitting a UAV to dock at the docking station. The vehicle can be an automobile (e.g., a police car), or other terrestrial, or non-terrestrial (e.g., flying, water-going) vehicle. As seen in FIG. 22, UAV 2202 is docked in docking station 2204, which is mounted on police vehicle 2206. While docking station 2204 is shown as mounted on the roof of police vehicle 2206, at a location where a siren or light bar (not shown) may be disposed, docking station 2204 may be mounted at another location on the roof of the vehicle 2206 or elsewhere (not on the roof) of the vehicle 2206. Docking station 2204 may but need not be mounted on, physically connected to, or formed integrally with a siren, light bar, luggage rack, or other element of vehicle 2206. While FIG. 22 shows UAV 2202 docked at docking station 2204, FIG. 23 shows UAV 2202 not docked but rather airborne.

Figure 24A:
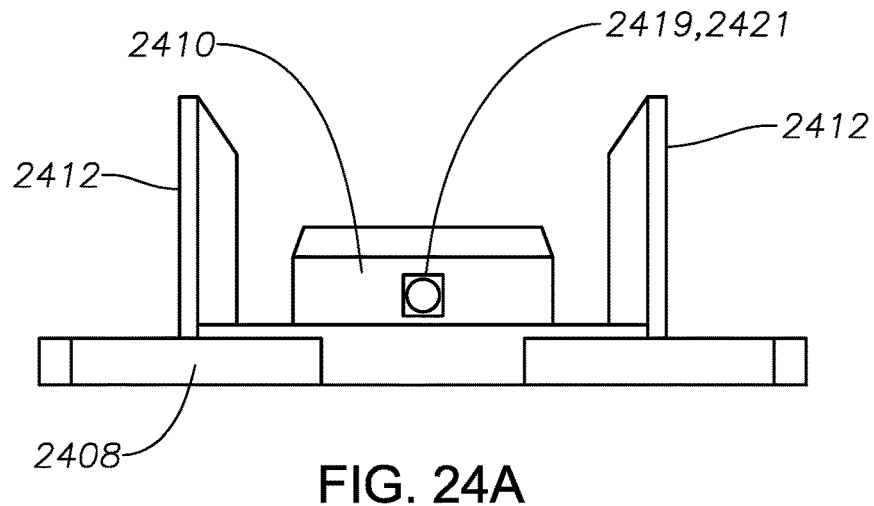
FIGS. 24A and 24B depict perspective views of a UAV docking station, viewed from the front and top thereof, respectively, in accordance with some embodiments of the present disclosure.
Figure 24B:
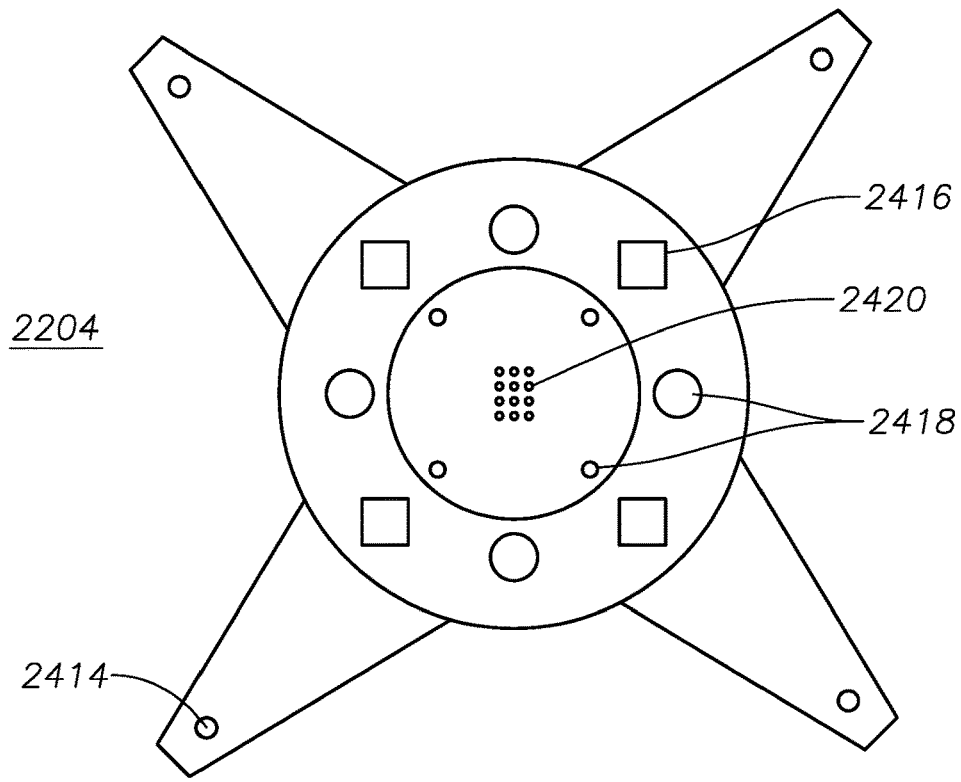

FIGS. 24A and 24B depict perspective views of docking station 2204, viewed from the front and top thereof, respectively, where the front and top refer to the directions with respect to the docking station 2204 as shown in FIGS. 22 and 23, i.e., where the docking station 2204 is mounted on the roof of a vehicle 2206 resting in a normal orientation on the ground. Thus, the front of docking station 2204 corresponds to the front of vehicle 2206, and the top of docking station 2204 is the side thereof that faces upwards/skywards.

Docking station 2204 may include a mount 2408, a housing or central body 2410, docking guides 2412, a camera device 2419 and a microphone device 2421. Docking station 2204 need not include any or all of these components; docking station 2204 may include any subset of these components; and docking station 2204 may include other components.

As for mount 2408, where docking station 2204 is not formed integrally with vehicle 2206 or an element thereof, docking station 2204 may be mounted to vehicle 2206, e.g., to the roof thereof, or to an element on the roof (as discussed), by means of mount 2408. For example, docking station 104 can be secured to the (e.g., roof of) vehicle 2206 with fasteners (not shown) via mounting holes 2414, which may be provided in mount 2408. Alternatively, docking station 104 can be secured to the (e.g., roof of) vehicle 2206 with magnetic pads (not shown), which may be disposed in mounting holes 2414 or elsewhere on mount 2408. The magnetic pads secure the mount 2408 of docking station 2204 to the vehicle 2206 by magnetic force. In some embodiments, electromagnets may be used, which can be controlled (e.g., remotely) to turn on (apply magnetic force) to secure, or turn off (stop application of magnetic force) to release, docking station 2204 to/from vehicle 2206. One of ordinary skill in the art will appreciate that various suitable means may be used to securely mount or attach (whether releasably or not) docking station 2204 to vehicle 2206.

Camera device 2419 of docking station 2204 may be configured to capture audiovisual data (also referred to as image data), i.e., visual/video data, audio data, and metadata (either with or without separate audio and/or video tracks). In some embodiments, camera 2419 may be configured to capture only visual/video data; in some embodiments, camera 2419 may be configured to capture only visual/video data and metadata. Microphone device 2421 may be configured to capture audio data.

Camera device 2419 may include one or more cameras. While FIG. 24A shows a front-facing camera, it is also possible to have a camera facing in a different direction, or multiple cameras facing in the same direction or in different respective directions. For example, camera device 2419 may include an array of cameras disposed at different respective locations around or near the perimeter of housing 2410 to capture visual or audiovisual data with a panoramic, 360-degree view. The one or more cameras of camera device 2419 may have fixed-focus or auto-focus lenses. Camera device 2419 may be used in place of, or in addition to, an in-car, e.g., dashboard-mounted, camera. The location of camera device 2419 on top of the vehicle 2206 may be advantageous in that it may provide a better perspective, given its higher position relative to an in car/dash camera, and it may cover a wider view than an in car/dash camera, which may be constrained by the vehicle interior.

Microphone device 2421 of docking station 2204 may include one or more microphones. While FIG. 24A shows a front-facing microphone, it is also possible to have a microphone facing in a different direction, or multiple microphones facing in the same direction or in different respective directions.

Figure 25:
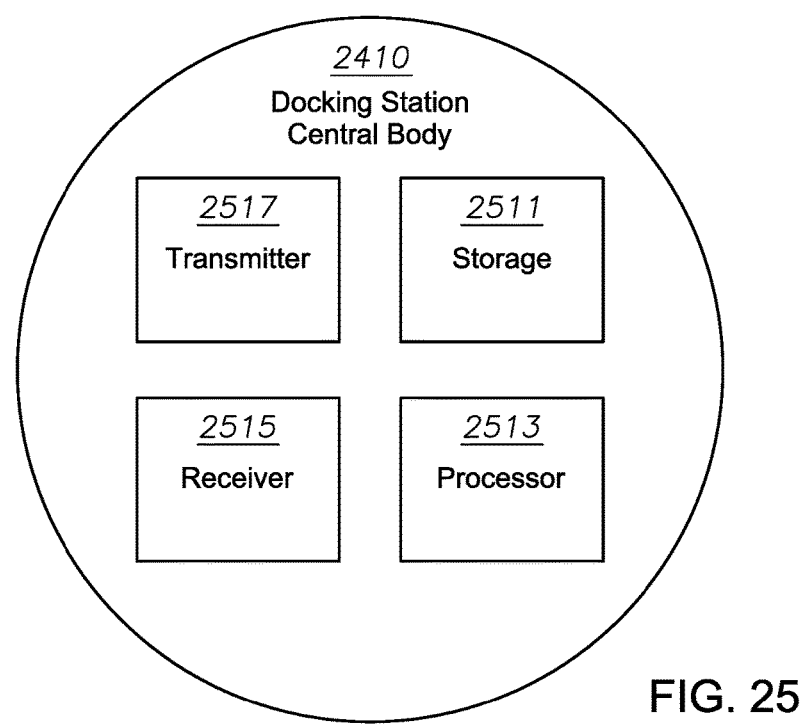
FIG. 25 is a block diagram showing a central body of a UAV docking station and internal components thereof, in accordance with some embodiments of the present disclosure.

The housing or central body 2410 of docking station 2204 may contain various components inside housing 2410 and on housing 2410, and also provides a base/surface upon which the UAV 2202 can land and be secured. FIG. 25 is a block diagram showing internal components of central body 2410 of docking station 2204. As seen, central body 2410 may include storage 2511, processor 2513, receiver 2515, and transmitter 2517. (Though not shown in FIG. 25, other elements of docking station 2204, such as camera device 2419 and microphone device 2421, may be partly contained within central body 2410 and partly on the exterior of central body 2410.) Central body 2410 need not include any or all of these components; central body 2410 may include any subset of these components; and central body 2410 may include other components.

Receiver 2515 may be configured to receive wireless communications via a communication network as well as wired communications via a wired connection, e.g., to another device in vehicle 2206. Similarly, transmitter 2517 may be configured to transmit wireless communications via a communication network as well as wired communications via a wired connection, e.g., to another device in vehicle 2206. The reception and transmission of such communications has been described elsewhere in this disclosure and is known by one of ordinary skill in the art. Receiver 2515 and transmitter 2517 may refer to separate elements, as shown, or to different aspects/functional elements of a single transceiver (not shown). Storage 2511 may be linked with any or all of the camera device 2419, the microphone device 2421, the receiver 2515, and the transmitter 2517, and may be configured to store data captured by camera device 2419, data captured by microphone device 2421, and/or data received by receiver 2515 (e.g., wireless communications). Processor 2513 may be linked with, and configured to exercise control over, any or all of camera device 2419, microphone device 2421, UAV interface 2420 (described below), docking guides 2412, if they are active devices (described below), sensor alignment markers 2416, if they are active devices (described below), electromagnets 2418 (described below), receiver 2515, transmitter 2517, and storage 2511. Processor 2513 may include one or more CPUs and GPUs, and processor 2513 may perform analytics on data captured by camera device 2419 and/or microphone device 2421 to detect content of interest (as described below with respect to UAVs and their processors).

Returning to FIGS. 24A and 24B, docking station 2204 may further include docking guides 2412, as mentioned, sensor alignment markers 2416, and/or electromagnets 2418 to help guide UAV 2202 into the appropriate landing position and secure UAV 2202 to the docking station 2204. In this way, UAV 2202 may land and be secured to docking station 2204 by itself, without a user's intervention. Any combination of one or more from among docking guides 2412, sensor alignment markers 2416, and/or electromagnets 2418 may be used.

The vehicle-mounted docking station 2204 may be challenging due to its relatively small physical size, requiring that the UAV 2202 position itself relatively precisely for landing on the docking station 2204. In some cases, the location accuracy required to successfully land in the docking station 2204 may be beyond the GPS capabilities. In this regard, docking guides 2412, sensor alignment markers 2416, and electromagnets 2418 provide additional capabilities to assist the UAV 2202 to accurately land and dock in docking station 2204.

For example, sensor alignment markers 2416 help orient the UAV 2202 in the appropriate direction and position the UAV 2202 directly over the docking station 2204. Various embodiments for sensor alignment markers 2416 are possible. For example, the sensor alignment markers 2416 could be purely passive, graphic markers located on top of housing 2410. In this case, a downward-facing camera on the UAV 2202 may capture visual data of the markers 2416. A processor coupled to the downward-facing camera, may be configured with instructions to perform analytics on the captured visual data, using an analytics engine configured to scan for the shapes and/or patterns of sensor alignment markers 2416. Once the (positions of) sensor alignment markers 2416 are detected, the processor, coupled to a flight controller of the UAV 2202, may instruct the flight controller to navigate to a position and orientation to facilitate the landing and docking of the UAV 2202 on the docking station. The shape/pattern detection, analytics engine, and flight control functions may be performed by distinct processors (which may include GPU(s) and CPU(s)) or by a single processor. In some embodiments, sensor alignment markers 2416 may be active devices, for example, capable of emitting a light or a signal of some sort, which may be receivable by UAV 2202 and useable to facilitate landing.

Docking guides 2412 may also facilitate landing of UAV 2202, for example, as a passive marker like markers 2416 and as a passive physical guide to nudge UAV 2202 into the correct position to land onto the docking station 2204. Once UAV 2202 has landed, docking guides 2412 provide a physical barrier to help secure UAV 2202 in docking station 2204. In some embodiments, docking guides 2412 may be active devices, for example, capable of adjusting their position or orientation, or of emitting a light or a signal of some sort, which may be receivable by UAV 2202 and useable, to facilitate landing of UAV 2202.

With regard to electromagnets 2418, as mentioned, they may be controllable to turn on (apply magnetic force) or turn off (stop application of magnetic force). The application of magnetic force may serve alone or in combination with other mechanisms to guide, center, and/or secure a UAV 2202 to docking station 2204.

One of ordinary skill in the art will appreciate that various other means may be used to assist with the landing and docking of the UAV 2202 to docking station 2204. For example, a docked UAV 2202 may be held in place by a clamping mechanism, pins, spring-loaded latches, or other retaining means so that the UAV is not dislodged, even if the host vehicle 2206 is driven aggressively. In any event, the various alignment and landing assistance elements described above may permit UAV 2202 to position, align, land and dock itself with respect to/on docking station 2204 without user intervention/assistance.

As seen in FIG. 24B, docking station 2204 may further include a UAV (electrical) interface 2420 (A) configured to establish a wired connection with the UAV 2202 when the UAV 2202 is docked at the docking station 2204, and (B) operable to permit, via the wired connection, at least one of: (i) charging of a battery of the UAV 2202, and (ii) downloading of data from the UAV 2202 to the docking station 2204. Thus, when UAV 2202 is docked, the UAV interface 2420 of the docking station 2204 may establish a physical, wired connection with a docking interface (described below) of the UAV 2202, and the docking station 2204 is operable to charge the battery(ies) of the UAV 2202 and to download/receive data from the UAV 2202. The UAV 2202 may operate (e.g., fly) using power from one or more batteries, which may periodically need recharging. The data downloaded from UAV 2202 to docking station 2204 may be data captured by a camera device and/or microphone device (both described below) of the UAV 2202, data from sensors of the UAV (described below), and/or data received by the receiver (described below) of the UAV 2202. To be sure, UAV 2202 may download data to the docking station 2204 other than by the wired connection provided by UAV interface 2420. For example, UAV 2202 may download data by wireless transmission, and such wireless downloads may be sent to docking station 2204 or to or another device/destination (described below). When UAV 2202 is docked, the docking station 2204 can also provide power to the UAV (e.g. AC power), in addition to charging the battery(ies). In FIG. 24B, UAV interface 2420 is provided in the form of pogo pins. As will be appreciated by one of ordinary skill in the art, UAV interface 2420 may also be provided as any other kind of connector suitable for the aforementioned power and data transfer. It will also be understood that the aforementioned power and data transfer can occur in either direction, from UAV 2202 to docking station 2204 or from docking station 2204 to UAV 2202. Docking station 2204 may but need not draw power, for transfer to UAV 2202 or for downloading data from UAV 2202, from a power source in vehicle 2206. Receiver 2515 of docking station 2204 may be configured to receive the data downloaded from UAV 2202, and storage 2511 of docking station 2204 may be configured to store the data downloaded from UAV 2202 and received by receiver 2515. Processor 2513 may perform analytics on the data downloaded from UAV 2202 to detect content of interest (as described below with respect to UAVs and their processors).

Figure 26A:
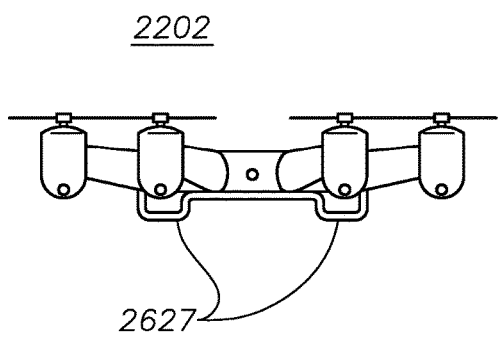
FIGS. 26A-26D depict, in accordance with some embodiments of the present disclosure, multiple views of a UAV, with FIG. 26A showing a front view with arms closed, FIG. 26B showing a front view with arms opened, FIG. 26C showing a bottom view, and FIG. 26D showing a side view.
Figure 26B:
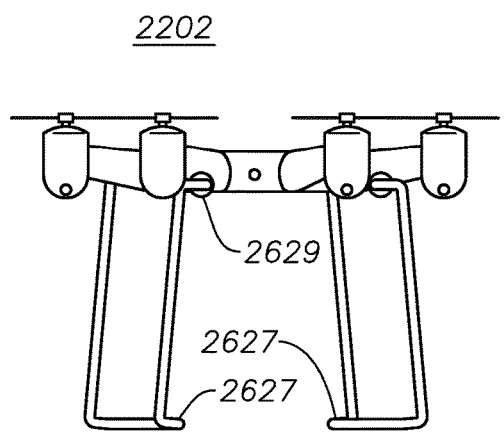
Figure 26C:
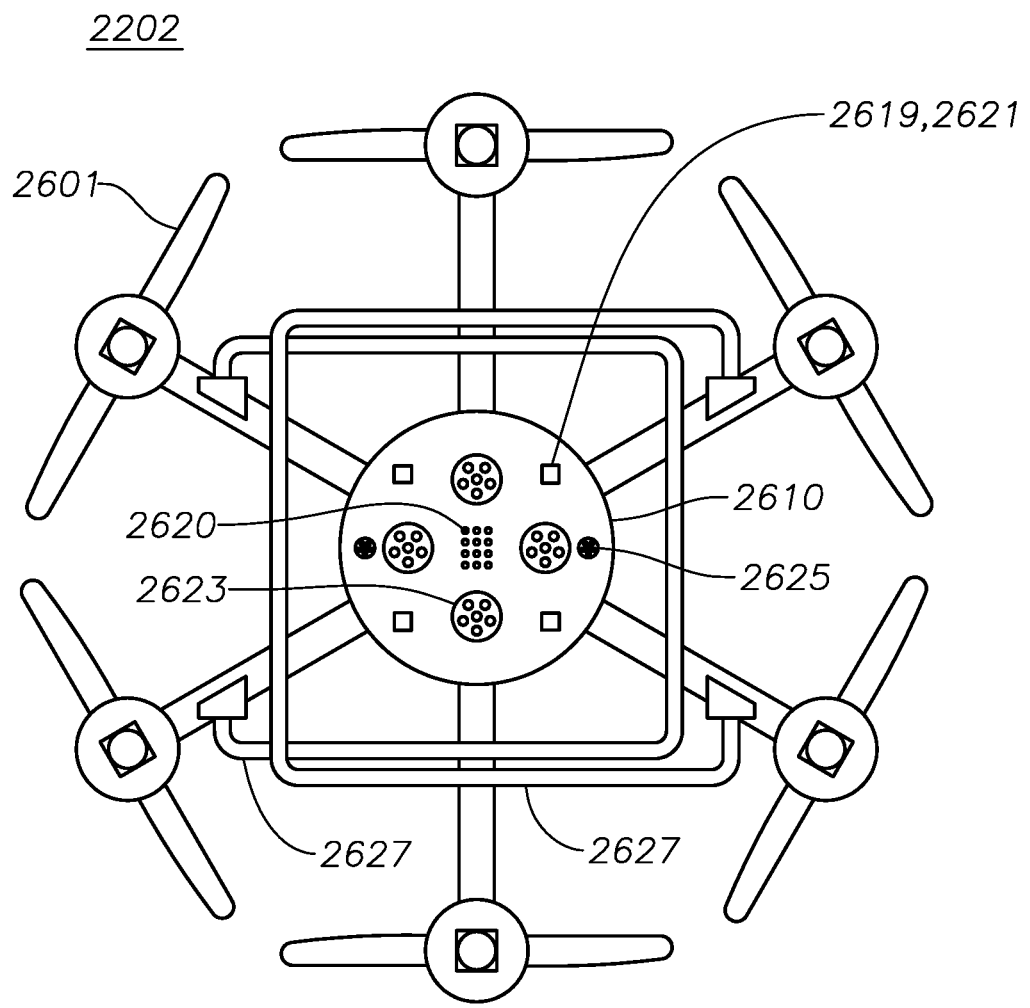
Figure 26D:
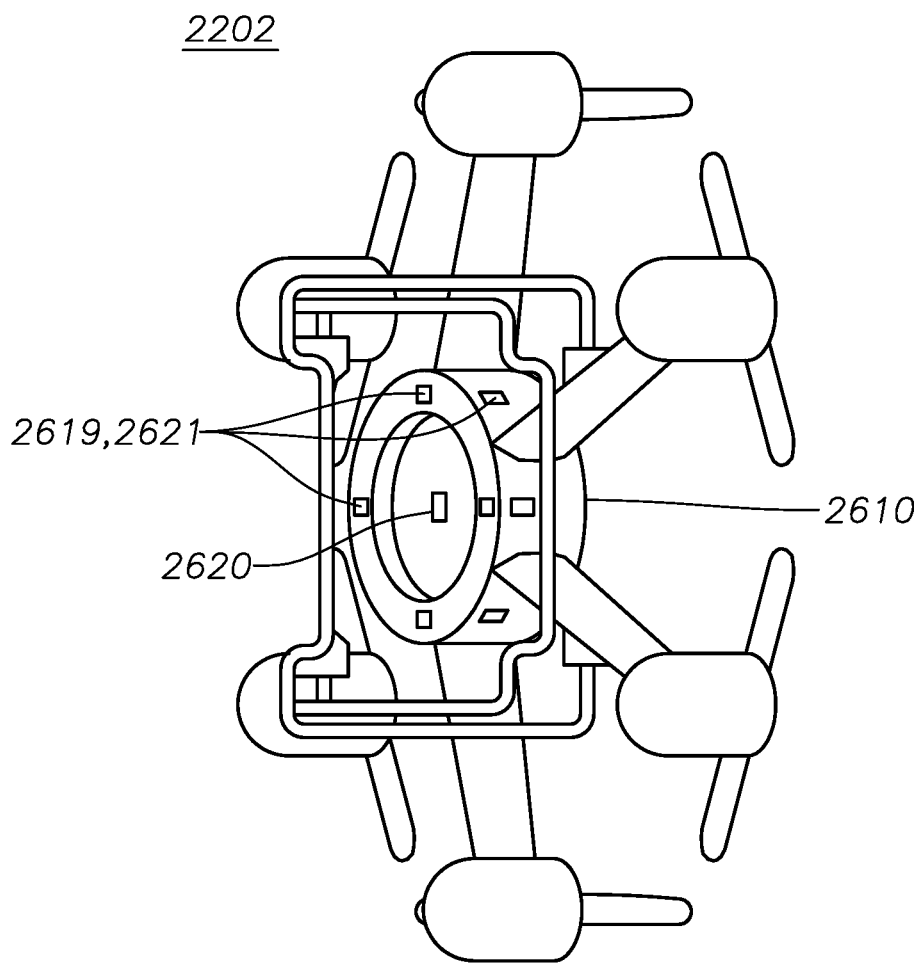

FIG. 26A-26D depict various perspective views of a UAV. FIGS. 26A and 26B illustrate a side view of UAV 2202 in a normal flying orientation. FIG. 26A illustrates UAV 2202 with arms 26 in a closed position, while FIG. 26B illustrates UAV 2202 with arms 26 in an opened position. FIGS. 26C and 26D illustrate bottom views of UAV 2202. FIG. 26C is a view the viewer would see if positioned directly beneath UAV 2202, while FIG. 26D presents a side view, with the UAV 2202 turned perpendicular to a normal flying orientation. While FIGS. 26A-26D show a hexacopter (six rotors), the embodiments disclosed herein are not limited to a hexacopter but may include any type of UAV, including, inter alia, single-rotor, dual-rotor and fixed wing aircraft.

UAV 2202 may be configured to dock with docking station 2204 mounted on vehicle 2206. UAV 2202 may have propellers 2601 powered by respective motors as its means of flight. UAV 2202 may include a housing or central body 2610 (containing further components, described below), a docking interface 2620, a camera device 2619, a microphone device 2621, one or more loudspeakers 2623, one or more sensors 2625, arms 2627 and motors 2629 for operating arms 2627. In various embodiments, UAV 2202 may include any subset of these components, and UAV 2202 may also include other components.

Camera device 2619 of UAV 2202 may be configured to capture audiovisual data (also referred to as image data), i.e., visual/video data, audio data, and metadata (either with or without separate audio and/or video tracks). In some embodiments, camera 2619 may be configured to capture only visual/video data; in some embodiments, camera 2619 may be configured to capture only visual/video data and metadata. Microphone device 2621 may be configured to capture audio data.

Camera device 2619 may include one or more cameras. For example, as seen in FIGS. 26C and 26D, camera device 2619 may include a plurality of cameras disposed at even intervals around the periphery of (an outward facing circular wall of) central body 2610 facing outward, as well as a plurality of cameras disposed at even intervals around the periphery of a bottom surface of central body 2610 facing downwards. The directions "outwards" and "downwards" are to be understood as relative to a normal flight orientation of UAV 2202, such as shown in FIGS. 26A and 26B. However, camera device 2619 may include any number of cameras, disposed in any arrangement/location of UAV 2202. The plurality of cameras disposed at even intervals around the periphery of UAV 2202 is one way that may permit or facilitate capture of visual or audiovisual data with a panoramic, 360-degree view from UAV 2202. The downward facing cameras may not only capture (audio)visual data of a scene or objects below them but, as mentioned above, may also facilitate landing and docking of UAV 2202 with docking station 2204 (e.g., aligning UAV 2202 with docking station 2204).

The one or more cameras of camera device 2619 may have fixed-focus or auto-focus lenses. Camera device 2619 may be used in place of, or in addition to, another camera device such as an in-car, e.g., dashboard-mounted, camera or a roof-mounted camera device. Since camera device 2619 is located on UAV vehicle 2202, which may fly above vehicle 2206 or a scene of interest, etc., camera device 2619 is advantageously positioned to provide a better perspective, and it may cover a wider area and a wider view than an in car/dash camera or a roof-mounted camera, which are constrained by their fixed, relatively low height, and whose view may be partly obstructed by vehicle 2206 or by virtue of their height and/or of their being located on vehicle 2206.

Microphone device 2621 of UAV 2202 may include one or more microphones. For example, as seen in FIGS. 26C and 26D, microphone device 2621 may include a plurality of microphones disposed at even intervals around the periphery of (an outward facing circular wall of) central body 2610 facing outward, as well as a plurality of microphones disposed at even intervals around the periphery of a bottom surface of central body 2610 facing downwards, in correspondence with the illustrated plurality of cameras of camera device 2619. However, microphone device 2621 may include any number of microphones, disposed in any arrangement/location of UAV 2202. The plurality of microphones disposed at even intervals around the periphery of UAV 2202 is one way that may permit or facilitate determination of the location of the origin of a sound captured by microphone device 2621. Similarly, where camera device 2619 captures audio data (e.g., audiovisual data as opposed to merely visual data), the plurality of cameras of camera device 2619 disposed at even intervals around the periphery of UAV 2202, as described, is one way that may permit or facilitate determination of the location of the origin of a sound captured by camera device 2619. (The determination of the location of the origin of a sound is discussed below.)

Figure 27:
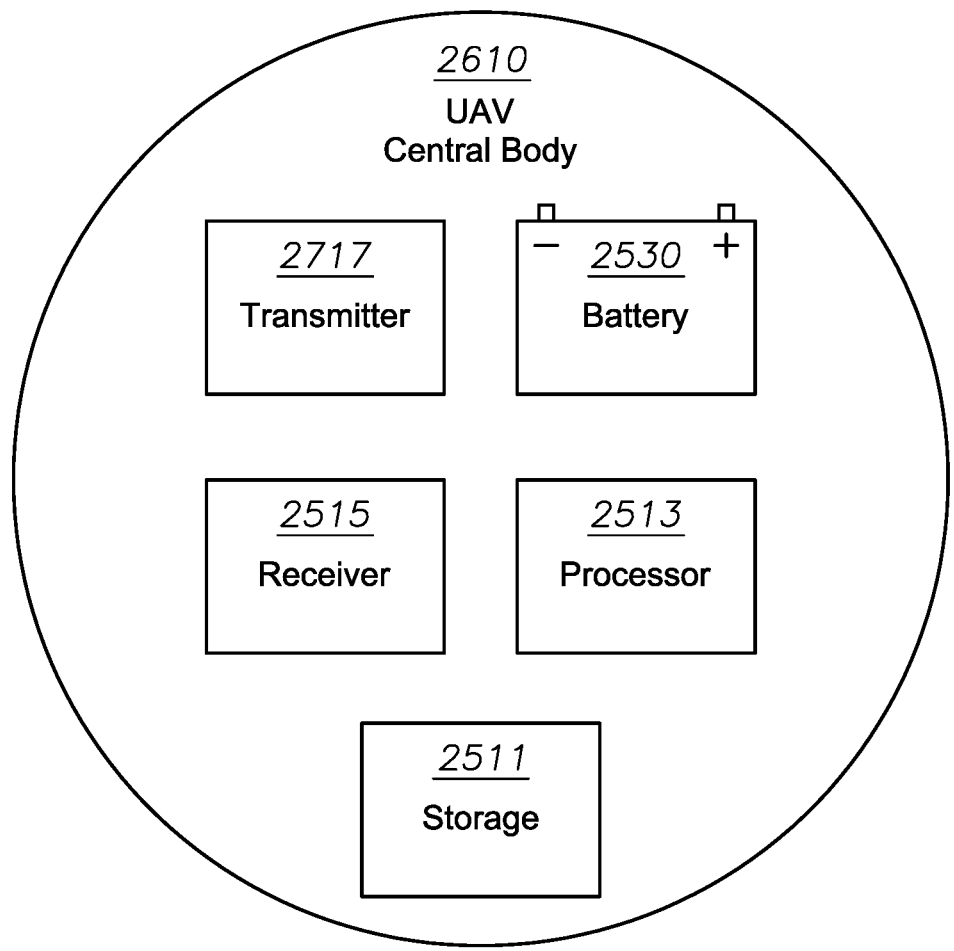
FIG. 27 is a block diagram showing a central body of a UAV and internal components thereof, in accordance with some embodiments of the present disclosure.

The housing or central body 2610 of UAV 2202 may contain various components inside housing 2610 and on housing 2610, and also provides a flat surface (whose size and shape may match that of housing 2410 of docking station 2204) to facilitate landing of UAV 2202 and stability of UAV 2202 while at rest. FIG. 27 is a block diagram showing internal components of central body 2610 of UAV 2202. As seen, central body 2610 may include storage 2711, processor 2713, receiver 2715, transmitter 2717, and battery 2730. (Though not shown in FIG. 27, other elements of UAV 2202, such as camera device 2619 and microphone device 2621, may be partly contained within central body 2610 and partly on the exterior of central body 2610.) In various embodiments, central body 2610 need not include any or all of these components, central body 2610 may include any subset of these components, and central body 2610 may include other components.

Receiver 2715 may be configured to receive wireless communications via a communication network as well as wired communications via a wired connection, e.g., to docking station 2204 when UAV 2202 is docked therein. Similarly, transmitter 2717 may be configured to transmit wireless communications via a communication network as well as wired communications via a wired connection, e.g., to docking station 2204 when UAV 2202 is docked therein. The reception and transmission of such communications has been described elsewhere in this disclosure and is known by one of ordinary skill in the art. Receiver 2715 and transmitter 2717 may refer to separate elements, as shown, or to different aspects/functional elements of a single transceiver (not shown). Storage 2711 may be linked with any or all of the camera device 2619, the microphone device 2621, the receiver 2715, the transmitter 2717, and the sensors 2625, and may be configured to store data captured by camera device 2619, data captured by microphone device 2621, data from sensors 2625, and/or data received by receiver 2715 (e.g., wireless communications). Processor 2713 may include one or more CPUs and GPUs. Processor 2713 may be linked with, and configured to exercise control over, any or all of camera device 2619, microphone device 2621, docking interface 2620, loudspeaker(s) 2623, sensors 2625, arms 2627, motors 2629 for operating arms 2627, receiver 2715, transmitter 2717, and storage 2711. For brevity, battery 2730 is referred to herein in the singular, although this element may include multiple batteries. Battery 2730 may be used as the sole or partial source of power for UAV 2202, to power the flight of UAV 2202 and the operation of the devices of UAV 2202 (receiver 2715, transmitter 2717, processor 2713, camera device 2619, microphone device 2621, etc.) Features and modes of operation pertaining to recharging of battery 2730, conserving battery 2730 power, and responding to situations of low battery 2730 power to avoiding running out of battery 2730 power are discussed below.

Returning to FIGS. 26C and 26D, loudspeaker(s) 2623 may be referred to more generally as speaker(s) 2623. While these figures show that UAV 2202 has one loudspeaker 2623 located on the underside of each propeller 2401 motor 2403, UAV 2202 may have one or more loudspeakers 2623, and loudspeaker(s) 2623 may be arranged/located anywhere on UAV 2202. Loudspeakers 2623 are operable to issue an audible alert, e.g., an alarm sound or a voice message, pre-recorded or live. In the context of the loudspeaker 2623, the audible alert is intended to encompass also a command, warning, public service announcement, or the like. E.g., a command might be officer (3405) commanding suspect (3409) to freeze (e.g., "freeze"), a warning might be a warning to officer (3405) of an imminent threat such as suspect (3409) having weapon (3452) and located within firing range of officer (3405) (e.g., "person with gun detected on passenger side of car"), and a public service announcement might be an announcement by officer (3405) instructing the public to move away from the scene and take cover due to a dangerous suspect (3409) with a weapon (3452) ("Take cover—man with gun!") (described below with reference to FIG. 34). Modes of operation employing loudspeakers 2623 are described below. Although not illustrated, UAV 2202 may also have a light device for issuing a visual alert (e.g., flash of light) or a light (e.g., flash of light) for the purpose of thwarting a suspect threatening or attacking an officer by obstructing the suspect's view, or for another purpose.

UAV 2202 may be provided with sensors 2625 of any of various types. While FIGS. 26C and 26D show two sensors 2625 located on the underside of UAV 2202 (across from each other, at the periphery), one or more sensors 2625 may be provided in any location/arrangement on UAV 2202. Some of the functions that may be performed by sensors 2625 are, broadly speaking, facilitating navigation (e.g., to avoid collisions), facilitating landing and docking, and collecting metadata to be used with data captured by camera device 2619 and/or microphone device 2621.

For example, sensors 2625 may be radar or sonar/ultrasonic devices capable of measuring distance to an object or speed of an object. The information obtained by such sensors may be used, e.g., to assist the UAV 2202 in navigation, e.g., to avoid collisions with objects, or to facilitate landing/docking. Such information may also be used to carry out policing functions, e.g., as a radar gun to detect speeding violations or the like. Sensors 2625 may be devices that collect information about the environment of the UAV 2202, e.g., temperature, that might be useful (e.g., for forensics) in association with data captured for evidentiary purposes. Sensors 2625 may also be GPS devices, altimeters, gyros or other sensor devices.

Arms 2627 are operated by motors 2629, which may open and close arms 2627. Motors 2629 may be, e.g., electric (e.g., gear) motors, hydraulic or pneumatic motors, or other suitable systems as will be appreciated by one of ordinary skill in the art. Arms 2627 may be characterized as clamping or folding arms. One use of arms 2627 is to secure UAV 2202, after it has landed, to the object on which it has landed. This may be useful, e.g., where the object on which the UAV 2202 has landed does not have a flat surface on which UAV 2202 can stably rest, or where the object is subject to instability (e.g., vehicle-mounted docking station 2204 is subject to movement of the police vehicle 2206; a fixed light pole may be subject to swaying from the force of the wind, etc.). Arms 2627 (and associated motors 2629) are one example of a perching mechanism operable to perch UAV 2202 on an object or surface (discussed further below). As such, arms 2627 arms (and associated motors 2629) may also be characterized as a landing assistance mechanism or a docking assistance mechanism. As will be appreciated by one of ordinary skill in the art, arms 2627 may be provided in configurations (e.g., shapes, sizes, locations, etc.) other than those illustrated herein.

Figure 28:
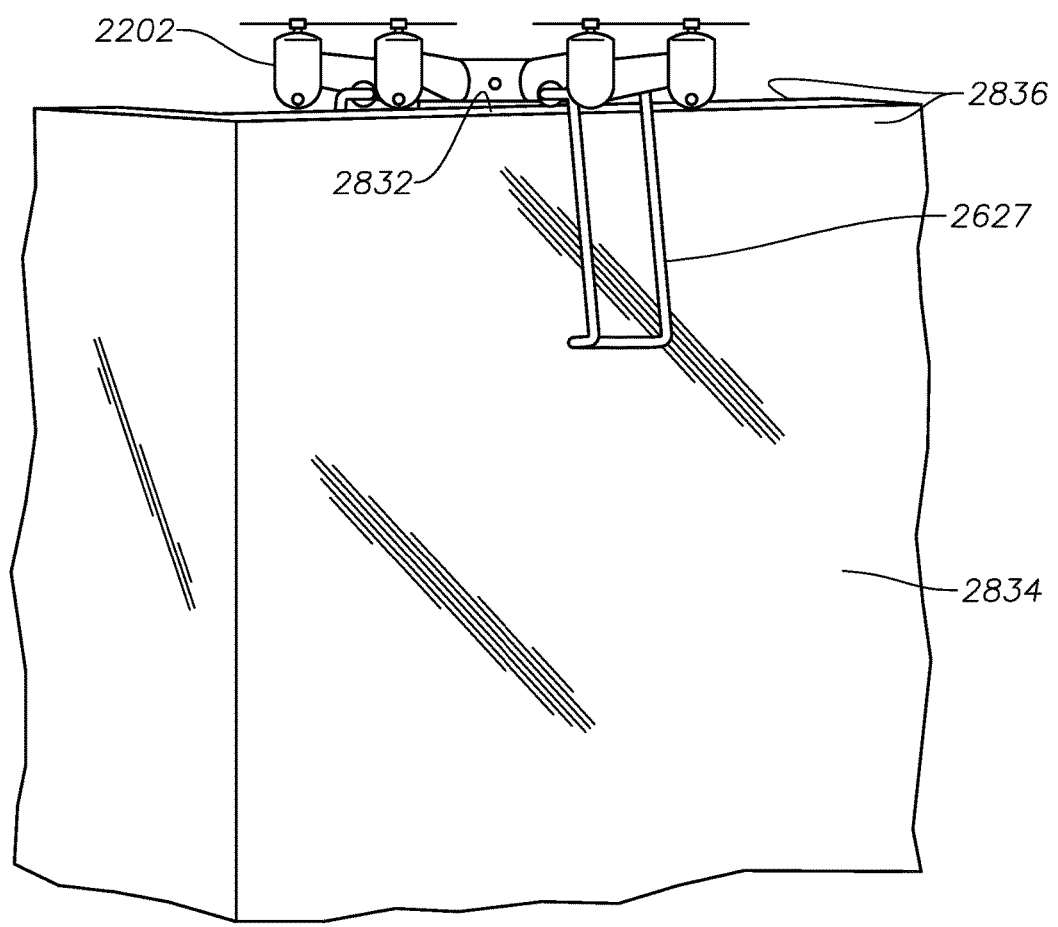
FIG. 28 depicts a scene in which a UAV is perching on a structure, in accordance with some embodiments of the present disclosure.
Figure 29A:
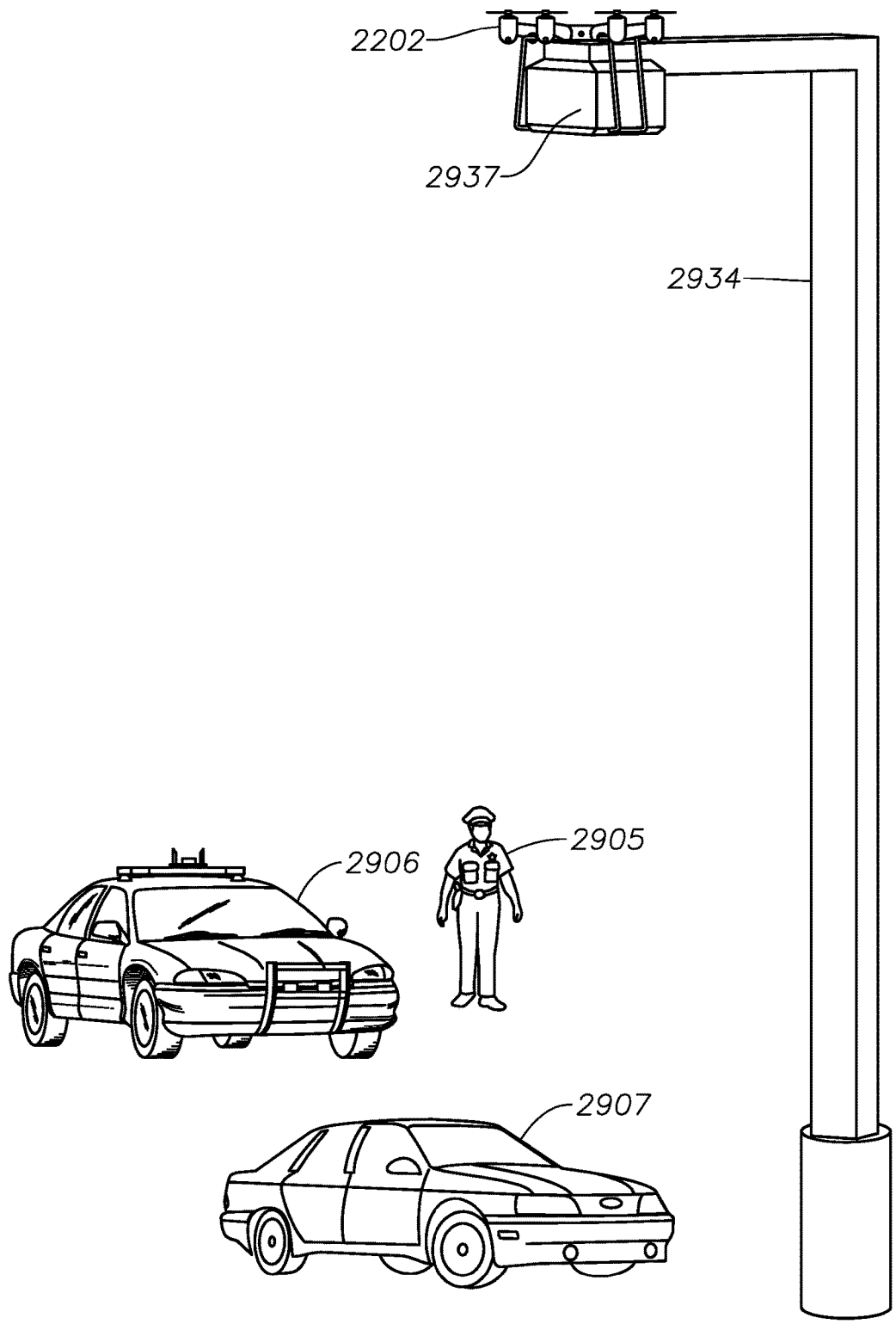
FIG. 29A depicts a scene in which a UAV is perching on a structure.
Figure 29B:
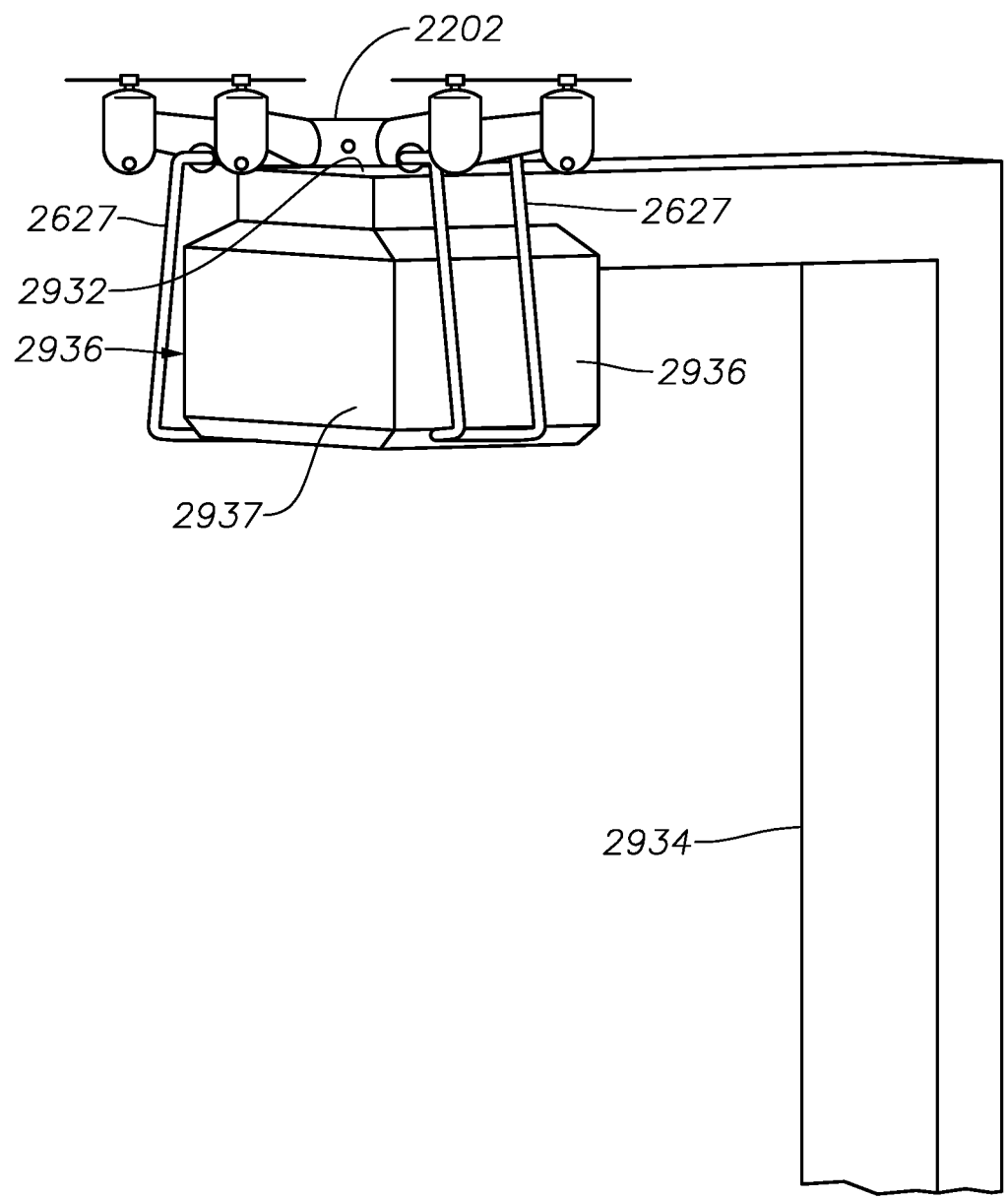
FIG. 29B is a close-up of the perched UAV, in accordance with some embodiments of the present disclosure.

FIGS. 28, 29A and 29B illustrate examples of arms 2627 in operation, with UAV 2202 perched on an object or surface. FIG. 28 illustrates a UAV 2202 perched on a structure such as a wall using arms 2627, while FIGS. 29A and 29B illustrate a UAV 2202 perched on a structure such as a light pole using arms 2627 (FIG. 29A illustrates the overall scene, and FIG. 29B illustrates a close up of UAV 2202 perched on the light pole). Other types of objects/surfaces on which UAV 2202 may perch include towers, trees, rooftops, etc.

The term "perch" refers to the UAV's landing and/or remaining on an object, where the object is generally at a level (altitude) elevated from the ground. Thus, while perched, the UAV is not moving/flying. A perched UAV may be affixed/connected to the object on which it is perched (e.g., by use of arms 2627) or simply resting on the object (e.g., perched on a flat platform, surface, etc. without any being connected to the object). The object on which a UAV perches may be man-made or natural, and may be stationary or mobile/moving. For convenience, this disclosure may speak of a UAV perching on an object, it being understood that, generally speaking, the UAV perches on a surface, such as the top surface, of the object.

As seen in FIG. 28, UAV 2202 lands upon a substantially flat, top surface 2832 of a wall 2834. Prior to landing, processor 2713 (FIG. 27) controls motors 2629 to open arms 2627; after landing, processor 2713 controls motors 2629 to move arms 2627 as if closing arms, so that the two arms 2627 clasp the respective two sides 2836 of the wall 2834, holding on to the wall 2834 with pressure applied by motors 2629. By holding on to the wall 2834, arms 2627 serve to retain UAV 2202 securely on the wall 2834, against forces that might otherwise destabilize UAV 2202 or cause UAV 2202 to fall off of the wall 2834, e.g., wind, gravity (e.g., if the center of gravity of UAV 2202 is not sufficiently well aligned with respect to the small landing surface 2832), another object hitting UAV 2202, etc.

As seen in FIGS. 29A and 29B, UAV 2202 lands upon a substantially flat, top surface 2932 of a street light pole 2934. Prior to landing, processor 2713 (FIG. 27) controls motors 2629 to open arms 2627; after landing, processor 2713 controls motor to move arms 2627 as if closing arms, so that the two arms 2627 clasp the respective two sides 2936 of a street light structure 2937 of street light pole 2934, holding on to (the sides 2936 of) structure 2937 with pressure applied by motors 2629. By holding on to the (the sides 2936 of) structure 2937, arms 2627 serve to retain UAV 2202 securely on the structure 2937, against forces that might otherwise destabilize UAV 2202 or cause UAV 2202 to fall off of the structure 2937, e.g., wind, gravity (e.g., if the center of gravity of UAV 2202 is not sufficiently well aligned with respect to the small landing surface 2932), another object hitting UAV 2202, etc. From its perched position on street light structure 2937, UAV 2202 may, e.g., monitor and capture video of the scene, including police officer 2905, police vehicle 2906, and suspect vehicle 2907. Because of its higher vantage point as compared to police officer 2905, perched UAV 2202 may be able to see parts of the scene, which may contain objects of interest or threats to police officer 2905, that police officer 2905 cannot see, e.g., UAV may be able to see behind suspect vehicle 2907, while police officer 2905 cannot (discussed further below).

Returning to FIGS. 26C and 26D, UAV 2202 may further include a docking (electrical) interface 2620 (A) configured to establish a wired connection with the docking station 2204 when the UAV 2202 is docked at the docking station 2204, and (B) operable to permit, via the wired connection, at least one of: (i) charging of a battery of the UAV 2202, and (ii) downloading of data from the UAV 2202 to the docking station 2204. Thus, when UAV 2202 is docked, the docking interface 2620 of the UAV 2202 may establish a physical, wired connection with the UAV interface 2420 (described above) of the docking station 2204, and the docking station 2204 is operable to charge the battery(ies) of the UAV 2202 and to download/receive data from the UAV 2202, as described above. In FIGS. 26C and 26D, docking interface 2620 is provided in the form of pogo pins. As will be appreciated by one of ordinary skill in the art, docking interface 2620 may also be provided as any other kind of connector suitable for the aforementioned power and data transfer. Preferably, docking interface 2620 of UVA 2202 and UVA interface 2420 of docking station 2204 are provided as devices compatible for mating with each other, in order to permit battery charging and data downloading as described.

Figure 30A:
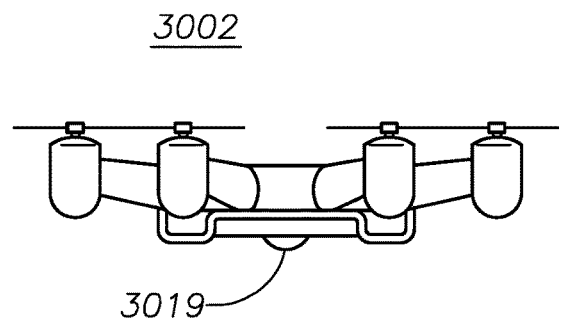
FIGS. 30A and 30B depict multiple views of a UAV including an alternate camera system, with FIG. 30A showing a front view thereof and FIG. 30B showing a bottom view thereof, in accordance with some embodiments of the present disclosure.
Figure 30B:
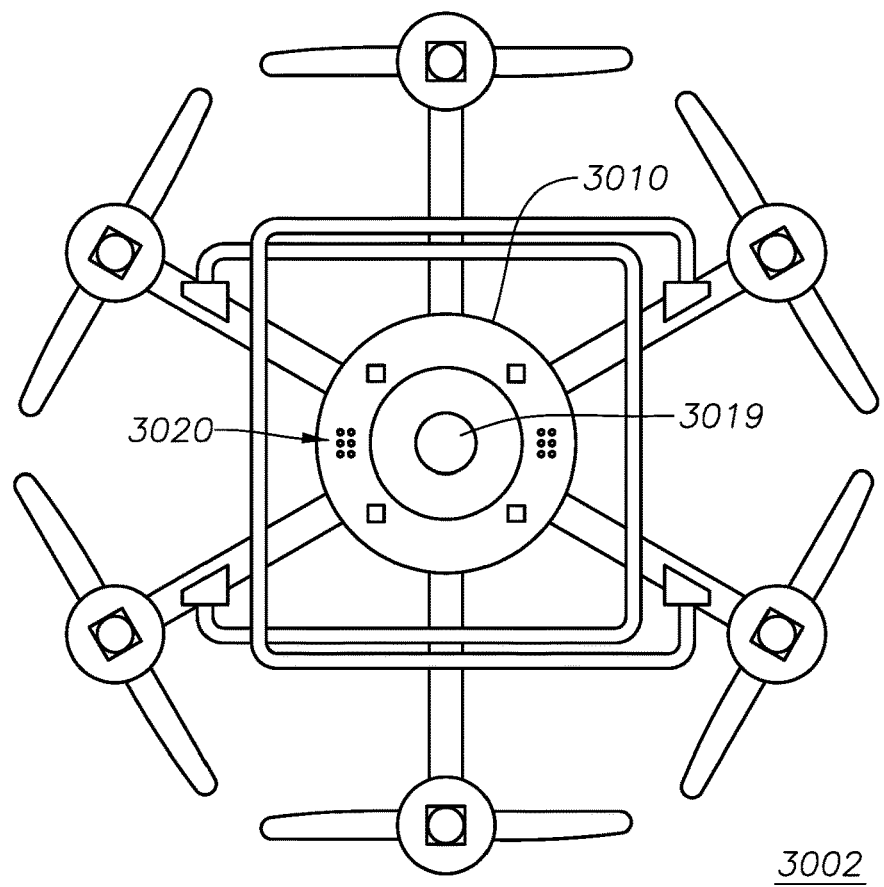

FIGS. 30A and 30B illustrate a UAV 3002 according to some alternate embodiments. UAV 3002 differs from UAV 2202 by virtue of having a camera device 3019 different from camera device 2619 of UAV 2202 (UAV 2202 including camera device 2619 is illustrated in FIGS. 26A-D). Whereas camera device 2619 included an array of cameras evenly distributed around the periphery of housing 2610 of UAV 2202, in the case of UAV 3002 camera device 3019 is a 360 degree spherical camera disposed at the center of the underside of UAV 3002. As with camera device 2619, camera device 3019 represents another way to obtain a 360 degree view of the scene around the UAV 3002/2202. While an array of cameras around the periphery of the UAV may provide 360 degrees of coverage azimuthally, this coverage may be limited in its vertical extent (perpendicular to the azimuthal extent), i.e., may not reach the zenith or nadir. A spherical camera may facilitate 360 degrees of coverage both azimuthally and vertically. In the case of a UAV, if the spherical camera is placed on the underside of the UAV central body, it may be expected to be blocked (by the central body of the UAV above it) from obtaining vertical coverage above the horizon defined by the plane of the bottom surface of the UAV central body, and if the spherical camera is placed on the top of the UAV central body, it may be expected to be blocked (by the central body of the UAV below it) from obtaining vertical coverage below the horizon defined by the plane of the top surface of the UAV central body. Accordingly, in some embodiments, the UAV may have two 360 degree spherical cameras, one on the bottom of the UAV central body and one on the top of the UAV central body. In other embodiments, the same or similar coverage may be obtained by providing a peripheral array of cameras on the top of the UAV central body in addition to the cameras of camera device 2619. In view of the different camera device 3019 (and its different location) on UAV 3002, as compared to camera device 2619 of UAV 2202, the location of the docking interface 3020 on UAV 3002 is also different as compared to that of UAV 2202. In UAV 2202, the docking interface 2420 was in the center of the underside of the central body. In UAV 3002, that location is occupied by the spherical camera 3019. Therefore, in UAV 3002, the docking interface 3020 has been shifted to a different location on the underside of the central body 3010, specifically, two sets of pogo pins are provided 180 degrees across from each other on the periphery of the underside of the central body 3010. In this case, the pogo pins on docking station 2204 would be shifted correspondingly to permit mating with the pogo pins of UAV 3002. Of course, alternate positions of the pogo pins on UAV 3002 (and docking station 2204) are possible.

Instead of or in addition to the spherical camera, another type of camera that may be used is a zoom block type camera. In some embodiments, thermal cameras, infrared cameras, or other types of cameras may be employed. In some embodiments, cameras may be mounted on a (e.g., two-axis or three-axis) gimbal.

Figure 31:
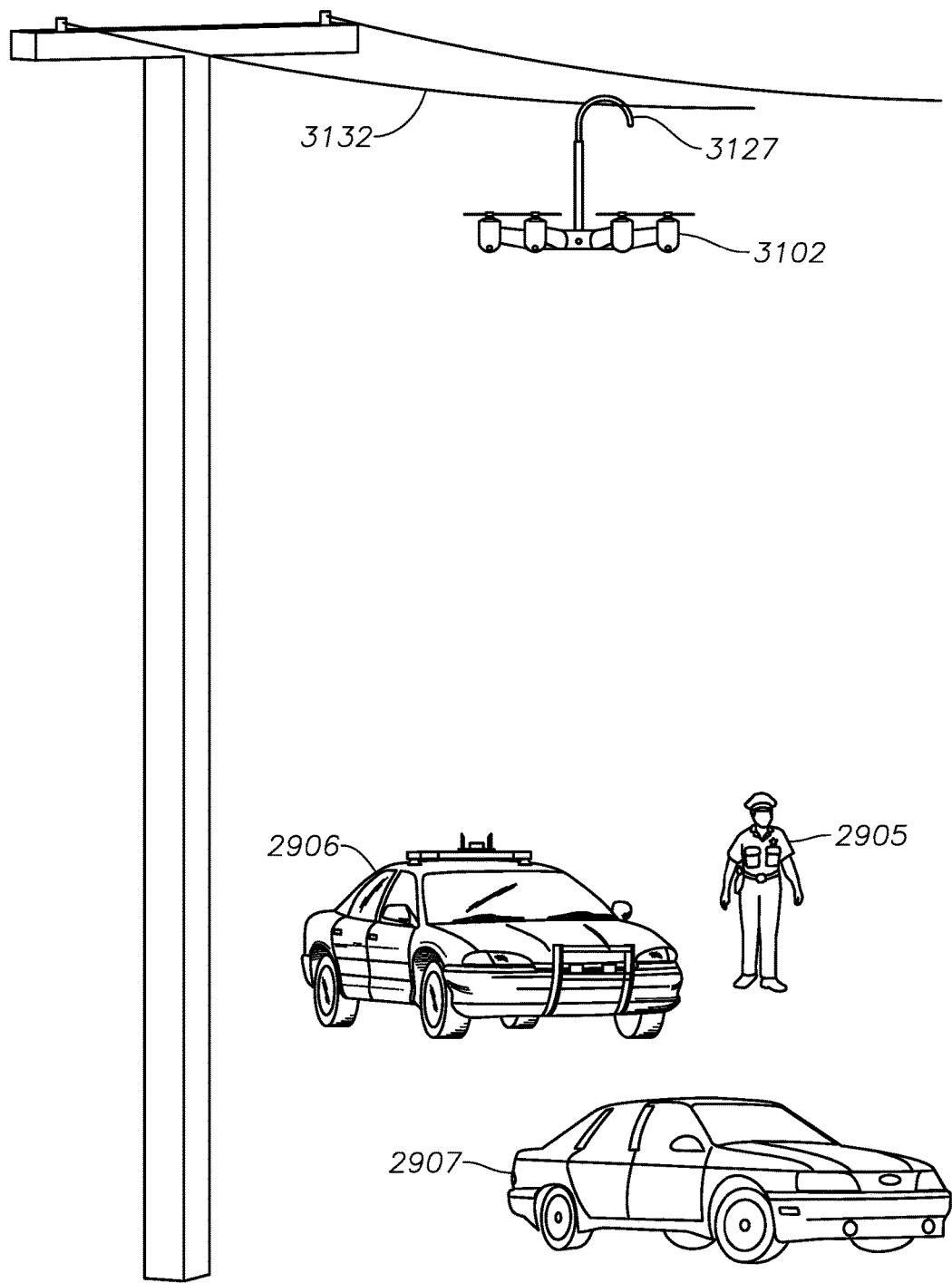
FIG. 31 depicts a scene in which a UAV is perching on a structure, the UAV having an alternate perching mechanism, in accordance with some embodiments of the present disclosure.

FIG. 31 illustrates a UAV 3102 according to some alternate embodiments. UAV 3102 differs from UAV 2202 by virtue of having a hook 3127 in contrast to arms 2627 of UAV 2202 (UAV 2202 including arms 2627 is illustrated in FIGS. 26A-D). Like arms 2627, hook 3127 serves as a perching mechanism, or landing/docking assist device. Hook 3127 facilitates perching on a structure such as a cable, hook, or the like. In FIG. 31, hook 3127 permits UAV 3102 to perch on a telegraph wire 3132 or the like. Hook 3127 may be provided as a rigid/fixed hook or as a movable hook. A movable hook could have a telescoping feature permitting the body 3128 (i.e., straight portion) of hook 3127 to increase and decrease in length (i.e., vertical distance, in FIG. 31). Hook may be provided with a motor (not shown) to operate the telescoping feature, i.e., increase or decrease the length of the body 3128 of hook 3127. The telescoping feature may be useful in various scenarios. For example, where the structure used for perching (here, telegraph line 3132) is too far from (too high, relative to) the scene of interest on the ground below, and the UAV 3102 is intended to capture audiovisual data of that scene, the telescoping feature permits the UAV 3102 to lower itself to become closer to the scene of interest. As another example, if an obstacle, between UAV 3102 and the structure to be used for perching, prevents UAV 3102 from coming too close to the structure to be used for perching, the telescoping feature may permit the UAV 3102 to perch on the structure to be used for perching despite the distance between UAV 3102 and the structure to be used for perching.

As arms 2627 and hook 3127 are each best suited for perching on respective different types of structures, it is of course possible for a UAV to be provided with both arms 2627 (and associated motors 2629) and hook 3127. In some embodiments, UAV may be provided with another perching mechanism having other mechanism for attaching UAV to, or keeping UAV stable on, an object, such as a magnetic or electromagnetic perching device, a suction perching device, etc.—any of a range of perching mechanisms, as will be understood by one of ordinary skill in the art.

Figure 32:
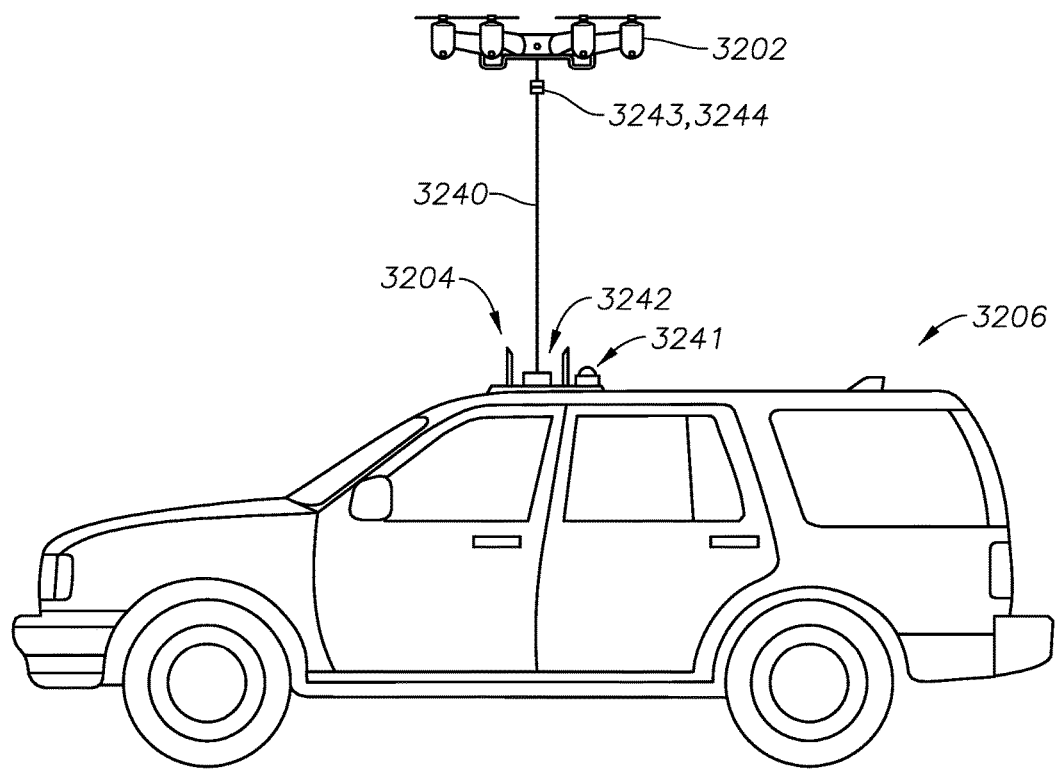
FIG. 32 depicts an alternate system including a UAV, a docking station for a UAV, and a vehicle on which the docking station is mounted, wherein the UAV is tethered to the vehicle/docking station, in accordance with some embodiments of the present disclosure.

FIG. 32 illustrates a system including a UAV 3202 and a docking station 3204 for UAV 3202, wherein the docking station 3204 is configured for mounting on a vehicle 3206 and is configured for permitting UAV 3202 to dock at the docking station 3204, according to some alternate embodiments. The system of FIG. 32 differs from that of FIGS. 22 and 23 in that docking station 3204 further includes a tether or umbilical 3240 configured for physically connecting docking station 3204 to UAV 3202. Each of UAV 3202 and docking station 3204 has an appropriate tether interface for connection to tether 3240. Docking station 3204 further has a winch 3241, powered, e.g., by an electric motor, for reeling tether 3240 out, permitting UAV 3202 to fly farther away (or higher) from docking station 3204, and reeling tether 3240 in, for bringing UAV 3202 closer to docking station 3204. UAV 3202 can also be completely reeled in by winch 3241 so as to dock in docking station 3204. Tether 3240 has a docking station electrical interface 3242 configured to establish a wired connection with the docking station 3204, and a UAV electrical interface 3243 configured to establish a wired connection with the UAV 3202 when the UAV 3202 is connected to the tether. Each of docking station 3204 and UAV 3202 has a corresponding electrical interface to establish the wired connection with tether 3240. All of these electrical interfaces may be similar to those described above (2420, 2620) or configured in another manner. Tether 3240 is operable to permit, via these wired connections, one or both of: (A) charging of a battery 2730 of the UAV 3202, and (B) downloading of data from the UAV 3202 to the docking station 3204. With regard to (A), power drawn from docking station 3204 (perhaps drawn ultimately from a source within vehicle 3206) may be transmitted via the wired connections and the tether 3240 to the UAV 3202. It will also be understood that this power and data transfer can occur in either direction, from UAV 3202 to docking station 3204 or from docking station 3204 to UAV 3202. Other aspects of this power and data transfer are as described above in the discussion of the power and data transfer between UAV 2202 and docking station 2204 when the UAV 2202 is docked in docking station 2204, except for the fact of the tether 3240 as an intermediary and any aspects incidental to that fact, as will be appreciated by one of ordinary skill in the art.

As for the physical connection between tether 3240 and UAV 3202, and the physical connection between tether 3240 and docking station 3204, each of these elements (tether 3240, UAV 3202, and docking station 3204) may be configured with a physical interface for connecting to the pertinent other one(s) of these elements, such as physical interface 3244 of tether 3240 for connecting to UAV 3202. The physical interface and the electrical interface for any of these elements may or may not be formed integrally as a single, combination interface. The physical interfaces may be configured so as to permit physical connecting or disconnecting (i.e., releasing of the physical connection) of the two elements (e.g., tether 3240 and UAV 3202) by manual operation of the interface by a user, by remote instruction (e.g., transmitted wirelessly to the processor 2513 of docking station 2204 or to processor 2713 of UAV 2202), automatically upon satisfaction of specified condition (which may be referred to as "auto release" or "auto disconnect"), or in another manner. Such specified condition may be the same as or similar to any of the conditions described elsewhere herein, e.g., with respect to launching or landing of the UAV, detecting content in captured data, etc. In some embodiments, the tether 3240 may be connected to another structure/device of/on vehicle 3206 or to vehicle 3206 itself (or to another device separate from/external to vehicle 3206), rather than to docking station 3204. In this case, the winch 3241, interfaces, etc. may correspondingly be part of or connected to the other structure/device/vehicle 3206 itself, and the functionalities described here (e.g., battery charging, data download) would hold but involve the other structure/device/vehicle 3206 itself rather than the docking station 3204.

Figure 39A:
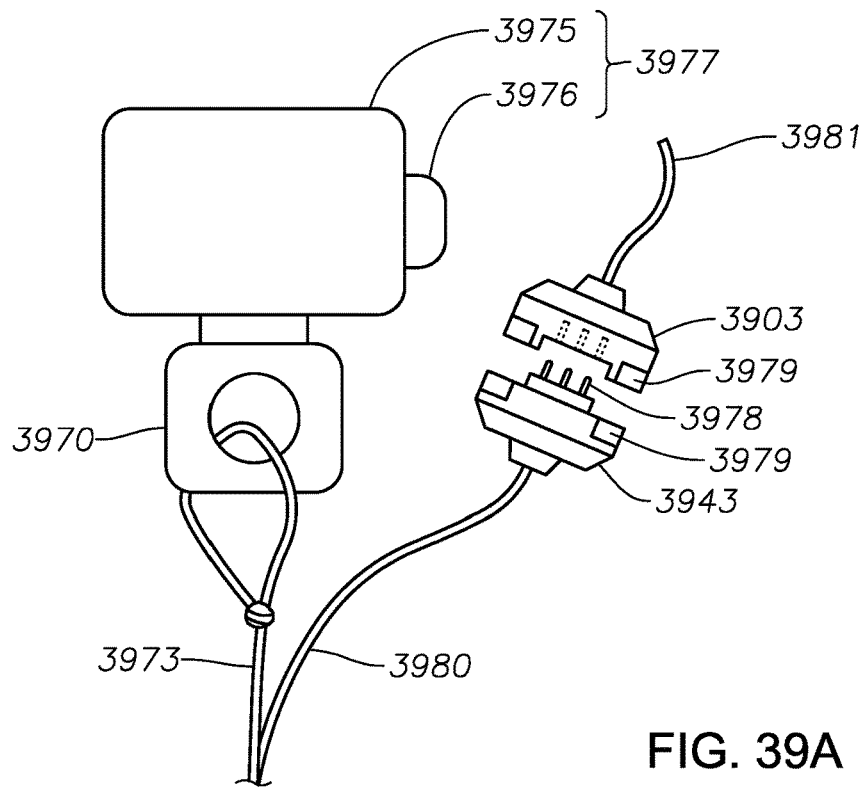
Figure 39B:
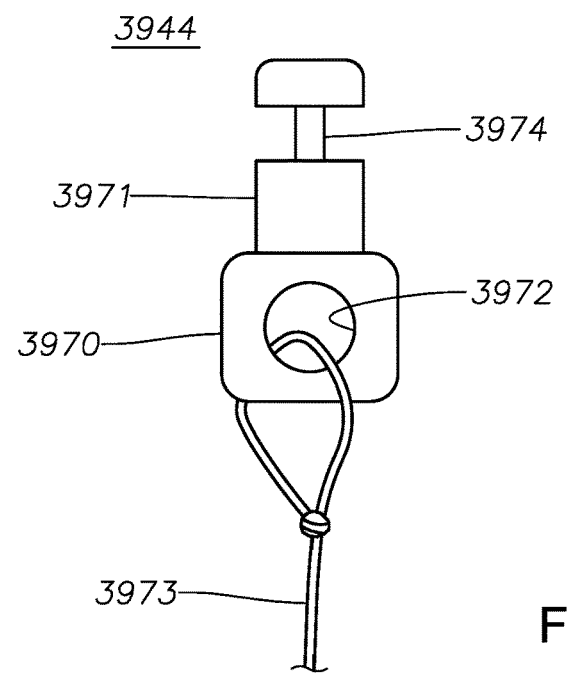

FIGS. 39A and 39B illustrate an example of a physical interface and an electrical interface between a tether (such as tether 3202 shown in FIG. 32) and a UAV. FIG. 39A shows both the tether portion and the UAV portion of both the physical and electrical interfaces, while FIG. 39B shows the tether portion of the physical interface. As seen in FIG. 39A, according to this example, the physical and electrical interfaces between the tether and the UAV are separate from one another.

The physical interface between the tether and the UAV operates by means of a spring-loaded locking mechanism (not shown), actuated by an actuator, for securing the tether and the UAV to each other and releasing them from one another. The tether's physical interface 3944 (see FIG. 39B) includes a plug base 3970 and a plug 3971. Plug base 3970 and plug 3971 may be formed, e.g., integrally as a single piece or as two pieces, which are securely attached to one another. Plug base 3970 has a receiving hole 3972 through which the cable portion 3973 of the tether is looped, as shown, so as to secure the cable portion 3973 to the tether's physical interface 3944; in other embodiments, the cable portion 3973 may be secured to the tether's physical interface 3944 in other ways. The plug 3971 has a groove 3974 and is configured for mating insertion into a receiver housing 3975 of the UAV, shown in FIG. 39A. Receiver housing 3975 may be formed, e.g., integrally with the UAV body or as a separate element, which is securely attached to the UAV body. When the plug 3971 having the groove 3974 is inserted into the receiver housing 3975, the locking mechanism, which is disposed inside the receiver housing 3975, clasps the plug 3971 around the groove 3974 to securely retain the plug 3971 in the receiver housing 3975. In this way the tether and the UAV are physically connected to one another, by means of the physical connection between the plug 3971 and the receiver housing 3975. The locking mechanism is actuated by an actuator 3976, which may be a gear motor or solenoid, as shown in FIG. 39A. The actuator 3976 can lock (or close or secure) the locking mechanism, as described, by clasping the plug 3971 around the groove 3974 thereof, and the actuator 3976 can release (or open) the locking mechanism, by releasing its clasping force on the plug 3971. When the actuator 3976 releases the locking mechanism, this serves to release or disconnect the tether and the UAV from each other. The receiver housing 3975 and the locking mechanism, including actuator 3976, may be deemed to constitute the physical interface 3977 of the UAV, although this physical interface 3977 may include other elements. Actuator 3976 may be configured to permit its being operated remotely.

The electrical interface between the tether and the UAV operates by means of spring-loaded pogo spring pins and magnets. Specifically, the tether includes a UAV electrical interface 3943 and the UAV includes a tether electrical interface 3903. These electrical interfaces 3903 and 3943 are provided with pogo pins 3978 to establish an electrical connection therebetween. Electrical interfaces 3903 and 3943 are also provided with magnets 3979, which assist in keeping electrical interfaces 3903 and 3943 physically connected to each other. A power/data cable 3980 connects the tether's UAV electrical interface 3943 to the tether, and a power/data cable 3981 connects the UAV's tether electrical interface 3903 to the UAV. Each power/data cable 3980, 3981 is configured to transmit electrical power and data. By means of electrical interfaces 3903, 3943 and the power/data cables 3980, 3981, the tether and the UAV may be electrically connected (and disconnected) and electric power and data can be transmitted therebetween (and such transmission can be prevented by disconnection). Connecting and disconnecting of the electrical interfaces 3903, 3943 can be performed manually or by means of a mechanism (not shown). In some embodiments, magnets 3979 may be electromagnets configured to be operated remotely, such that the magnetic attractive force therebetween may be turned on (for securing interfaces 3903, 3943 to each other) and off (for releasing interfaces 3903, 3943 from each other) remotely.

Of course, the above example illustrated by FIGS. 39A and 39B is merely one of any number of possible arrangements providing for the physical and electrical connection and disconnection of a UAV and a tether, as will be understood by one of ordinary skill in the art. In some other arrangements, the physical interface and the electrical interface may be combined into a single structure/mechanism.

We turn now to a description of the disclosed systems/embodiments in terms of their operations, functionalities and methods of use. (It is noted, however, that operations pertaining to charging of the battery of the UAV and to downloading of data from the UAV, via the docking station or via a tether, have been described above).

UAVs and systems including UAVs as described above may employ and adapt methods and operations described in connection with FIGS. 1-21. UAVs and systems including UAVs as described above may also be incorporated with/into systems described in connection with FIGS. 1-21, in some cases with appropriate modifications in view of the UAV and UAV systems.

The following discussion includes methods and operations in support of UAV functionality (e.g., launching, landing, docking, collision avoidance, power saving) as well as methods and operations that leverage UAV capabilities in support of other functionalities, tasks, missions, etc. (e.g., data collection; monitoring and tracking of people/objects/situations/scenes; providing notifications and alerts; data characterization and triggering actions; reception, transmission, storage, and communication of data collected by the UAV or by other devices). In some cases, the same basic functionality (e.g., shape and pattern detection) may support both the methods and operations in support of UAV functionality (e.g., collision avoidance) and those in support of other functionalities, etc. (e.g., detecting objects of interest identified in a BOLO alert). The operations of the UAV described in the instant disclosure may be performed by the UAV whether the UAV is airborne, tethered, perched/landed, or docked in docking station, except for those operations that are inapplicable to the UAV's situation/status, e.g., if the UAV is docked it cannot fly or land, if the UAV is untethered and airborne, it cannot transmit communications/data via a wired connection, etc.

In some embodiments, the processor (e.g., 2713) of a UAV may be a device similar or identical to the computer 12 described above in connection with FIGS. 1-13 (except that the processor is located on the UAV, whereas computer 12 was described as residing in vehicle 10). Thus, the UAV processor may possess all of the functionalities of computer 12, including its links and abilities to interact with other devices.

In some embodiments, the UAV may include any or all of the elements and functionalities of the first device 110 described above in connection with FIGS. 14-21, including its links and abilities to interact with other devices. In this regard, the functionalities described in the discussion of FIG. 18 may be noted in particular. Of course, it is understood that while first device 110 was described as a body worn camera (BWC) wearable by a person, the UAV is not necessarily intended to replicate the form factor (size) or light weight of a BWC.

Figure 33:
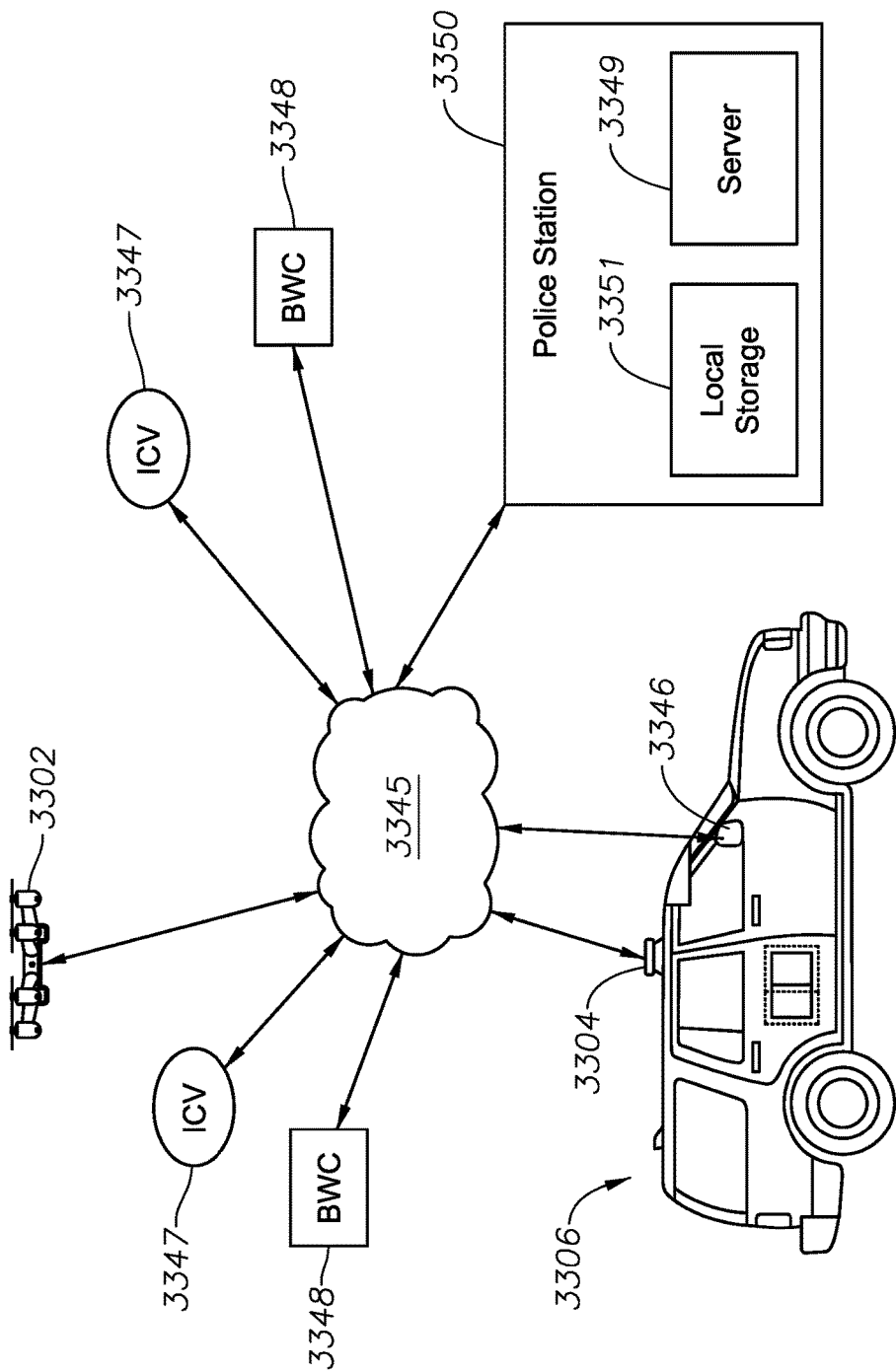
FIG. 33 depicts a system such as that of FIG. 23 but also including a communications network, in-car video camera devices of police vehicles, body worn cameras of police officers, and a server of police headquarters, all of the elements operable to communicate with one another via the communications network, in accordance with some embodiments of the present disclosure.

FIG. 33 is an example of how a UAV system may be incorporated into the systems described above in connection with FIGS. 1-21. As seen in FIG. 33, UAV 3302 may be part of a system wherein UAV 3302 is linked via one or more communication networks 3345 (one shown) with docking station 3304, an in-car-video (ICV) 3346 of vehicle 3306 (on the scene) on which docking station 3304 is mounted (also referred to as "host vehicle"), any number of ICVs 3347 of other respective vehicles (two ICVs shown) (which may be on the scene or not), any number of BWCs 3348 (two shown) (which may be on the scene or not), and a remote server 3349 (associated with local storage 3351) in central dispatch/headquarters 3350. All of these elements are linked to one another via communication network(s) 3345. The communication links are indicated by the double-headed arrows in the figure. Communications network(s) 3345 may include any of, e.g., Internet, Cloud, radio network, Bluetooth, Wi-Fi, 3G, 4G, LTE, satellite, etc., or any other type of communication network discussed above in connection with FIGS. 1-21 or known by one of ordinary skill in the art to be suitable for the arrangements and functions/purposes set forth herein. Of course, UAV 3302 (and the other elements) may also be linked to other devices having appropriate functionalities and to more than one remote server or the like (e.g., in various regional offices). The ICVs 3346 and 3347, BWCs 3348 and server 3349 may each include the elements shown in FIG. 25 (viz., processor, transmitter, receiver, storage (storage may include different kinds of short-term and long-term memory)). Any ICV 3346 or 3347 or other ICV mentioned in this disclosure may be physically mounted in (e.g., attached to and/or hardwired into) the vehicle, either permanently or in a detachable/removable manner, or it may be not physically mounted in the vehicle, e.g., an ICV could be a portable device such as a laptop computer, tablet, etc., which could be completely freestanding, physically unconnected to, and not wired to the vehicle; any variation along this continuum of connectedness to the vehicle is possible for an ICV. FIG. 33 may be understood as a system including the systems (all the elements thereof) of FIGS. 1, 10 and 11, as well as a UAV system (even though the depiction of FIG. 33 may differ from the depictions of FIGS. 1, 10 and 11). Various methods and operations of a UAV/UAV system described in connection with FIGS. 22-37, 39A and 39B will be understood as making use of a system and communication links such as shown in FIG. 33.

We now describe some specific operations and methods of use of a UAV system, which may or may not draw upon the capabilities/functionalities of the systems described above in connection with FIGS. 1-21. In the below, where operations and methods of use of a UAV system are described that are similar or identical to subject matter described in connection with FIGS. 1-21, such operations and methods of use may be described only in brief, it being understood that further detail thereof is to be found in the description provided in connection with FIGS. 1-21, even if explicit reference to that description is not made.

Figure 34:
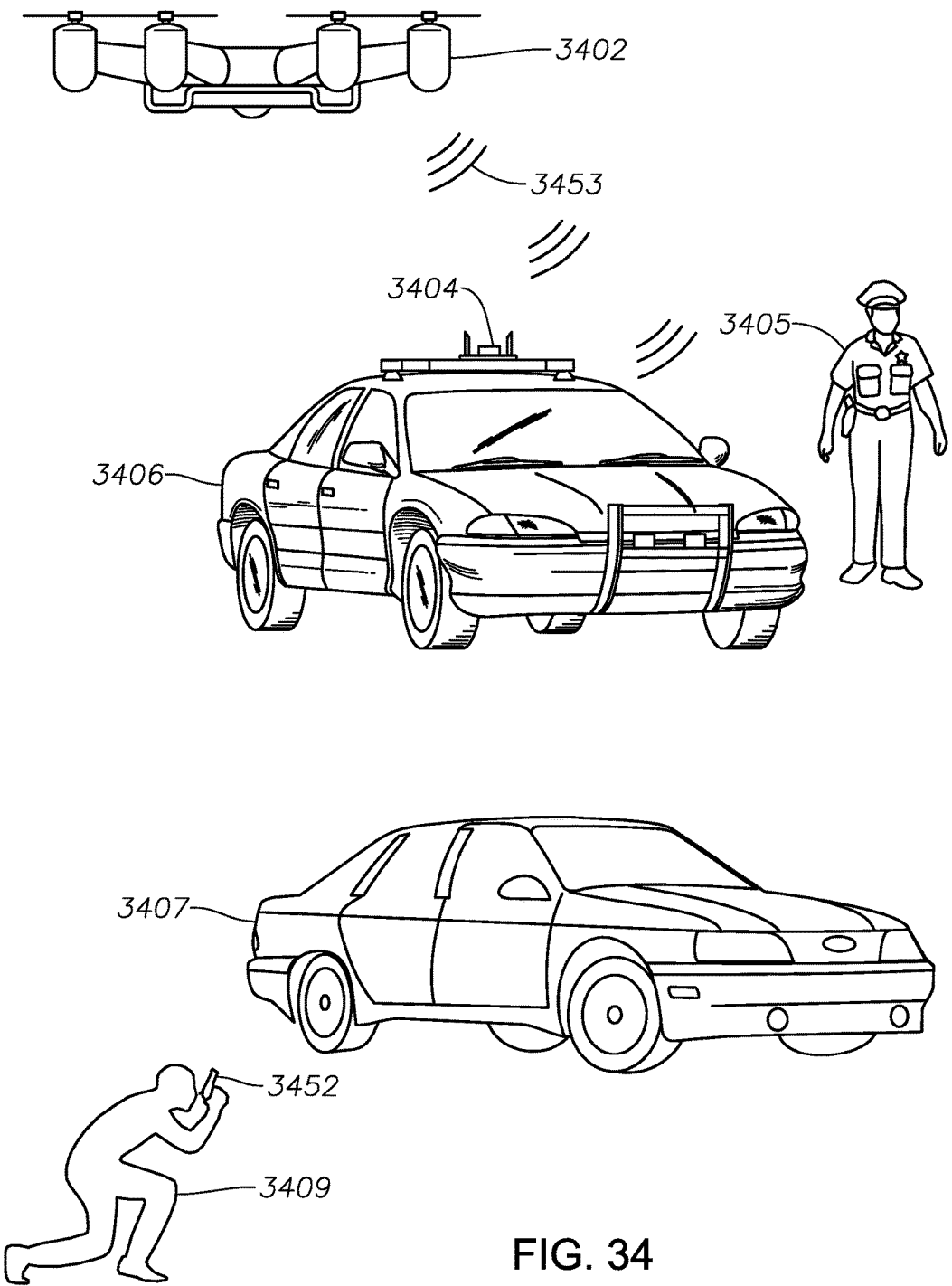
FIG. 34, in accordance with some embodiments of the present disclosure, depicts a scene including a system such as that of FIG. 23, and also a police officer, a suspect vehicle and a suspect on the scene, with the UAV monitoring the scene, detecting a threat (suspect with weapon), and issuing an alert.

FIG. 34 illustrates a UAV system in operation during a scene of police activity. UAV 3402 may assist police by performing tasks such as monitoring and capturing audio-visual data of the scene/ongoing situation, searching for threats such as suspicious persons and objects and threatening actions and movements by people or objects in the scene (i.e., analyzing captured audiovisual data for such threats, etc.), tracking police officers and/or threatening/suspicious people/objects in the scene, providing notifications and/or alerts to the police officers or other people in the scene, and triggering appropriate actions based on the analysis of the captured data. In this way, the UAV 3302 may help protect the police officers and others on the scene, capture evidence of crimes/acts committed on the scene, and support other police goals. At the same time as performing the above-mentioned actions, UAV 3302 may also be searching for other objects/people of interest unrelated to the scene, based on information received from sources not at the scene (e.g., notifications/alerts from police headquarters, etc.)

In particular, FIG. 34 shows a scene, which may be a potential crime scene, including a UAV 3402, a docking station 3404, a police vehicle 3406, a police officer 3405, another vehicle 3407, and a suspect 3409 carrying a gun 3452. UAV 3402 is in flight, having been launched from docking station 3404 on police vehicle 3406. Being airborne, UAV 3402 has a higher vantage point than that of police officer 3405. UAV 3402 is thus able to 'see' more of the scene than is police office 3405. UAV 3402 uses its camera device (e.g., 2419 or 2619) to capture video or audiovisual data of the scene below/around it. UAV 3402 may also use its microphone device (e.g., 2421 or 2621) to capture audio data of the same. UAV 3402 uses its processor (e.g., 2713), which may include CPU(s) and GPU(s), to analyze the data captured by the camera device and microphone device, using its analytics engine (e.g., using shape/pattern detection, etc.), as described above in connection with FIGS. 1-13. As a result of analyzing the captured visual data, processor may detect the presence of (suspect's) vehicle 3407 and various characteristics thereof (e.g., vehicle type, make, model, color, license plate number, etc.), a person (suspect) 3409, his gun 3452 (and other kinds of weapons), his threatening stance with the gun 3452 (e.g. crouching, holding/pointing gun, etc.), his (threatening) location (hidden behind his vehicle 3407), his movements, other objects already on the scene or coming into the scene, etc. (In the context of detecting content in captured data, the term "object" is used in a broad sense and is not limited to an inanimate object but encompasses any kind of entity, e.g., a person, etc.) As a result of analyzing the captured audio data, processor may detect and identify various sounds or noises, e.g., a gunshot, a keyword or phrase ("e.g., "gun," "officer shot," etc.). In response to detecting any of these threat data, the processor may trigger (e.g., initiate, cause, or cause to be initiated, such as by instructing/commanding) one or more appropriate actions.

As an example of such appropriate actions, the processor may cause a loudspeaker 2623 of the UAV 3402 to issue an audible alert 3453 to warn the police officer 3405 present of the threat. As another example, the processor may cause a light device of the UAV 3402 to emit a light as a visual alert or countermeasure against the threat, as discussed above. As another example, the processor may transmit an alert by wireless communication to other devices, such as a BWC or wireless earpiece of other police officers nearby, an ICV of other police vehicles nearby, and a remote server at police headquarters, which may, e.g., call for other officers to assist the police officer 3405 at the scene, who is in danger. Such wireless communication may also be transmitted to an ICV of police vehicle 3406 at the scene, which may be displayed on a screen inside vehicle 3406 or rendered as an audible alert on a speaker inside vehicle 3406, to notify any officer inside vehicle 3406. This alert to the ICV of the vehicle 3406 on the scene may be useful, e.g., if ambient noise impairs the ability of officer 3405 outside of vehicle 3406 to hear an audible alert 3453. Such wirelessly communicated alert may include text information, still or moving image information, and/or audio information. Text information may include metadata information and other information. Text information may also include a text file of captured audio data (or of the audio content of captured audiovisual data), generated by a voice-to-text translation program. Such a program may also serve to identify key words in the audio content/data (e.g., "gun," "shots fired," "officer down," etc.). Upon detection of a key word, captured data (and/or data captured in association or simultaneously with the captured data) may be marked (or otherwise associated) with an event tag and/or other metadata, and other actions can be triggered, such as the sending of an alert/notification, with or without the key word data/metadata.

As another example of appropriate actions in response to detecting the threat data, the processor may control operation of the camera device of UAV 3402. For example, if the camera device has the appropriate capabilities, the processor may cause the camera device to zoom in on or pan/tilt to the (most imminent or most dangerous) detected threat, such as the suspect 3409 with the gun 3452. If the camera device has multiple cameras, not all of which are operating, the processor may cause the camera with the best view of the detected threat to start recording the area of the threat, or ensure that that camera is already doing so. Also, if applicable, the processor may control navigation of the UAV 3402, causing it to descend or ascend in order to get a better view. As another example of appropriate actions, the processor may control the microphone device to cause the microphone device to start recording in the area of the threat, or ensure that the microphone device is already doing so. As another example of appropriate actions, the above-mentioned wireless alert sent to one or more devices nearby (e.g., a BWC of an officer nearby or an ICV of a police vehicle nearby) may include an instruction/command to the device or to the police officer in charge of the device to start recording audio and/or video data. These examples, which involve causing another camera of the UAV 3402, a microphone device of the UAV 3402, or a nearby device to start recording may also be characterized as starting the capture of additional data.

As another example of appropriate actions in response to detecting the threat data, where the particular threat data detected is audio content (i.e., a sound or noise), e.g., a gunshot, the processor may determine a direction from which the sound emanated or an (approximate) location at which the sound originated. (For brevity, determining the direction and determining the location or approximate location are referred to as determining the location of the sound.) Upon determination of the location of the sound, the processor may take other appropriate action, such as issuing a warning to police officer 3405, issuing an alert to devices of vehicle 3406 on scene or other officers or headquarters, associating appropriate metadata with the captured audio or associated video data (e.g., marking with an event tag, "gunshot"), or controlling camera device of UAV 3402 to move/orient itself so as to start recording video/audiovisual content of the location/vicinity from which the sound originated. Such alert may include, e.g., the vector coordinates of the location and a snapshot or video for display on a screen of a device such as a BWC (3348) of a police officer on scene or not or an ICV 3346 of vehicle 3406 or other ICV 3347. Any of these actions may be performed in real time as the location of the sound is detected.

As another example of appropriate actions in response to detecting the threat data, the processor may bookmark a start point in captured (e.g., video, audio, or audiovisual) data and/or metadata file(s) indicating when the particular threat data was detected. This automatic bookmarking could be configurable by a user to jump back to a pre-defined point in the video/audio timeline, such as 5 or 10 minutes prior to the detection of the particular threat data. A configurable post-event bookmark could also be defined to mark a stop point in the captured data. The post-event mark could be automatically inserted in the video/audio data based upon a predetermined condition, e.g., after passage of a predetermined amount of time after the particular threat data is no longer present in the video/audio data being captured (i.e., no longer present in the scene), or could be inserted manually by a user (who is on the scene or not). The start and stop points would define a portion of the video/audio data as containing the particular threat data; for convenience that portion alone may be exported or viewed.

In addition to bookmarking pre-event and post-event times, the processor could tag the (portion of the) video/audio data containing the particular threat data detected with an appropriate event tag. For example, if the UAV 3402's processor 2713 detected suspect 3409, his gun 3452, and his action of pointing the gun toward police officer 3405, the tag "Gunman" could be automatically marked in the video/audio/audiovisual and/or metadata file to identify the file or an appropriate portion thereof. As another example, if processor 2713 detected vehicle 3407 and identified it as a red Chevrolet sedan with license plate number 123-4567, and that particular vehicle had prior to the scene at hand been identified in a BOLO alert as the vehicle involved in a particular felony hit and run accident, (an appropriate portion of) the video/audio/audiovisual and/or metadata file could be automatically marked with the tag "Felony."

In addition to start and stop times and event tags, any other metadata could also be added to or associated with the captured (e.g., video, audio or audiovisual) data/data file by the processor. Association of metadata with captured data may refer to insertion, in a metadata file separate from a file containing captured data, of metadata pertaining to the captured data. However, the term "association" is used herein as a broad term, intended also to encompass the addition of metadata directly to the file containing the captured data.

In addition to associating metadata with captured data, another example of appropriate actions in response to detecting the threat data is that the processor could associate metadata with other data that is associated with the captured data. Such other data may be, e.g., video, audio, or audiovisual data captured by a device other than the UAV device (camera device or microphone device) that captured the data in which the threat data was detected. For example, where the UAV camera device captured video data and the UAV processor detected a threat (e.g., gun 3452) in the captured visual data, the processor could associate metadata (indicating, e.g., the presence of gun 3452 at a certain time t) (not only with the captured visual data but also) with audio data captured simultaneously by the UAV's microphone device. This association of metadata with the audio data may be useful, e.g., in determining whether a sound in the audio data is a gunshot, by correlating the timing of the sound with the timing of the appearance of the gun in the captured video data). As another example, where the UAV camera device captured video data and the UAV processor detected a threat (e.g., gun 3452) in the captured visual data, the processor could associate metadata (indicating, e.g., the presence of gun 3452 at a certain time t) (not only with the visual data captured by the UAV camera device but also) with video data captured simultaneously by the ICV of police vehicle 3406 on the scene or by a BWC or ICV of another officer/police vehicle on or near the scene. This association of metadata with the video data of the other device may be useful, e.g., in determining whether an object appearing in the video data of the other device is gun 3452, by correlating the timing of the appearance of the object with the timing of the appearance of the gun in the video data captured by the UAV camera device). As seen from these examples of associating metadata with other data that is associated with the captured data, the phrase "other data that is associated with the captured data" encompasses other data captured of the same scene/subject/etc., captured at the same time, etc., as well as other data that may be associated with the captured data by virtue of being associated with the device that captured the captured data, the UAV containing that device, etc.

As another example of appropriate actions in response to detecting the threat data, the processor may control navigation of the UAV 3402, e.g., causing the UAV 3402 to fly to a location where it can obtain the best view of the threat, or is in the best position to capture video and audio data of the threat. Alternatively, if the UAV 3402 itself is under threat, the processor may cause the UAV 3402 to attempt to escape the threat, e.g., fly away from the threat, hide from the threat (e.g., hide behind another object), etc. In this case, UAV 3402 may fly higher or fly farther away from the threat.

As another example of appropriate actions in response to detecting the threat data, instead of or in addition to the aforementioned wireless transmitting of an alert to another device (e.g., on the scene (e.g., police vehicle 3406), nearby (e.g., BWC or ICV of nearby officer/police vehicle), or remote (e.g., server at headquarters)), the processor of the UAV 3402 may transmit to the other device(s) a live stream of the video, audio, or audiovisual data being captured by the data capture device(s) (e.g., camera device, microphone device) of the UAV 3402. By live stream is meant that, as the data is being captured by the data capture device(s) of the UAV 3402, the data is being transmitted to other device(s), so that the data received by the other device(s) can be viewed/heard on the other devices in real time, i.e., as the data is being captured and transmitted. Thus, the terms "live stream," "in real time," "simultaneous" and the like may be used to refer to this scenario.

With reference to the live stream scenario, it is noted that the data being live-streamed may be combined (e.g., multiplexed) with other data. For example, the other device, which receives the live-streamed data, may multiplex the live-streamed data with data stored in or (being) captured by the other device. In this case, the other device might be, for example, the ICV of police vehicle 3406 on scene, or a BWC 3348 or ICV 3347 of an officer/vehicle on or near the scene, and video data captured by UAV 3402 may be multiplexed with audio data captured by the other device, or the audio data captured by the other device might be combined with audiovisual data captured by UAV 3402 in such a manner as to replace the audio component of the audiovisual data captured by UAV 3402. This scenario might occur, e.g., because the UAV 3402 is able to obtain better video data but the ICV of police vehicle 3406 on scene, the BWC 3348, or the ICV 3347 is able to obtain better audio data of the scene. As another example, the other device, which receives the live-streamed data, may multiplex the live-streamed data with data (being) captured by a third device. In this case, the other device might be, for example, a server in the cloud, and the third device might be, for example, the ICV of police vehicle 3406 on scene, or a BWC 3348 or ICV 3347 of an officer/vehicle on or near the scene, and the same kind of combination/multiplexing might be performed, for the same reasons, as stated in the previous example. The use of a cloud server for the combining/multiplexing might be more efficient than using the ICV of police vehicle 3406 on scene, the BWC 3348, or ICV 3347 for this purpose, and might also usefully release resources of the ICV of police vehicle 3406 on scene, the BWC 3348, or the ICV 3347. Other types and scenarios of combining/multiplexing live-streamed data with other data are also possible. Further details and examples/scenarios of such combining/multiplexing of live-streamed data with other data are given above in connection with FIGS. 14-21. Of course, it is understood that this combining/multiplexing may involve storage on the part of the various devices involved, and it will be understood that those devices (e.g., the ICV of vehicle 3406, a BWC 3348 or ICV 3347 of another officer/vehicle, or the remote server 3349 at police headquarters 3350), have the requisite storage (e.g., 3351) and other components to perform the combining/multiplexing. Such components have been described elsewhere in this disclosure, e.g., in the context of devices performing such combining/multiplexing, as described above in connection with FIGS. 14-21.

With further reference to the live stream scenario, it is noted that the other device, which receives the live stream, may also simply record the live stream rather than combine/multiplex it with other data. It should also be noted that roles of the various devices discussed here (e.g., UAV 3402, ICV, BWC) may be exchanged. For example, the processor of the UAV 3402 may receive a live stream from one or more other devices (e.g., ICV, BWC) and may record the live stream or combine/multiplex it with another live stream the UAV 3402 is receiving or with data captured or being captured by UAV 3402 or another device.

With further reference to the live stream scenario, it is noted that a user of the other device, which receives the live stream, may, e.g., (take) control (of) the UAV 3402. For example, such user may control the UAV 3402 to take any of the actions described above as examples of appropriate actions in response to detecting the threat data (e.g., direct the camera device of UAV 3402 to better view/record data of a suspect), as well as other actions (e.g., instruct the UAV 3402 to search for a particular object of interest). It may be desirable for such user to so take control of the UAV 3402, e.g., when the officer 3405 on the scene is unable (e.g. due to injury, etc.) to monitor and control the UAV 3402. In such a case, such user who takes control, e.g., another officer, whether in police vehicle 3406 at the scene, on foot or in another vehicle nearby, or at police headquarters, may take such actions in order to capture data, alert/protect officers or others, protect/perch/save power of the UAV 3402, or achieve other goals. It will be understood that the other device referred to here, e.g., the ICV of vehicle 3406, a BWC 3348 or ICV 3347 of another officer/vehicle, or the remote server 3349 at police headquarters 3350, has the requisite components to remotely control the UAV 3402 (e.g., a processor, means for wireless communication, etc.). Such components have been described elsewhere in this disclosure in the context of other devices performing such control/actions.

Figure 35:
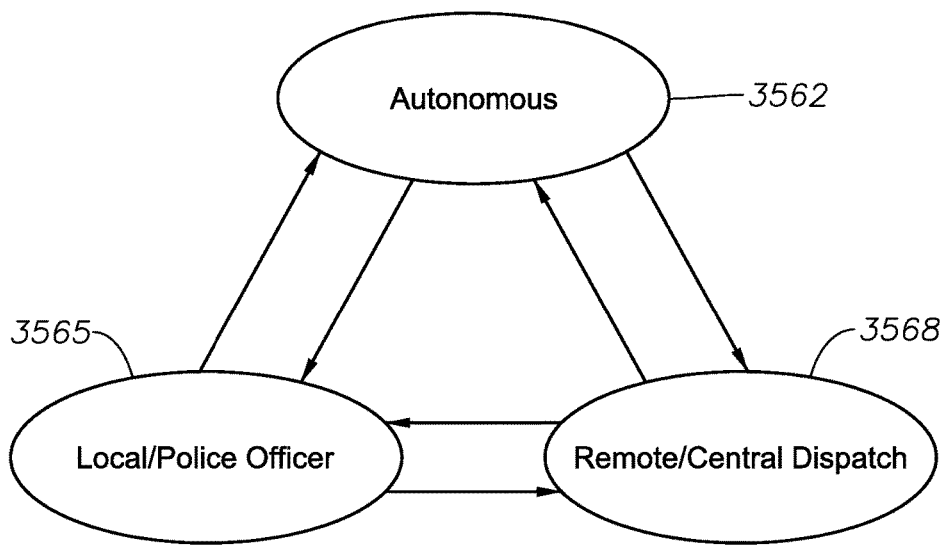
FIG. 35 depicts a state diagram showing control of a UAV by different parties and transfer of control among the parties, in accordance with some embodiments of the present disclosure.

When appropriate, a user who took control of the UAV 3402 may return control back to the UAV 3402, or to another user. Thus, control of the UAV 3402 may be transferred between (respective devices of) different parties, e.g., the UAV 3402 itself, officer 3405 on foot at the scene with the UAV 3402, an officer in vehicle 3406 at the scene, an officer nearby on foot or in a vehicle, police headquarters, etc. Any party may transfer control to any other party, as depicted in FIG. 35, which shows a state diagram of control of UAV 3402. As seen in the figure, in state 3562 ("autonomous"), UAV 3402 controls itself; in state 3565, UAV is controlled locally by (a device of) a police officer; and in state 3568, UAV is controlled remotely by (server 3349 of) police headquarters 3350. Further, between any pair of states, two arrows are depicted connecting the two states, one arrow going in each direction, e.g., one arrow going from state 3562 to state 3565 and one arrow going from state 3565 to state 3562. This depiction of two arrows (in different directions) between each pair of states indicates that any state may transition to any other state, i.e. control may be passed from any party to any other party. State 3565 is understood to encompass control by any of officer 3405 on scene (or his BWC), officer in vehicle 3406 on scene (vehicle ICV), another (BWC 3348/ICV 3347 of) officer/vehicle nearby. For brevity, only a single state 3565 is illustrated in FIG. 35, rather than having a separate state for each of the parties encompassed by state 3565. The point is that control may be transferred not merely between UAV 3402 and party other than UAV 3402, but also between two parties neither of whom is UAV 3402.

The preceding discussion referred to triggering actions in response to analyzing captured (video or audio) data and detecting therein content that was referred to as threat data. It should be understood that, more generally, UAV 3402 processor 2713 may trigger actions in response to analyzing captured (video or audio) data and detecting therein specified content, regardless of whether that content be deemed threat data. For example, processor 2713 may trigger an action in response to detection (in its captured video and/or audio data) of an object of interest identified in a BOLO alert or other notification received by UAV 3402. Such action might be, e.g., tracking the object of interest; sending a notification (including e.g., captured video data of the detected object of interest, information pertaining to the detected object of interest, such as location (latitude, longitude, altitude), direction of travel, time of data capture, metadata, etc.) to a server at headquarters, to devices of other officers in the area, to all officers within a specified group, etc.; or activating other (police officers'/vehicles') data capture devices on the UAV, on the scene, or within a specified distance of the detected object of interest. As another example, processor 2713 may trigger an action in response to detection (in its captured video and/or audio data) of a police officer (or a suspect). Such action might be, e.g., tracking, or live-streaming audiovisual data of, the detected officer (or suspect), or various other actions such as those described above. As another example, processor 2713 may trigger an action in response to detection (in its captured video and/or audio data) of an object that would pose a risk of collision for UAV 3402, e.g., another flying craft, terrestrial vehicle, or a stationary object such as a building, pole, wire, tree, etc. Processor 2713 may be equipped with a collision avoidance module that uses the results generated by the analytics engine (e.g., shape/pattern detection, audio analysis, etc.) to avoid what are determined to be objects posing a risk of collision to UAV 3402. Processor 2713 may, e.g., control navigation of UAV 3402 in response to detection of such objects, directing UAV 3402 out of the path of such objects (e.g., changing direction or elevation), so as to avoid collision. Relatedly, processor 2713 may, e.g., delay launching of UAV 3402 in response to detection of such objects, in order to prevent collision upon launch of UAV 3402.

The preceding discussion has described triggering actions in response to analyzing captured (video or audio) data and detecting therein specified content (also referred to as "designated content"). As to what this specified content may be, some examples are: (A) a weapon or a characteristic thereof (e.g., weapon type, such as handgun, rifle, machine gun, etc.), (B) a vehicle (e.g., automobile, bicycle, etc.) or a characteristic thereof (e.g., vehicle type, make, model, color, license plate number, etc.), (C) a road sign, a traffic signal, or a characteristic of either (e.g., sign type, shape, color, or written content; e.g., traffic signal indication, i.e., red, yellow, or green light), (D) an obstacle or a characteristic thereof, (E) a threat or a characteristic thereof, (F) a person or a characteristic thereof (e.g., a generic indication of one or more people or an indication of a particular person by some identifying characteristics, such as physical characteristics or clothing) (G) an action or movement of a person, or a characteristic thereof, and (H) a position of a person, or a characteristic thereof. These examples are not intended to be limiting, and other types of entities and their characteristics, acts and locations may also be detected and function as designated content.

Having discussed the triggering of actions in response to analyzing captured (video or audio) data and detecting therein designated content, we now turn to other modes of operation of a UAV/UAV system. In this regard, it should also be noted that the actions discussed above as being triggered in response to detecting designated content generally may also be performed unconditionally, that is, not as a response to detecting designated content.

Generally speaking, the processor of UAV 3402 is operable to execute instructions received via the receiver (e.g., 2715), wherein the instructions are or include instructions to control the UAV 3402. The term "control" is used broadly and may include any action/functionality of the UAV 3402, e.g., controlling navigation, launching, landing, docking, controlling UAV 3402 components (e.g., orienting camera device or microphone device or selecting from among cameras or microphones to be used for data capture), capturing audio/video/audiovisual data, receiving/transmitting data, issuing alerts, associating metadata with data, searching for specified content, analyzing captured data, processing (e.g., combining/multiplexing) data that is being received/has been received, triggering an action in response to detected content in captured data, etc. The instructions may be received wirelessly, by a wired connection (e.g., when UAV 3402 is docked in docking station 3404), or as a voice command or gesture command or the like (e.g., by officer 3405 on the scene). For example, instructions may be sent to the docking station 3404 or the ICV of host vehicle 3406 (or a BWC) and the docking station 3404 or the ICV (or the BWC) may relay these instructions wirelessly or by wired connection, if applicable, to UAV 3402. Voice command and gesture command or the like may be issued not only by a human being but may also be a (recorded, virtual, etc.) voice, gesture, or the like issued by a device. Thus, voice, gesture, or the like human command may be used to control navigation of the UAV 3402 or operation of components of UAV 3402 (e.g., camera device, microphone device, etc.) Examples of voice command could be "stop," "stay," "follow me," "move forward 5 feet," "dock," "record video data," "turn on camera," "land," "launch," "perch," etc.

The camera device, microphone device, and/or any of the sensor devices of the UAV 3402 may be configured to continually capture data. The captured audiovisual data can be stored, displayed on a vehicle's ICV, or temporarily held in a buffer in a continuous circulating stream to perform "pre-event" circular buffering, without storing the data to memory until the camera is activated to store the data to memory. This "smart buffering" feature provides a circular buffer that may temporarily hold the captured data in configurable file segment sizes (e.g., 1-5 minute segments) until activated to store the data to memory or the data is automatically deleted (after a certain period of time) as new data is captured and streamed into the buffer in a continuous manner. When activated to store the data, time points may be marked in the data files. In this way, when an event of interest or object of interest is detected, pre-event data (covering a certain amount of time prior to detection) may be retained. In some embodiments, if the camera is activated or triggered to store the data, the camera can be configured to export the data (in the above-mentioned file segments) to a removable medium and/or a separate folder in the memory sector where the circular recording is written. In some embodiments, the pre-event buffering can optionally be configured to continually write directly to memory in a circulating stream. Pre-event buffering may also be referred to as smart buffering or failsafe buffering, and the operations described here and others that may be employed by a UAV have been described in further detail above in connection with FIGS. 1-21.

In some embodiments, the captured data may be stored to long-term storage of the UAV or transmitted to another device to be stored therein. The UAV may be configured to perform such storing or transmitting and storing all the time, or when certain content is detected in the captured data (e.g., a certain object or event is detected), or at certain times, or for certain periods of time, etc. In that regard, captured data held or stored in any of various memory/storage devices/areas of UAV (or another device to which the captured data was transmitted from the UAV) can be assigned one or multiple retention periods (retention rules), e.g., video marked with an event tag (of a certain type) could be retained for a specified period of time (one week, as an example) after it has been successfully exported or uploaded, while video that was not marked as an event and is captured in the background could have a different retention period (two days, for example).

As described above with regard to camera 12 of first device 10 in connection with FIGS. 14-21, so too the UAV camera device may be configured to wirelessly sync (e.g., via Bluetooth®, RuBee, Wi-Fi, 3G, 4G, LTE, etc.) with other data gathering/telemetry devices within a set range or proximity. Such other devices may include, for example, biometric data sensors, geospatial, distancing and orientation data devices, environmental telemetry devices, etc. In such embodiments, the UAV can wirelessly receive data transmitted from the other devices and store that data in the UAV's memory. The data from the other devices can be recorded in sync with the recording of audio/video or independently (e.g., when the UAV camera is not holding/storing audio/video). Video data from the UAV camera device may be configured to sync with other devices automatically or via manual activation. All of this additional data from other devices can be multiplexed and synchronized with selected data using the techniques disclosed herein, e.g., in connection with FIGS. 14-21.

Some particular scenarios in which syncing may be used involve audio data. While the UAV can be used to record desired audio data (whether the audio is captured as audiovisual data or solely as audio data), as described above, in some situations relevant sounds (e.g., dialogue) from the scene may not be picked up by microphone(s) on the UAV due to the considerable distance (elevation) of the UAV from the subjects and/or the ambient noise near the UAV, such as may come from the UAV motors, the wind, and propwash from the UAV propellers. Therefore, in some embodiments, the UAV may capture audio data via an external source, such as a wireless microphone of a BWC worn by a police officer, or audio from a dashcam/dash microphone in a vehicle, on scene. Thus, in this case, the UAV captures video data from the UAV's camera device and audio data from an external source. However, in this case, separate playback of the captured video data file from the UAV camera device and the captured audio data file from the external source may not be in sync. This mismatch in synchronization may be particularly exacerbated when the UAV camera device and the external audio source are each activated at different times or intermittently during an event being recorded. Embodiments disclosed herein provide a solution in this situation. For example, the UAV may be implemented with software configured to extract the audio data recorded by the external audio source and/or multiplex this audio data with the file container of the data file(s) (containing the video data) in the UAV's memory. The data file(s) stored in the UAV may include audio, video, metadata, and/or audiovisual files. The UAV may be configured to multiplex the audio data recorded by the external audio source to synchronize the audio data with the relevant data file(s) (i.e., audio data, video data, metadata, and/or audiovisual data) in the file container of the UAV. It will be appreciated by those skilled in the art that data files (audio data, video data, metadata, and/or audiovisual data) can be multiplexed and synchronized with (data from) multiple devices and other audiovisual sources, and in some cases linked to several devices and/or sources, that were on the scene, for later synchronization. Such arrangements provide for enhanced audio and video data evidence and review and may also be used to identify and create a map of the location where the devices/sources were located during an event. Additional description of syncing in this regard is provided, e.g., in connection with FIGS. 14-21.

Among the benefits of the functionality provided by the disclosed embodiments is the elimination of the range-based limitations encountered by conventional wireless audio data transmission. Since on-scene audio of interest is recorded with the external audio source and subsequently transferred from the external audio source to the UAV, issues regarding wireless signal transfer range or signal interference may be mitigated or eliminated. It is also possible to multiplex and/or synchronize the audio data and other files at a later time, after the video and/or audio files have been produced. In implementations where all files are transferred to a server, the multiplexing, synchronization, unique identifier coding, or a combination thereof, can be done at a later time as desired. For example, once the files are obtained, audio files from the external audio source may be multiplexed and synced, or played separately yet in sync, with video files from the UAV.

The recorded/stored/held data (audio, video, or audiovisual data) acquired by any device(s) can also be sent to the cloud in real-time, where the disclosed extraction, multiplexing, and/or synchronization techniques can be performed. For example, once uploaded to the cloud, audio data recorded by a first device (e.g., the external audio source) can be synchronized with the data file(s) (i.e., audio data, video data, metadata, and/or audiovisual data) uploaded to the cloud from a second device (e.g., the UAV). Cloud processing can be performed concurrently with the disclosed techniques or as stand-alone processing of the data. Such cloud processing provides for rapid accessibility (e.g., by remote locations such as headquarters) and flexibility of scalability. These arrangements are further described above in connection with FIGS. 14-21.

The processor of UAV 3402 may (e.g. continuously or non-continuously) perform analytics (e.g., shape/pattern detection, etc.) on captured data (video, audio, or both), as described above, in order to avoid obstacles (avoid collisions), in order to align with docking station/perch location/alternate landing location and land, in order to find a suitable location to perch or land (other than docking station), and/or in order to find objects of interest. In this regard, when preparing to launch, the processor of the UAV 3402 may use analytics to establish a clear flight path for UAV 3402 prior to actual launch. When objects of interest are detected, metadata may be created, and the metadata may also be transmitted to another device (e.g., ICV of vehicle 3406 or police headquarters) and/or stored in memory of UAV 3402. The UAV 3402 may report general information about a scene, e.g., types of objects detected (people, vehicles, etc.), their characteristics, locations, movements, etc. This information may be reported to other devices on scene or remote. It may be reported periodically.

When the UAV 3402 receives a BOLO alert or other notification, it may perform analytics to search data captured/being captured to detect the object(s) identified in the alert/notification. Specifically, the processor of the UAV 3402 may perform analytics in real time on data being captured. The processor may instead or additionally perform analytics on data that was already captured. If an object of interest is detected, UAV 3402 (transmitter) may send an alert/notification to any of a BWC or officer 3405 on scene, ICV 3346 of vehicle 3406 on scene, other BWC(s) 3348, other ICV(s) 3347 of other vehicle(s), a remote server 3349 in central dispatch/headquarters 3350, or other devices. As discussed above, in response to detection of an object of interest, the processor of UAV 3402 may also associate metadata with the captured data or with other captured data associated with the captured data.

The processor of UAV 3402 is also operable to execute instructions to cause transmission in real time of at least one of: (A) video data captured by the UAV's camera device, as the video data is being captured, and (B) data received wirelessly by the UAV's receiver, as the data is being received. Such transmission is the live streaming described above, but here the live streaming is performed not as an action triggered in response to detection of designated content in captured data. Such live streaming may also be transmission of audio data captured by the UAV's microphone device or camera device, or of audiovisual data captured by the UAV's camera device. The reference to the transmission of video data here is to be understood as encompassing the transmission of solely video data and/or the transmission of audiovisual data, which includes video data as a component thereof. Put in other words, the transmission of audiovisual data, which includes a video data as a component thereof, entails or includes the transmission of video data.

Furthermore, the UAV 3402 may be used as a wireless relay station for live streaming or transmission of prerecorded (non-live) data by devices on scene and/or other devices such as BWCs 3348 of other officers and ICVs 3347 of other vehicles. This feature is useful where wireless signals may be unreliable. Here, the UAV may be able to cover more area and obtain better wireless signals. The UAV may thus be used, like a cloud-based relay station, to receive data from one or more devices and to retransmit that data to one or more other devices. Any of the devices may or may not be remote from the UAV 3402. This feature may also serve if needed to reduce the storage load on devices in the field, as such a device can transmit its data for storage elsewhere and not store it on the device. (Of course, any of the other devices discussed herein, such as an ICV or BWC, may similarly operate as a wireless relay station.)

UAV 3402 is also generally operable, via the receiver and transmitter, to send and receive instructions, commands, notifications, alerts, etc. The other party to these communications may be local or remote. Relatedly, the UAV 3402 may be remotely controlled. Numerous examples and details of these functionalities are set forth elsewhere throughout this disclosure. These examples and details include, inter alia, details regarding the various modes of transmission, e.g., wireless transmission may be via the Internet, Cloud, radio network, Bluetooth, Wi-Fi, 3G, 4G, LTE, satellite, etc. One additional example is a scenario in which UAV 3402 is in trouble or danger (e.g., mechanical trouble or danger of being damaged by a suspect). In this scenario, UAV 3402 may transmit a notification to police headquarters 3350 (server 3349) or to a BWC of officer 3405, ICV 3346 of vehicle 3406, or BWC 3348 or ICV 3347 of another officer or vehicle. Officers at police headquarters or in a vehicle or on foot can take control of the UAV 3402, or instruct an officer to do so, and notify other parties. This taking control or transferring control of UAV 3402 has been described above.

The processor of UAV 3402 is also operable to cause the UAV 3402 to track an object upon detection of a signal from the object. Tracking an object can mean that the UAV 3402 stays in proximity to the object, by travelling to be in proximity to the object (if UAV 3402 is not already in proximity to the object), and then continuing to travel (or remain in place) as the object moves, in order to remain in proximity to the object. Remaining in place may be referred to as "hovering." Tracking an object may also encompass the situation in which UAV 3402 orients the camera device of UAV 3402 on the object so as to continually record video data of the object (continually keep the object in 'sight'), reorienting the camera device as needed (as the object moves) in order to continue capturing video of the object (this reorientation may involve, e.g., zooming, panning, tilting, switching cameras, etc.). Tracking an object may also encompass the analogous situation in which UAV 3402 orients the microphone device of UAV 3402 on the object (e.g., where the microphone device includes a plurality of microphones disposed in different locations or pointed in different directions) so as to continually record audio data of the object, reorienting the microphone device as needed (as the object moves) in order to continue capturing audio of the object. Tracking an object may also encompass the analogous situation in which UAV 3402 orients another detection or data capture device of UAV 3402 (e.g., radar device/radar gun, sonar device, RFID device) on the object so as to continually detect or record data of the object, reorienting the device as needed (as the object moves) in order to continue detecting or recording data of the object. With regard to tracking an object, the object need not be an inanimate object but could be any kind of entity, e.g., police officer 3405 or suspect 3409 or another person or being. Another example of the object could be a vehicle of any type, whether terrestrial or not. Another example of an object could be an object of interest identified in a BOLO alert or other notification. Where the object is such an object of interest or a suspect 3409, the tracking may be for the purpose of capturing data (e.g., to facilitate interception or capture of the object/suspect 3409); where the object is a police officer 3405 on the scene, the tracking may be for the purpose of protecting the officer, e.g. by live-streaming video of the officer to headquarters, which could call on assistance for the officer if needed. With regard to tracking an object upon detection of a signal from the object, the signal could be an audible signal, such as a voice command or an audible signal predefined to trigger tracking; a gesture or visual signal predefined to trigger tracking; an RFID, radar, or sonar signal or another kind of signal issued by a device; a signal, command/instruction, or the like received by wireless communication; a Bluetooth beacon or a pulsed transmission having a pattern/interval predefined to trigger tracking; etc. As will be understood, some of the above signals (e.g., voice command, gesture by user) may be deemed instructions from a user.

The processor of the UAV may also be configured to track an object upon satisfaction of a condition. For example, the condition could be issuance of a BOLO alert or other notification identifying an object of interest to be tracked. As another example, where the object is suspect 3409 or officer 3405 on the scene, the condition could be, e.g., detection of a threat by suspect 3409 or a threat, danger or risk posed toward police officer 3405, passage of a predetermined period of time during which no response/communication was received from officer 3405, reception of a predetermined signal or action (e.g., indicating danger) from officer 3405, an action or series of actions of police vehicle 3406, etc. Such actions of police vehicle 3406 could be, e.g., operation of the light bar or siren (turning on or off), stopping or starting of the vehicle 3406, opening of the door of the vehicle 3406, change in velocity of the vehicle 3406, etc., whether alone or in combination.

The UAV 3402 may accomplish the tracking of an object by means of analytics described above. For certain authorized objects, tracking may be accomplished by other means. For example, police officer 3405 may wear a beacon (or device transmitting a signal) or special markings on his uniform, which the UAV 3402 may use. Special markings may be a passive device that is kept track of by the camera devices of the UAV 3402. A beacon (or transmitter) may periodically transmit a signal to the UAV 3402 by which the UAV 3402 processor, with the assistance of the receiver and/or sensor(s), may keep track of the officer 3405. Officer 3405 may also use predesignated signals such as voice commands, gestures, movements or the like, to facilitate the UAV 3402's tracking of the officer 3405 or another entity.

As mentioned, FIGS. 28, 29A, 29B and 31 illustrate perching of a UAV 2202 or 3102. In these figures, the perched UAV may be monitoring the scene (e.g., police officer 2905, police vehicle 2906, suspect vehicle 2907), capturing data of the scene, searching for objects (as above, "object" can refer to any kind of entity), tracking objects, providing notifications and/or alerts, triggering appropriate actions based on the analysis of the captured data, and/or performing other actions, as in FIG. 34. Perching of the UAV may be performed for various reasons. One reason would be that perching may give the UAV a better vantage point (as compared to BWC of officer 3405 and ICV 3346 of vehicle 3406 on scene) from which to view the scene and hence from which to capture video (and/or in some cases audio) data of the scene (e.g., persons or objects of interest.) Another reason would be to conserve battery power of the UAV (e.g., when perched, the UAV's propellers need not operate and may be turned off). Another reason would be if the officer on scene/host vehicle needed to leave the scene suddenly and the UAV is not able to land on the host vehicle, it may be desirable to 'park' the UAV for a period of time until it can be retrieved. Another reason would be if the UAV is lost, e.g., is no longer in visual or communicative contact with the user (e.g., police officer) in charge of it or with its docking station 2204 or host vehicle 2206, the UAV may perch itself or be perched to facilitate being found. (In some cases, the UAV may be configured to return to a pre-designated 'home' location if it becomes lost.) In some cases, a user may instruct UAV 2202/3102 to perch by issuance of an instruction/command (e.g., voice, gesture, signal, wireless communication, etc.). In some cases, the processor of the UAV 2202/3102 may be operable/configured to trigger perching of the UAV 2202/3102 upon satisfaction of a condition. This may also be characterized as the UAV 2202/3102 perching itself. The former case, in which the UAV 2202/3102 perches upon receipt of an instruction/command, may also be characterized as a subset of the latter case, in which the processor triggers perching upon satisfaction of a condition, since the receipt of the instruction/command may be understood as satisfaction of a condition. To be sure, in some cases, when perching is triggered, the UAV 3402 may need to initially search for and find a suitable location/surface on which to perch, and so this searching may be included as a part of what is triggered when perching is triggered. UAV 3402 may be configured such that, in the event UAV 3402 becomes unstable on its perching surface or starts to fall from it, UAV 3402 automatically resumes flight in order to stabilize itself. In this scenario, the processor of UAV 3402 may detect the instability or falling of the UAV by means of an appropriate sensor, with which UAV 3402 may be equipped.

As for the conditions the satisfaction of which causes the processor to trigger perching of the UAV, some such conditions are: (A) a level of power of a battery of the UAV reaches a threshold (e.g., the battery power is too low); (B) the distance the UAV has traveled, continuously or from a start time or a start location, reaches a threshold (e.g., as this may be correlated with low battery power, or as it is not desired that the UAV stray too far from its host vehicle (start location)); (C) the amount of time the UAV has been airborne (flying or hovering), continuously or from a start time or a start location, reaches a threshold (e.g., similarly to (B)); (D) instructions to perch the UAV have been received; and (E) a signal or a transmission comprising content has been received, the signal or content having been designated in advance as an instruction to perch the UAV.) In the case of (D) and (E) the instructions or signal/transmission may be received by wireless communication, as a voice command, as a gesture, as a signal from another device, etc. Other conditions that trigger perching are possible. In some cases, the UAV may perch as a defensive/protective measure to protect itself or another entity (e.g., police officer) in response to a threat. In some scenarios, e.g., (A), (B) or (C) above, satisfaction of this condition may (instead of or in addition to triggering perching) trigger issuance/transmission of an alert/notification to an entity (e.g., BWC of officer 3405 on scene, ICV 3346 of vehicle 3406 on scene, or another BWC or ICV or headquarters), where the alert/notification indicates that the UAV needs to land or return to the host vehicle, e.g., to recharge its battery.

As with perching, so too for launching, in some cases, a user may instruct UAV (e.g., 2202) to launch by issuance of an instruction/command (e.g., voice, gesture, signal, wireless communication, etc.), and in some cases, the processor of the UAV may be operable to trigger launching of the UAV upon satisfaction of a condition. (The latter may also be characterized as the UAV launching itself. The former case may be characterized as a subset of the latter case, since the receipt of the instruction/command may be understood as satisfaction of a condition.) As for the conditions the satisfaction of which causes the processor to trigger launching of the UAV, some such conditions are: (A) receipt by the UAV receiver of instructions to launch the UAV, (B) receipt by the UAV receiver of a signal or of a transmission comprising content, the signal or content designated in advance as an instruction to launch the UAV, (C) the vehicle on which the docking station is mounted stops, (D) a door of the vehicle on which the docking station is mounted is opened, (E) a velocity of the vehicle on which the docking station is mounted exceeds a threshold, (F) a siren or light-bar of the vehicle on which the docking station is mounted is turned on, (G) an occupant of the vehicle on which the docking station is mounted (e.g., the driver or a police officer) exits the vehicle, and (H) a combination of one or more of the preceding conditions. Other conditions triggering launch are also possible. Launching of the UAV may generally be from the docking station. However, launching may also occur from another location, such as a location where the UAV is perched, or another location. (G) could be ascertained, e.g., by means of shape/pattern detection or detection of a beacon or the like on the officer's person, as described elsewhere in this disclosure. (E) is intended to encompass both cases where the velocity is greater than a maximum speed and cases where the where the velocity is less than a minimum speed. An example of (H) would be that the UAV launches when both (C) and one or more of (D), (F) and (G) occur, or when (C) occurs and a certain period of time has passed. (A) and (B) are intended to include both the situation where the instructions, signal or transmission has been sent directly to the UAV receiver, and the situation where it has been sent to another device, which conveyed it or its content to the UAV receiver. An example of (B) could be receipt of a BOLO or the like alert, the BOLO content being designated in advance as an instruction to launch the UAV (the content of the alert would indicate that it is a BOLO alert). Another example of (B) could be a signal such as a sound at a given frequency, a (e.g., secret) code word, a triggering word, or an emergency alert, which is designated in advance as an instruction to launch the UAV. A triggering word could be, e.g., "gun" or "officer down," and could be spoken by an officer on the scene. An example of (A) or (B) could be a command or signal sent to the UAV in response to an officer (e.g., on the scene) pressing a button on his BWC or ICV or performing a similar action. In some embodiments, the instruction or signal/transmission of (A) or (B) could be received by the docking station (e.g., microphone thereof) and transmitted by the docking station to the UAV. This could be useful, e.g., when an officer is incapacitated and able to speak in a range that can be picked up by the docking station microphone but not by the more distant UAV in view of ambient noise. The ability of the UAV to launch itself in response to such user-designated triggering events is advantageous. As will be understood, the UAV may be most useful at a time when the police officer is least able to manually deploy a UAV. For example, if the police officer is subduing a suspect or hot pursuit it may not be feasible for the police officer to pause to instruct the UAV to launch and operate. Accordingly, the UAV is configured to launch itself upon user-designated triggering events such as described here.

The UAV 3402 (processor) may be configured to climb to a designated altitude upon launch.

As with perching and launching, so too landing and docking may be triggered/performed either by issuance of an instruction/command (e.g., voice, gesture, signal, wireless communication, etc.) or upon satisfaction of a condition (and the former may be deemed a subset of the latter), as described above for perching and launching. One example of a condition triggering landing would be when the level of power of the battery of the UAV reaches a threshold (e.g., becomes too low). Upon the instruction or condition, the processor is operable to cause the UAV to land on the docking station (or elsewhere) and dock in the docking station without requiring user intervention/assistance. As described above, the processor may use the analytics, sensors, etc. to guide the UAV to the docking station.

Figure 36:
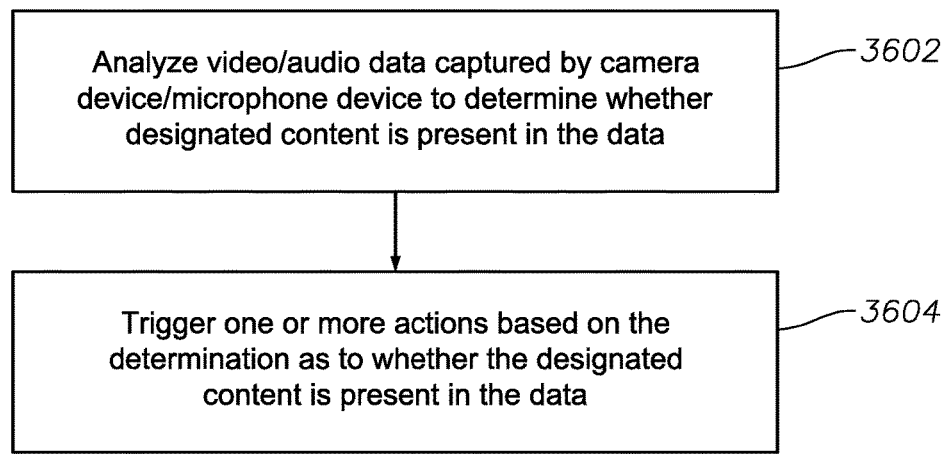
FIG. 36 is a flow chart depicting, at a top level, a method that may be performed by a UAV, a roof-mounted camera device, remote or cloud server, or other device, in accordance with some embodiments of the present disclosure.

FIG. 36 illustrates a method 3600 of operation of a UAV (or other device). According to the method, at a first block 3602, video data and/or audio data captured by a camera device and/or a microphone device is analyzed to determine whether designated visual content is present in the video data and/or whether designated audio content is present in the audio data. The camera device and the microphone device may be disposed on an unmanned aerial vehicle (UAV). At a second block 3604, based on the determination as to whether the designated visual content is present in the video data and/or the determination as to whether the designated audio content is present in the audio data, one or more actions are triggered. The one or more actions may comprise at least one of: (A) controlling navigation of the UAV; (B) associating metadata with the video data and/or the audio data; (C) associating metadata with other captured data associated with the video data and/or the audio data; (D) transmitting a wireless communication; (E) issuing an audible alert; (F) controlling operation of the camera device; (G) starting capture of additional data, and (H) determining a location from which the designated audio content originated.

Figure 37:
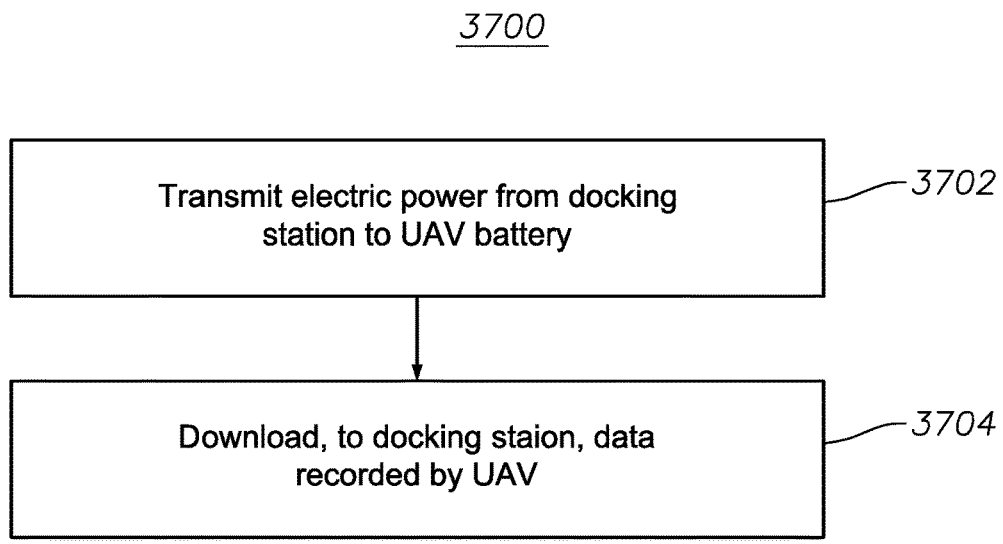
FIG. 37 is a flow chart depicting, at a top level, a method that may be carried out by a UAV system including a UAV and a docking station, in accordance with some embodiments of the present disclosure.

FIG. 37 illustrates a method 3700 of operation of a docking station for a UAV. According to the method, at a first block 3702, electric power is transmitted from the docking station to a battery of the UAV. At a second block 3704, data recorded by (e.g., the camera device) of the UAV is downloaded to the docking station. It will be understood that these transfers of power and data may also be run in the directions opposite to that here stated. It is also noted that during execution of this method, the UAV may be docked at the docking station or tethered to the docking station.

It should be understood that the various devices described herein—the UAVs, docking stations, ICVs, BWCs, roof-mounted cameras (described below), servers, and other devices—may all be capable of full interaction with each other, both wired (when a wired connection between the devices in question exists) and wireless. For example, data (whether captured, saved, received, etc.) may be transferred/distributed/swapped among any such devices, either in real time or as recorded data; data from any devices may be synced and multiplexed; commands may be transferred/distributed/swapped (e.g., relayed) among any devices, etc. In addition, audit trails may be maintained of the transfer of data or of other interactions between devices. In some cases, the host vehicle ICV may serve as a convenient base device for receipt of captured data from other devices such as UAVs and BWCs, since when the host vehicle returns to the police station, upload of the captured data from the ICV to a server for storage (e.g., at the police station or in the cloud) may be faster and easier than upload directly from other devices. The host vehicle ICV may perform analytics to detect content of interest (as described above for UAVs and their processors), not only on data the ICV captures but also on data it receives from other devices.

It should also be understood that any of the various devices described herein—the UAVs, docking stations, ICVs, BWCs, roof-mounted cameras (described below), servers, and other devices—may be provided with one or more graphics processing units (GPUs). The GPUs may run advanced applications such as the analytics described herein. As will be understood by one of ordinary skill in the art, the GPUs may be appropriately integrated into the respective device as a whole, e.g., communicatively coupled with (processor(s) of the respective device and with) elements with which the processor(s) are communicatively coupled, as described herein, etc.

As used throughout the following portion of the instant specification, the term "storage" or "memory" may include either one or both of storage for long-term retention (e.g., solid state memory, hard disk, CD, DVD, memory card, etc.), and storage for temporary retention (e.g., volatile RAM).

A roof-mounted 360-degree camera 16 with a multi-directional microphone array was described above, e.g., with reference e.g., to FIGS. 6-10. We now continue the description of roof-mounted 360-degree camera 16 with reference to FIGS. 6-10. In some embodiments, as described above, the roof-mounted camera 16 includes the multi-directional microphone array, e.g., four microphones spaced 90 degrees apart from one another in a circular formation. Other arrangements of the positioning and spacing of the plurality of microphones is possible, while retaining the capacity to determine the direction/location from which a sound captured by the microphones originated. In some embodiments, the roof-mounted camera 16 is implemented without the multi-directional microphone array or without any microphone device.

As seen in FIG. 6, the roof-mounted camera 16 is mounted on the roof of vehicle 10. Camera 16 may be mounted anywhere on the roof of vehicle 10, not necessarily in the illustrated location.

Figure 38:
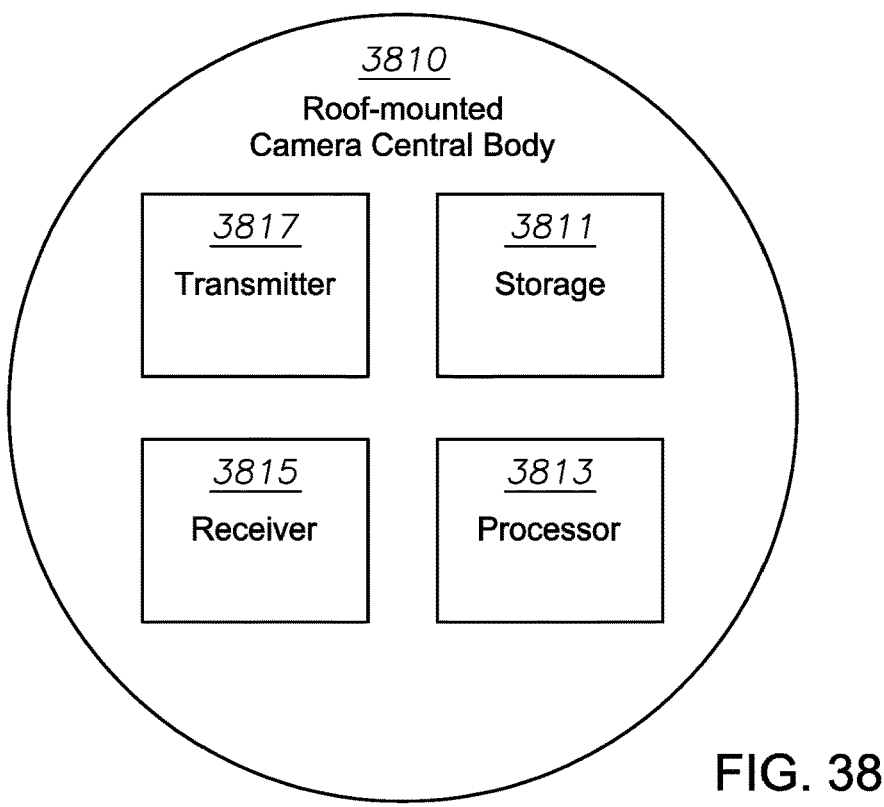
FIG. 38 is a block diagram showing a central body of a roof-mounted camera and internal components thereof, in accordance with some embodiments of the present disclosure.

In any embodiments of the roof-mounted camera 16, the roof-mounted camera 16 may include all the elements and functionalities of the UAVs described above, except that the roof-mounted camera 16 is fixed to the roof of a vehicle and accordingly lacks mobility and the ability to change its vantage point or occupy a vantage point elevated relative to the vehicle. Accordingly, such roof-mounted camera 16 would be limited in or lack functionality involving those aspects of a UAV, and the structure that provides that functionality, as would be understood by one of ordinary skill in the art. For example, launching, landing, perching, docking, tethering, and navigating, and the structure providing these functionalities, do not apply to roof-mounted camera 16. While a UAV may have a wired connection with its docking station for recharging its battery and downloading data, camera 16 may have a wired connection with (e.g., the ICV of) vehicle 10 for electric power and data transfer. Camera 16 may but need not have a battery; camera 16 may receive electric power directly from vehicle 10. Accordingly, roof-mounted camera 16 may include all the elements shown in the block diagram of either FIG. 25 (storage, processor, receiver, transmitter) or FIG. 27 (storage, processor, receiver, transmitter, battery). Specifically, as seen in FIG. 38, roof-mounted camera 16 may have a central body 3810 including storage 3811, processor 3813, receiver 3815, and transmitter 3817, in addition to the aforementioned cameras and microphones (not shown in FIG. 38). Central body 3810 may but need not include a battery (not shown).

Another respect in which roof-mounted camera 16 is limited compared to a UAV is that, whereas a UAV can track in various senses as described above (e.g., flying so as to stay in physical proximity to an object, as well as following an object with a camera device or other device), roof-mounted camera 16 does not have the full tracking functionalities of a UAV. For example, while the camera 16 may be able to see in all directions and therefore can visually track an object (so long as it is close enough for camera 16 to see it), camera 16 can only move physically (and hence physically track an object) insofar as it is moved by being fixed to its host vehicle 10, which itself may move.

Further, however, roof-mounted camera 16 may have additional functionality that a UAV does not have, namely, the ability to interact with the UAV. This additional interactive functionality includes all those interactive functionalities of the other devices (such as an ICV 3346, 3347, a BWC 3348 or of officer 3405, and server 3449 of headquarters) as described above in connection with FIGS. 22-37, 39A and 39B. For example, camera 16 may be configured to receive and transmit communications (data, notifications, etc.) from/to a UAV, which includes the ability of camera 16 to remotely control a UAV, as described above for other devices (e.g., control launching/landing/docking/perching/navigation of a UAV, control the camera device of a UAV, etc.). Further, camera 16 may be configured to control a UAV or otherwise interact with a UAV based on or in response to satisfaction of a condition. Such a condition could be any of the conditions described above with reference to conditions of the UAV's actions, but the conditions may be defined with reference to camera 16 rather than with reference to the UAV. For example, camera 16 may control a UAV to fly near/to, or capture video data of, the location from which a sound originated, the sound having been detected by the microphones 1-4 of camera 16 and analyzed by the processor of camera 16 so as to determine the location from with the sound originated (rather than the sound having been detected by the UAV's microphone and analyzed by the UAV's processor). This is an example where the condition (viz., detecting a sound and determining its location) is the same as a condition of the UAV's actions described above, but the condition is defined with reference to camera 16 (camera 16's microphones 1-4 detect the sound and camera 16's processor analyzes the sound and determines its location of origin) rather than with reference to the UAV (rather than the case in which the UAV's microphone device and processor detected the sound and determined its location of origin).

Further, roof-mounted camera 16 may or may not be a spherical camera, such as described above with reference to FIGS. 30A and 30B. Thus, roof-mounted camera 16 may be able to orient itself not only over 360 degrees azimuthally but also vertically (perpendicular to the azimuthal extent) from 0 degrees (i.e., the horizon) to 90 degrees (the zenith) while being oriented in any direction azimuthally.

In one scenario, multiple police cars may be on the scene, each having a roof-mounted camera 16. Each camera 16 may capture video or audiovisual data of the same scene and may tag the captured data with the same event tag (e.g., case identification number). After the fact, the data captured by all of the cameras 16 may be synchronized.

Some non-limiting examples of embodiments of a roof-mounted camera are described below.

According to some embodiments, there is provided a system, comprising (1) a camera device configured to capture at least video data; (2) a receiver configured to receive wireless communications; (3) a transmitter configured to transmit wireless communications; (4) storage linked with the camera device, the receiver, and the transmitter and configured to store data captured by the camera device and wireless communications received by the receiver; and (5) a processor linked with and configured to exercise control over the camera device, the receiver, the transmitter, and the storage. The camera device is configured for mounting on a vehicle. The camera device is operable to capture at least video data over an angular range of 360 degrees.

According to some embodiments, in the aforementioned system, the camera device comprises a spherical camera.

According to some embodiments, in the aforementioned system, the camera device comprises a plurality of cameras, each covering a portion of an angular range of 360 degrees.

According to some embodiments, in the aforementioned system, the camera device is further operable to capture at least video data over a finite vertical range. By "finite" vertical range is meant that the camera device can capture video data over a vertical range (i.e., perpendicular to the azimuthal range), not merely at a single angle (e.g., 0 degrees, i.e., straight toward the horizon) in the vertical direction. The ability to capture video data over a vertical range may be an ability to capture such data simultaneously at different vertical angles, e.g., by use of a spherical camera or multiple cameras oriented at different angles in the vertical direction, or it may be an ability to capture such data non-simultaneously, as may be achieved by panning or tilting a camera between different angles, or over a range of angles, in the vertical direction.

According to some embodiments, in the aforementioned system, the processor is operable to execute instructions received via the receiver, the instructions comprising instructions to control the camera device.

According to some embodiments, in the aforementioned system, the processor is configured with instructions to (A) analyze video data captured by the camera device to determine whether designated visual content is present in the video data, and (B) trigger one or more actions based on the determination as to whether the designated visual content is present in the video data. The one or more actions may comprise at least one of: (A) controlling operation of the camera device (e.g., zooming in on an area where the designated visual content has been detected or is suspected of being detected); (B) associating metadata with the video data (e.g., inserting a tag in the video data containing the detected designated visual content, the tag identifying the content by type of object, etc.); (C) associating metadata with other captured data associated with the video data (e.g., audio data, or video data from another device); (D) transmitting a wireless communication; (E) issuing an audible alert; (F) controlling operation of a device associated with the camera device (e.g. causing a UAV to (launch and) navigate to a location near/of the detected designated visual content (and to track the designated visual content)); and (G) starting capture of additional data (e.g. audio data by the microphone).

According to some embodiments, the aforementioned designated visual content comprises at least one of: (A) a weapon or a characteristic thereof, (B) a vehicle or a characteristic thereof, (C) a road sign, a traffic signal, or a characteristic of either, (D) an obstacle or a characteristic thereof, (E) a threat or a characteristic thereof, (F) a person or a characteristic thereof, (G) an action or movement of a person, or a characteristic thereof, and (H) a position of a person, or a characteristic thereof.

According to some embodiments, in the aforementioned system, the camera device is further configured to capture audiovisual data comprising video data and audio data, and the processor is further configured with instructions to (A) analyze audio data captured by the camera device to determine whether designated audio content is present in the audio data, and (B) trigger one or more further actions based on the determination as to whether the designated audio content is present in the audio data. The one or more further actions comprise at least one of: (A) controlling operation of the camera device (e.g., re-orienting the camera device to point in the direction of the detected (or suspected to be detected) designated audio content; causing the camera device to capture still and/or moving image data of the area in which the designated audio content was detected (or suspected to be detected)); (B) associating metadata with the audio data; (C) associating metadata with other captured data associated with the audio data; (D) transmitting a wireless communication; (E) issuing an audible alert; (F) controlling operation of a device associated with the camera device (e.g., causing a UAV to navigate to the area in which the designated audio content was detected (or suspected to be detected)); (G) starting capture of additional data; and (H) determining a location from which the designated audio content originated. Other examples of the above one or more further actions may be the same as or similar to the examples of the one or more actions described two paragraphs above.

According to some embodiments, the aforementioned system further comprises a microphone device linked with the storage and the processor and configured to capture audio data.

According to some embodiments, in the aforementioned system that further comprises a microphone device, the microphone device comprises a plurality of microphones configured to capture audio data from multiple directions around the camera device, and the processor is configured with instructions to (A) analyze audio data captured by the plurality of microphones to determine whether designated audio content is present in the audio data, and (B) trigger one or more actions based on the determination as to whether the designated audio content is present in the audio data. The one or more actions comprise at least one of: (A) controlling operation of the camera device; (B) associating metadata with the audio data; (C) associating metadata with other captured data associated with the audio data; (D) transmitting a wireless communication; (E) issuing an audible alert; (F) controlling operation of a device associated with the camera device; (G) starting capture of additional data; and (H) determining a location from which the designated audio content originated. Examples of the above one or more actions may be the same as or similar to the examples of the one or more actions described four paragraphs above or two paragraphs above.

According to some embodiments, in the aforementioned system that further comprises a microphone device, the processor is operable execute instructions to cause transmission to another device in real time of at least one of: (A) video data captured by the camera device, as the video data is being captured, (B) audio data captured by the microphone device, as the audio data is being captured, and (C) data received wirelessly by the receiver, as the data is being received.

According to some embodiments, in the initially aforementioned system, the processor is operable execute instructions to cause transmission to another device in real time of at least one of: (A) video data captured by the camera device, as the video data is being captured, and (B) data received wirelessly by the receiver, as the data is being received.

According to some embodiments, the initially aforementioned system further comprises a speaker operable to issue an audible alert.

According to some embodiments, in the initially aforementioned system, the processor is operable to cause the camera device to visually track an object upon detection of a signal from the object or upon receipt of an instruction to visually track the object.

According to some embodiments, the initially aforementioned system further comprises an interface configured for wired connection to an in-vehicle device in the vehicle and for transferring data between the storage and the in-vehicle device in the vehicle via the wired connection.

According to some embodiments, the aforementioned system that further comprises an interface further comprises the in-vehicle device in the vehicle.

According to some embodiments, the initially aforementioned system further comprises a buffer configured to hold data captured by the camera device in a continuously circulating stream, such that old data held in the buffer is continually deleted in order to accommodate newly captured data.

As illustrated in FIG. 36, according to some embodiments, there is provided a method 3600, comprising (1) analyzing video data and/or audio data captured by a camera device and/or a microphone device, to determine whether designated visual content is present in the video data and/or whether designated audio content is present in the audio data (block 3602), and (2) triggering one or more actions based on the determination as to whether the designated visual content is present in the video data and/or the determination as to whether the designated audio content is present in the audio data (block 3604). The camera device and the microphone device may be configured for disposal on a roof of a vehicle. The one or more actions comprise at least one of: (A) controlling operation of the camera device; (B) associating metadata with the video data and/or the audio data; (C) associating metadata with other captured data associated with the video data and/or the audio data; (D) transmitting a wireless communication; (E) issuing an audible alert; (F) controlling operation of a device associated with the camera device; (G) starting capture of additional data, and (H) determining a location from which the designated audio content originated. Examples of the above one or more actions may be the same as or similar to the examples of the one or more actions described in the system embodiments above.

The aforementioned method may also be described as comprising the following operations: analyzing data to determine whether designated content is present in the data; and triggering one or more actions based on the determination as to whether the designated content is present in the data, wherein the data comprises at least one of video data and audio data, wherein the data is captured by at least one of (a) a camera device disposed on a roof of a vehicle and (b) a microphone device disposed on a roof of a vehicle, wherein the designated content comprises at least one of designated visual content and designated audio content, and wherein the one or more actions comprise at least one of: (A) determining a location from which the designated content originated, the designated content being audio content; (B) controlling operation of the camera device; (C) associating metadata with the data; (D) associating metadata with other captured data associated with the data; (E) transmitting a wireless communication; (F) issuing an audible alert; (G) controlling operation of a device associated with the camera device; and (H) starting capture of additional data.

According to some embodiments, in the aforementioned method (according to the latter description), the designated content is designated visual content comprising at least one of: (A) a weapon or a characteristic thereof, (B) a vehicle or a characteristic thereof, (C) a road sign, a traffic signal, or a characteristic of either, (D) an obstacle or a characteristic thereof, (E) a threat or a characteristic thereof, (F) a person or a characteristic thereof, (G) an action or movement of a person, or a characteristic thereof, and (H) a position of a person, or a characteristic thereof.

According to some embodiments, in the aforementioned method (according to the latter description), the designated content is designated audio content comprising at least one of: (A) a gunshot, (B) a key word, and (C) a signal at a designated frequency. The term "key word" encompasses such entities as triggering word, code word, voice command, and the like, discussed elsewhere herein.

According to some embodiments, the aforementioned method further comprises receiving instructions wirelessly, and controlling the camera device based on the received instructions.

According to some embodiments, the aforementioned method (according to the latter description) further comprises transmitting in real time of at least one of: (A) the data, as the data is being captured, and (B) data received wirelessly by a receiver on the UAV, as the data is being received.

According to some embodiments, the aforementioned method (according to the latter description) further comprises downloading, to an in-vehicle device in the vehicle, data recorded by at least one of the camera device and the microphone device.

According to some embodiments, the aforementioned method (according to the latter description) further comprises transferring data, from an in-vehicle device in the vehicle, to at least one of the processor and storage.

According to some embodiments, the aforementioned method (according to the latter description) further comprises a buffer configured to hold data captured by the camera device in a continuously circulating stream, such that old data held in the buffer is continually deleted in order to accommodate newly captured data.

In light of the principles and example embodiments described and depicted herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered. This disclosure describes one or more embodiments wherein various operations are performed by certain systems, applications, modules, components, etc. In alternative embodiments, however, those operations could be performed by different components. Also, items such as applications, modules, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A system, comprising:
   an unmanned aerial vehicle (UAV),
   wherein the UAV comprises:
   a camera device configured to capture at least video data;
   a receiver configured to receive wireless communications;
   a transmitter configured to transmit wireless communications;
   storage linked with the camera device, the receiver, and the transmitter and configured to store data captured by the camera device and wireless communications received by the receiver; and
   a processor linked with and configured to exercise control over the camera device, the receiver, the transmitter, and the storage,
   wherein the UAV is configured to dock with a docking station mounted on a vehicle, and
   wherein the processor is operable to execute instructions to cause the UAV to launch from the docking station upon occurrence of at least one of the following pairs of conditions:
   (A) (i) a door of the vehicle on which the docking station is mounted is opened, and (ii) a light-bar of the vehicle on which the docking station is mounted is turned on, and
   (B) (i) receipt by the receiver of an alert indicating content to be searched for in video data captured by the camera device, and (ii) a light-bar of the vehicle on which the docking station is mounted is turned on.

2. The system of claim 1,
   wherein the processor is operable to execute instructions received via the receiver, the instructions comprising instructions to control the UAV.

3. The system of claim 1,
   wherein the processor is configured with instructions to (A) analyze video data captured by the camera device to determine whether designated visual content is present in the video data, and (B) trigger one or more actions based on the determination as to whether the designated visual content is present in the video data, wherein the one or more actions comprise at least one of: (A) controlling navigation of the UAV; (B) associating metadata with the video data; (C) associating metadata with other captured data associated with the video data; (D) transmitting a wireless communication; (E) issuing an audible alert; (F) controlling operation of the camera device; and (G) starting capture of additional data.

4. The system of claim 3,
wherein the designated visual content comprises at least one of: (A) a weapon or a characteristic thereof, (B) a vehicle or a characteristic thereof, (C) a road sign, a traffic signal, or a characteristic of either, (D) an obstacle or a characteristic thereof, (E) a threat or a characteristic thereof, (F) a person or a characteristic thereof, (G) an action or movement of a person, or a characteristic thereof, and (H) a position of a person, or a characteristic thereof.

5. The system of claim 1,
wherein the camera device is further configured to capture audiovisual data comprising video data and audio data, and
wherein the processor is further configured with instructions to (A) analyze audio data captured by the camera device to determine whether designated audio content is present in the audio data, and (B) trigger one or more further actions based on the determination as to whether the designated audio content is present in the audio data,
wherein the one or more further actions comprise at least one of: (A) controlling navigation of the UAV; (B) associating metadata with the audio data; (C) associating metadata with other captured data associated with the audio data; (D) transmitting a wireless communication; (E) issuing an audible alert; (F) controlling operation of the camera device; (G) starting capture of additional data; and (H) determining a location from which the designated audio content originated.

6. The system of claim 1,
wherein the UAV further comprises a microphone device linked with the storage and the processor and configured to capture audio data.

7. The system of claim 6,
wherein the microphone device comprises a plurality of microphones configured to capture audio data from multiple directions around the UAV, and
wherein the processor is configured with instructions to (A) analyze audio data captured by the plurality of microphones to determine whether designated audio content is present in the audio data, and (B) trigger one or more actions based on the determination as to whether the designated audio content is present in the audio data,
wherein the one or more actions comprise at least one of: (A) controlling navigation of the UAV; (B) associating metadata with the audio data; (C) associating metadata with other captured data associated with the audio data; (D) transmitting a wireless communication; (E) issuing an audible alert; (F) controlling operation of the camera device; (G) starting capture of additional data; and (H) determining a location from which the designated audio content originated.

8. The system of claim 1,
wherein the processor is operable to execute instructions to cause transmission in real time of at least one of: (A) video data captured by the camera device, as the video data is being captured, and (B) data received wirelessly by the receiver, as the data is being received.

9. The system of claim 1,
wherein the UAV further comprises a sensor device, wherein the sensor device comprises at least one of the following: (A) a radar device, (B) a sonar device, and (C) a GPS device.

10. The system of claim 1, further comprising a speaker operable to issue an audible alert.

11. The system of claim 1,
wherein the UAV further comprises a perching mechanism operable to perch the UAV on an object.

12. The system of claim 11,
wherein the processor is operable to trigger perching of the UAV when at least one of the following conditions obtains: (A) a level of power of a battery of the UAV reaches a threshold level, (B) a distance the UAV has traveled, continuously or from a start time or a start location, reaches a threshold distance, (C) a duration of time the UAV has been airborne flying, continuously or from a start time or a start location, reaches a threshold duration, (D) instructions to perch the UAV have been received, and (E) a signal or a transmission comprising content has been received, the signal or content designated in advance as an instruction to perch the UAV.

13. The system of claim 1,
wherein the processor is operable to cause the UAV to track an object upon detection of a signal from the object.

14. The system of claim 1,
wherein the conditions further comprise: (F) receipt by the receiver of instructions to launch the UAV, and (G) receipt by the receiver of a signal or of a transmission comprising content, the signal or content designated in advance as an instruction to launch the UAV.

15. The system of claim 1,
wherein the UAV further comprises a docking interface (A) configured to establish a wired connection with the docking station when the UAV is docked at the docking station, and (B) operable to permit via the wired connection at least one of: (i) charging of a battery of the UAV, and (ii) downloading of data from the UAV to the docking station.

16. The system of claim 1,
wherein the UAV further comprises a tether interface (A) configured to establish a wired connection with a tether and (B) operable to permit via the wired connection at least one of: (A) charging of a battery of the UAV, and (B) downloading of data from the UAV.

17. The system of claim 1, further comprising:
the docking station,
wherein the docking station is configured for permitting the UAV to dock at the docking station, and
wherein the docking station comprises a docking station-UAV interface (A) configured to establish a first wired connection with the UAV when the UAV is docked at the docking station, and (B) operable to permit via the first wired connection at least one of: (i) charging of a battery of the UAV, and (ii) downloading of data from the UAV to the docking station.

18. The system of claim 17, further comprising:
a tether configured for physically connecting the docking station to the UAV,
wherein the tether comprises (A) a docking station interface configured to establish a second wired connection with the docking station and (B) a tether-UAV interface configured to establish a third wired connection with the UAV when the UAV is connected to the tether, and wherein the tether is operable to permit via the second and third wired connections at least one of: (A) charging of the battery of the UAV, and (B) downloading of data from the UAV to the docking station.

19. The system of claim 17, wherein the docking station further comprises an additional camera device.

20. The system of claim 17, wherein the docking station further comprises:
storage configured to store data downloaded from the UAV.

21. The system of claim 1, wherein the UAV is configured to be launched upon instruction by a user.

22. The system of claim 21, wherein the UAV is configured to be launched by a voice command, typed command, a button push, or a manual entry by a user.

23. A method, comprising:
analyzing video data and/or audio data captured by a camera device and/or a microphone device, to determine whether designated visual content is present in the video data and/or whether designated audio content is present in the audio data, the camera device and the microphone device disposed on an unmanned aerial vehicle (UAV); and
triggering one or more actions based on the determination as to whether the designated visual content is present in the video data and/or the determination as to whether the designated audio content is present in the audio data,
wherein the one or more actions comprise at least one of: (A) controlling navigation of the UAV; (B) associating metadata with the video data and/or the audio data; (C) associating metadata with other captured data associated with the video data and/or the audio data; (D) transmitting a wireless communication; (E) issuing an audible alert; (F) controlling operation of the camera device; (G) starting capture of additional data, and (H) determining a location from which the designated audio content originated, and
causing the UAV to launch from a docking station upon occurrence of at least one of the following pairs of conditions:
(A) (i) a door of the vehicle on which the docking station is mounted is opened, and (ii) a light-bar of the vehicle on which the docking station is mounted is turned on, and
(B) (i) receipt by the receiver of an alert indicating content to be searched for in video data captured by the camera device, and (ii) a light-bar of the vehicle on which the docking station is mounted is turned on.

24. The method of claim 23,
wherein the designated visual content comprises at least one of: (A) a weapon or a characteristic thereof, (B) a vehicle or a characteristic thereof, (C) a road sign, a traffic signal, or a characteristic of either, (D) an obstacle or a characteristic thereof, (E) a threat or a characteristic thereof, (F) a person or a characteristic thereof, (G) an action or movement of a person, or a characteristic thereof, and (H) a position of a person, or a characteristic thereof.

25. The method of claim 23, further comprising:
receiving instructions wirelessly; and
controlling the UAV based on the received instructions.

26. The method of claim 23, further comprising:
transmitting in real time of at least one of: (A) the video data and/or the audio data captured by the camera device and/or the microphone device, as the video data and/or the audio data is being captured, and (B) data received wirelessly by a receiver on the UAV, as the data is being received.

27. The method of claim 23, further comprising:
triggering perching of the UAV when at least one of the following conditions obtains: (A) a level of power of a battery of the UAV reaches a threshold level, and (B) a distance the UAV has traveled, continuously or from a start time or a start location, reaches a threshold distance, (C) a duration of time the UAV has been airborne flying, continuously or from a start time or a start location, reaches a threshold duration, (D) instructions to perch the UAV have been received, and (E) a signal or a transmission comprising content has been received, the signal or content designated in advance as an instruction to perch the UAV.

28. The method of claim 23, wherein the conditions further comprise: (F) receipt of instructions to launch the UAV, and (G) receipt of a signal or of a transmission comprising content, the signal or content designated in advance as an instruction to launch the UAV.

29. A system comprising:
an unmanned aerial vehicle (UAV),
wherein the UAV comprises:
 a camera device configured to capture at least video data;
 a receiver configured to receive wireless communications;
 a transmitter configured to transmit wireless communications;
 storage linked with the camera device, the receiver, and the transmitter and configured to store data captured by the camera device and wireless communications received by the receiver; and
 a processor linked with and configured to exercise control over the camera device, the receiver, the transmitter, and the storage,
wherein the UAV is configured to dock with a docking station mounted on a vehicle,
wherein the UAV further comprises a perching mechanism operable to perch the UAV on an object, and
wherein the processor is operable to trigger perching of the UAV, at a location other than a start location, when at least one of the following conditions obtains: (A) a distance the UAV has traveled, continuously or from a start time or the start location, reaches a threshold distance, and (B) a duration of time the UAV has been airborne flying, continuously or from a start time or the start location, reaches a threshold duration,
wherein the location other than the start location is a location remote from the docking station mounted on the vehicle, the UAV having launched from the docking station mounted on the vehicle.

30. A system comprising:
an unmanned aerial vehicle (UAV),
wherein the UAV comprises:
 a camera device configured to capture at least video data;
 a receiver configured to receive wireless communications;
 a transmitter configured to transmit wireless communications;
 storage linked with the camera device, the receiver, and the transmitter and configured to store data captured by the camera device and wireless communications received by the receiver; and a processor linked with and configured to exercise control over the camera device, the receiver, the transmitter, and the storage, wherein the UAV is configured to dock with a docking station mounted on a vehicle, and wherein the processor is operable to execute instructions to (A) analyze video data captured by the camera device to determine whether designated visual content is present in the video data, (B) if it is determined that the designated visual content is present in the video data, tag the video data with an event tag corresponding to the designated visual content, and (C) if it is determined that the designated visual content is present in the video data, bookmark at least one of a start point and a stop point in at least one of a file containing the video data and a file containing metadata associated with the video data, the start point and the stop point defining a portion of the file containing the video data, wherein the designated visual content is present in the portion of the file containing the video data.

* * * * *